United States Patent
Thompson

(10) Patent No.: US 12,497,633 B2
(45) Date of Patent: Dec. 16, 2025

(54) PLASMID ENCODING A TLR9 AND Fc FUSION PROTEIN

(71) Applicant: Wyvern Pharmaceuticals Inc., Calgary (CA)

(72) Inventor: Bradley G. Thompson, Calgary (CA)

(73) Assignee: Wyvern Pharmaceuticals Inc., Calgary (CA)

( * ) Notice: Subject to any disclaimer, the term of this patent is extended or adjusted under 35 U.S.C. 154(b) by 0 days.

(21) Appl. No.: 18/964,119

(22) Filed: Nov. 29, 2024

(65) Prior Publication Data

US 2025/0263742 A1   Aug. 21, 2025

Related U.S. Application Data

(62) Division of application No. 18/582,222, filed on Feb. 20, 2024, now Pat. No. 12,416,020.

(51) Int. Cl.
| | |
|---|---|
| *C12N 15/00* | (2006.01) |
| *C07K 14/48* | (2006.01) |
| *C07K 14/62* | (2006.01) |
| *C07K 14/705* | (2006.01) |
| *C12N 9/22* | (2006.01) |
| *C12N 15/86* | (2006.01) |

(52) U.S. Cl.
CPC ............. *C12N 15/86* (2013.01); *C07K 14/48* (2013.01); *C07K 14/62* (2013.01); *C07K 14/705* (2013.01); *C07K 14/70596* (2013.01); *C12N 9/22* (2013.01); *C07K 2319/30* (2013.01); *C12N 2750/14143* (2013.01); *C12N 2800/00* (2013.01)

(58) Field of Classification Search
None
See application file for complete search history.

(56) References Cited

U.S. PATENT DOCUMENTS

| | | | |
|---|---|---|---|
| 8,841,416 B2 * | 9/2014 | Ledbetter | A61P 25/00 424/193.1 |
| 11,085,055 B2 | 8/2021 | Mallol et al. | |
| 11,162,102 B2 | 11/2021 | Minshull et al. | |
| 11,359,001 B2 | 6/2022 | Lancaster | |
| 11,530,423 B1 | 12/2022 | Thompson | |
| 11,873,505 B2 | 1/2024 | Thompson | |
| 11,976,104 B2 | 5/2024 | Wei | |
| 12,018,274 B2 | 6/2024 | Thompson | |
| 12,134,770 B1 | 11/2024 | Thompson | |
| 12,180,521 B2 * | 12/2024 | Ledbetter | A61P 11/00 |
| 2003/0104523 A1 | 6/2003 | Bauer | |
| 2021/0253664 A1 | 8/2021 | Wei | |
| 2024/0026377 A1 | 1/2024 | Thompson | |
| 2025/0002884 A1 * | 1/2025 | Posada | C12N 9/22 |
| 2025/0011445 A1 | 1/2025 | Bergmann | |

FOREIGN PATENT DOCUMENTS

| | | | |
|---|---|---|---|
| CA | 2721333 A1 | 10/2009 | |
| CN | 114829384 | 7/2022 | |
| KR | 100808908 B1 | 3/2008 | |
| WO | 2004096156 A2 | 11/2004 | |
| WO | 2020041590 A1 | 2/2020 | |
| WO | WO-2021168413 A1 * | 8/2021 | ............... C12N 9/22 |
| WO | 2022074236 A1 | 10/2021 | |
| WO | WO-2022178078 A1 * | 8/2022 | ............... A61P 11/00 |
| WO | 2023051412 A1 | 4/2023 | |
| WO | 2023088351 A1 | 5/2023 | |
| WO | WO-2024107701 A2 * | 5/2024 | |
| WO | WO-2024191937 A2 * | 9/2024 | |

OTHER PUBLICATIONS

Dwyer et al. (J. Biol. Chem. 274:9738-43, 1999) (Year: 1999).*
Chapter 7 Monomeric Fc-Fusion Proteins Baisong Mei, Susan C. Low, Snejana Krassova, Robert T. Peters, Glenn F. Pierce, Jennifer A. Dumont Book Editor(s):Stefan R. Schmidt First published: Feb. 12, 2013 https://doi.org/10.1002/9781118354599.ch7 (Year: 2013).*
A rationally engineered DNase1-Fc fusion protein ameliorates autoimmune glomerulonephritis. By: Mouchess, Maria [Reprint Author] Journal of Immunology, (May 1, 2019) vol. 202, No. 1, Suppl. S, pp. 132.4. (Year: 2019).*
A Rationally Engineered Hyperactive Actin-Resistant DNase1-Fc Fusion Protein Ameliorates Autoimmune Glomerulonephritis. By: Austin, Cary D. Faseb Journal, (Apr. 2019) vol. 33, No. Suppl. 1, pp. 802.10. (Year: 2019).*
Bottoni et al. "Targeting BTK through microRNA in chronic lymphocytic leukemia." Blood, The Journal of the American Society of Hematology 128.26 (2016): 3101-3112.
O'Brien et al. "Overview of microRNA biogenesis, mechanisms of actions, and circulation." Frontiers in endocrinology 9 (2018): 402.
Gorski et al. "RNA-based recognition and targeting: sowing the seeds of specificity." Nature Reviews Molecular Cell Biology 18.4 (2017): 215-228.

(Continued)

*Primary Examiner* — Michael C Wilson
(74) *Attorney, Agent, or Firm* — Gowling WLG (Canada) LLP

(57) ABSTRACT

Some embodiments of the present disclosure relate to one or more compositions that upregulate the production of one or more sequences of mRNA. The sequences of mRNA may encode for translation of a target biomolecule, thereby causing an increase in bioavailability of the target biomolecule within a subject that is administered the one or more compositions. In some embodiments of the present disclosure, the target biomolecule is a fusion protein with an Fc fragment, such as a toll-like receptor 3-Fc (TLR3-Fc). In some embodiments of the present disclosure, the target biomolecule is toll-like receptor 9-Fc (TLR9-Fc). In some embodiments of the present disclosure, the target biomolecule is deoxyribonuclease I-Fc (DNAse I-Fc). In some embodiments of the present disclosure, the target biomolecule is neural growth factor-Fc (NGF-Fc). In some embodiments of the present disclosure, the target biomolecule is insulin-Fc.

3 Claims, No Drawings

Specification includes a Sequence Listing.

(56) References Cited

OTHER PUBLICATIONS

Brutons Tyrosine Kinase Genbank Sequence (2023).
Christensen et al. "Recombinant adeno-associated virus-mediated microRNA delivery into the postnatal mouse brain reveals a role for miR-134 in dendritogenesis in vivo." Frontiers in neural circuits 3 (2010): 848.
Bofill-De Ros et al. "Guidelines for the optimal design of miRNA-based shRNAs." Methods 103 (2016): 157-166.
Denzler et al. "Impact of microRNA levels, target-site complementarity, and cooperativity on competing endogenous RNA-regulated gene expression." Molecular cell 64.3 (2016): 565-579.
Van Den Berg et al. "Design of effective primary microRNA mimics with different basal stem conformations." Molecular Therapy Nucleic Acids 5 (2016).
Nature (2010. Gene Expression. Scitable. Available online at Nature. com) <https://www.nature.com/scitable/topicpage/gene-expression-14121669> (2010).
GenBank EGF Sequence (2023).
Ahmadzadeh et al. "BRAF mutation in hairy cell leukemia." Oncology reviews 8.2 (2014): 253.
Patton et al. "Biogenesis, delivery, and function of extracellular RNA." Journal of extracellular vesicles 4.1 (2015): 27494.
Clark et al. "Detection of BRAF splicing variants in plasma-derived cell-free nucleic acids and extracellular vesicles of melanoma patients failing targeted therapy therapies." Oncotarget 11.44 (2020): 4016.
NCBI search results for SEQ ID No. 5 (2024).
NCBI Nucleotide Sequence ALK Lingand, search performed Dec. 26, 2024 (2023).
NCBI Nucleotide Sequence ALK Receptor, search performed Dec. 26, 2024 (2023).
GenBank EGFR Sequence (2023).
GenBank FLT3 Sequence (2024).
Wang et al. "Adeno-associated virus vector as a platform for gene therapy delivery." Nature reviews Drug discovery 18.5 (2019): 358-378.
Kondratov et al. "Direct head-to-head evaluation of recombinant adeno-associated viral vectors manufactured in human versus insect cells." Molecular Therapy 25.12 (2017): 2661-2675.
Tritschler et al. "Concepts and limitations for learning developmental trajectories from single cell genomics." Development 146.12 (2019): dev170506.
NCBI Nucleotide Sequence for PARP, search performed Dec. 26, 2024 (2024).

* cited by examiner

SEQUENCE LISTING

```
Sequence total quantity: 11
SEQ ID NO: 1            moltype = DNA  length = 5861
FEATURE                 Location/Qualifiers
source                  1..5861
                        mol_type = other DNA
                        organism = synthetic construct
SEQUENCE: 1
ttctagaata atcaacctct ggattacaaa atttgtgaaa gattgactgg tattcttaac   60
tatgttgctc cttttacgct atgtggatac gctgctttga tgcctttgta tcatgctatt  120
gcttcccgta tggctttcat tttctcctcc ttgtataaat cctggttgct gtctctttat  180
gaggagttgt ggcccgttgt caggcaacgt ggcgtggtgt gcactgtgtt tgctgacgca  240
accccactg gttgggcat tgccaccacc tgtcagctcc tttccgggac tttcgctttc   300
cccctcccta ttgccacggc ggaactcatc gccgcctgcc ttgcccgctg ctggacaggg  360
gctcggctgt tgggcactga caattccgtg gtgttgtcgg ggaaatcatc gtcctttcct  420
tggctgctcg cctgtgttgc cacctggatt ctgcgcggga cgtccttctg ctacgtccct  480
tcggccctca atccagcgga ccttccttcc cgcggcctgc tgccggctct gcggcctctt  540
ccgcgtcttc gccttcgccc tcagacgagt cggatctccc tttgggcgcc ctccccgcct  600
aagcttatcg ataccgtcga gatctaactt gtttattgca gcttataatg gttacaaata  660
aagcaatagc atcacaaatt tcacaaataa agcatttttt tcactgcatt ctagttgtgg  720
tttgtccaaa ctcatcaatg tatcttatca tgtctggatc tcgacctcga ctagagcatg  780
gctacgtaga taagtagcat ggcgggttaa tcattaacta caaggaaccc ctagtgatgg  840
agttggccac tccctctctg cgcgctcgct cgctcactga ggccgggcga ccaaaggtcg  900
cccgacgccc gggctttgcc cgggcggcct cagtgagcga gcgagcgcgc cagctggcgt  960
aatagcgaag aggcccgcac cgatcgccct tcccaacagt tgcgcagcct gaatggcgaa 1020
tggaattcca gacgattgag cgtcaaaatg taggtatttc catgagcgtt tttcctgttg 1080
caatggctgg cggtaatatt gttctggata ttaccagcaa ggccgatagt ttgagttctt 1140
ctactcaggc aagtgatgtt attactaatc aaagaagtat tgcgacaacg gttaatttgc 1200
gtgatggaca gactctttta ctcggtggcc tcactgatta taaaaacact tctcaggatt 1260
ctggcgtacc gttcctgtct aaaatccctt taatcggcct cctgtttagc tcccgctctg 1320
attctaacga ggaaagcacg ttatacgtgc tcgtcaaagc aaccatagta cgcgccctgt 1380
agcggcgcat taagcgcggc gggtgtggtg gttacgcgca gcgtgaccgc tacacttgcc 1440
agcgccctag cgcccgctcc tttcgctttc ttcccttcct ttctcgccac gttcgccggc 1500
tttccccgtc aagctctaaa tcgggggctc cctttagggt tccgatttag tgctttacgg 1560
cacctcgacc ccaaaaaact tgattagggt gatggttcac gtagtgggcc atcgccctga 1620
tagacggttt ttcgcccttt gacgttggag tccacgttct ttaatagtgg actcttgttc 1680
caaactgaaa caacactcaa ccctatctcg gtctattctt tgatttata agggattttg 1740
ccgatttcgg cctattggtt aaaaaatgag ctgatttaac aaaaatttaa cgcgaatttt 1800
aacaaaatat taacgtttac aatttaaata tttgcttata caatcttcct gtttttgggg 1860
cttttctgat tatcaaccgg ggtacatatg attgacatgc tagttttacg attaccgttc 1920
atcgattctc ttgtttgctc cagactctca ggcaatgacc tgatagcctt tgtagagacc 1980
tctcaaaaat agctaccctc tccggcatga atttatcagc tagaacggtt gaatatcata 2040
ttgatggtga tttgactgtc tccggccttt ctcacccgtt tgaatcttta cctacacatt 2100
actcaggcat tgcatttaaa atatatgagg gttctaaaaa tttttatcct tgcgttgaaa 2160
taaaggcttc tcccgcaaaa gtattacagg gtcataatgt ttttggtaca accgatttag 2220
ctttatgctc tgaggcttta ttgcttaatt ttgctaattc tttgccttgc ctgtatgatt 2280
tattggatgt tggaattcct gatgcggtat tttctcctta cgcatctgtg cggtatttca 2340
caccgcatat ggtgcactct cagtacaatc tgctctgatg ccgcatagtt aagccagccc 2400
```

```
cgacacccgc caacacccgc tgacgcgccc tgacgggctt gtctgctccc ggcatccgct  2460
tacagacaag ctgtgaccgt ctccgggagc tgcatgtgtc agaggttttc accgtcatca  2520
ccgaaacgcg cgagacgaaa gggcctcgtg atacgcctat ttttataggt taatgtcatg  2580
ataataatgt tttcttagac gtcaggtggc acttttcggg gaaatgtgcg cggaacccct  2640
atttgtttat ttttctaaat acattcaaat atgtatccgc tcatgagaca ataaccctga  2700
taaatgcttc aataatattg aaaaaggaag agtatgagta ttcaacattt ccgtgtcgcc  2760
cttattccct tttttgcggc attttgcctt cctgttttg ctcacccaga aacgctggtg  2820
aaagtaaaag atgctgaaga tcagttgggt gcacgagtgg gttacatcga actggatctc  2880
aacagcggta agatcttga gagttttcgc cccgaagaac gttttccaat gatgagcact  2940
tttaaagttc tgctatgtgg cgcggtatta tcccgtattg acgccgggca agagcaactc  3000
ggtcgccgca tacactattc tcagaatgac ttggttgagt actcaccagt cacagaaaag  3060
catcttacgg atggcatgac agtaagagaa ttatgcagtg ctgccataac catgagtgat  3120
aacactgcgg ccaacttact tctgacaacg atcggaggac cgaaggagct aaccgctttt  3180
ttgcacaaca tgggggatca tgtaactcgc cttgatcgtt gggaaccgga gctgaatgaa  3240
gccataccaa acgacgagcg tgacaccacg atgcctgtag caatggcaac aacgttgcgc  3300
aaactattaa ctggcgaact acttactcta gcttcccggc aacaattaat agactggatg  3360
gaggcggata aagttgcagg accacttctg cgctcggccc ttccggctgg ctggtttatt  3420
gctgataaat ctggagccgg tgagcgtggg tctcgcggta tcattgcagc actggggcca  3480
gatggtaagc cctcccgtat cgtagttatc tacacgacgg ggagtcaggc aactatggat  3540
gaacgaaata gacagatcgc tgagataggt gcctcactga ttaagcattg gtaactgtca  3600
gaccaagttt actcatatat actttagatt gatttaaaac ttcattttta atttaaaagg  3660
atctaggtga agatccttt tgataatctc atgaccaaaa tcccttaacg tgagttttcg  3720
ttccactgag cgtcagaccc cgtagaaaag atcaaaggat cttcttgaga tcctttttt  3780
ctgcgcgtaa tctgctgctt gcaaacaaaa aaaccaccgc taccagcggt ggtttgtttg  3840
ccggatcaag agctaccaac tctttttccg aaggtaactg gcttcagcag agcgcagata  3900
ccaaatactg tccttctagt gtagccgtag ttaggccacc acttcaagaa ctctgtagca  3960
ccgcctacat acctcgctct gctaatcctg ttaccagtgg ctgctgccag tggcgataag  4020
tcgtgtctta ccgggttgga ctcaagacga tagttaccgg ataagcgca gcggtcgggc  4080
tgaacggggg gttcgtgcac acagcccagc ttggagcgaa cgacctacac cgaactgaga  4140
tacctacagc gtgagctatg agaaagcgcc acgcttcccg aagggagaaa ggcggacagg  4200
tatccggtaa gcggcagggt cggaacagga gagcgcacga gggagcttcc agggggaaac  4260
gcctggtatc tttatagtcc tgtcgggttt cgccacctct gacttgagcg tcgatttttg  4320
tgatgctcgt caggggggcg gagcctatgg aaaaacgcca gcaacgcggc cttttacgg  4380
ttcctggcct tttgctggcc ttttgctcac atgttcttc ctgcgttatc ccctgattct  4440
gtggataacc gtattaccgc ctttgagtga gctgataccg ctcgccgcag ccgaacgacc  4500
gagcgcagcg agtcagtgag cgaggaagcg gaagagcgcc caatacgcaa accgcctctc  4560
cccgcgcgtt ggccgattca ttaatgcagc agctgcgcgc tcgctcgctc actgaggccg  4620
cccgggcaaa gcccgggcgt cgggcgacct ttggtcgccc ggcctcagtg agcgagcgag  4680
cgcgcagaga gggagtggcc aactccatca ctaggggttc cttgtagtta atgattaacc  4740
cgccatgcta cttatctacg tagccatgct ctaggacatt gattattgac tagtggagtt  4800
ccgcgttaca taacttacgg taaatggccc gcctggctga cgccccaacg accccgccc  4860
attgacgtca ataatgacgt atgttcccat agtaacgcca atagggactt tccattgacg  4920
tcaatgggtg gagtatttac ggtaaactgc ccacttggca gtacatcaag tgtatcatat  4980
gccaagtacg ccccctattg acgtcaatga cggtaaatgg cccgcctggc attatgccca  5040
gtacatgacc ttatgggact ttcctacttg gcagtacatc tacgtattag tcatcgctat  5100
taccatggtc gaggtgagcc ccacgttctg cttcactctc cccatctccc cccctcccc  5160
acccccaatt ttgtatttat ttattttta attatttttgt gcagcgatgg gggcgggggg  5220
gggggggggc gcgcgccagg cggggcgggg cggggcgagg ggcggggcgg ggcgaggcgg  5280
agaggtgcgg cggcagccaa tcagagcggc gcgctccgaa agtttccttt tatggcgagg  5340
cggcggcggc ggcggcccta taaaaagcga agcgcgcggc gggcgggagt cgctgcgcgc  5400
tgccttcgcc ccgtgccccg ctccgccgcc gcctcgcgcc gcccgccccg gctctgactg  5460
accgcgttac taaaacaggt aagtccggcc tccgcgccgg gttttggcgc ctcccgcggg  5520
cgccccctc ctcacggcga gcgctgccac gtcagacgaa gggcgcagcg agcgtcctga  5580
tccttccgcc cggacgctca ggacagcggc ccgctgctca taagactcgg ccttagaacc  5640
ccagtatcag cagaaggaca ttttaggacg ggacttggtt gactctaggg cactggtttt  5700
ctttccagag agcggaacag gcgaggaaaa gtagtccctt ctcggcgatt ctgccggagg  5760
atctccgtgg ggcggtgaac gccgatgatg cctctactaa ccatgttcat gttttctttt  5820
tttttctaca ggtcctgggt gacgaacagg gtaccgccac c                      5861

SEQ ID NO: 2          moltype = DNA   length = 1560
FEATURE               Location/Qualifiers
source                1..1560
                      mol_type = other DNA
                      organism = synthetic construct
SEQUENCE: 2
atgaggggca tgaagctgct ggggcgctg ctggcactgg cggccctact gcaggggcc    60
gtgtccctga agatcgcagc cttcaacatc cagacatttg gggagaccaa gatgtccaat  120
gccaccctcg tcagctacat tgtgcagatc ctgagccgct atgacatcgc cctggtccag  180
gaggtcagag acagccacct gactgccgtg gggaagctgc tggaacctgc caatcaggat  240
gcaccagaca cctatcacta cgtggtcagt gagccactgg gacggaacag ctataaggag  300
cgctacctgt tcgtgtacag gcctgaccag gtgtctgcgg tggacagcta ctactacgat  360
gatggctgcg agccctgcgg gaacgacacc ttcaaccgag agccagccat gtcaggttc   420
ttctcccggt tcacagaggt caggggagttt gccattgttc cctgcatgcc ggccccgggg  480
gacgcagtag ccgagatcga cgctctctat gacgtctacc tggatgtcca agagaaatgg  540
ggcttggagg acgtcatgtt gatgggcgac ttcaatgcgg gctgcagcta tgtgagaccc  600
tcccagtggt catccatccg cctgtggaca agcccacct tccagtggct gatccccgac  660
agcgctgaca ccacagctac acccacgcac tgtgcctatg acaggatcgt ggttcagggg  720
atgctgctcc gaggcgccgt tgttcccgac tcggctcttc cctttaactt ccaggctgcc  780
tatggcctga gtgaccaact ggcccaagcc atcagtgacc actatccagt ggaggtgatg  840
```

```
ctgaagggcg gatcaggcgg atcacccaaa tcttgtgaca aaactcacac atgcccaccg   900
tgcccagcac ctgaactcct gggggggaccg tcagtcttcc tcttcccccc aaaacccaag   960
gacaccctca tgatctcccg gacccctgag gtcacatgcg tggtggtgga cgtgagccac  1020
gaagaccctg aggtcaagtt caactggtac gtggacggcg tggaggtgca taatgccaag  1080
acaaagccgc gggaggagca gtacaacagc acgtaccgtg tggtcagcgt cctcaccgtc  1140
ctgcaccagg actggctgaa tggcaaggag tacaagtgca aggtctccaa caaagccctc  1200
ccagccccca tcgagaaaac catctccaaa gccaaagggc agccccgaga accacaggtg  1260
tacaccctgc ccccatcccg ggaggagatg accaagaacc aggtcagcct gacctgcctg  1320
gtcaaaggct tctatcccag cgacatcgcc gtggagtggg agagcaatgg gcagccgcag  1380
aacaactaca agaccacgcc tcccgtgctg gactccgacg gctccttctt cctctacagc  1440
aagctcaccg tggacaagag caggtggcag caggggaacg tcttctcatg ctccgtgatg  1500
catgaggctc tgcacaacca ctacacgcag aagagcctct ccctgtctcc gggtaaatag  1560

SEQ ID NO: 3            moltype = DNA  length = 3423
FEATURE                 Location/Qualifiers
source                  1..3423
                        mol_type = other DNA
                        organism = synthetic construct
SEQUENCE: 3
gccagaccct gccgtgcatt tattttggg gcggcctgct gccgtttggc atgctgtgcg    60
cgagcagcac caccaaatgc accgtgagcc atgaagtggg ggattgcagc catctgaaac   120
tgacccaggt gccggatgat ctgccgacca acattaccgt gctgaacctg acccataacc   180
agctgcgccg cctgccggcg gcgaacttta cccgctatag ccagctgacc agcctggatg   240
tgggctttaa caccattagc aaactggaac cggaactgtg ccagaaactg ccgatgctga   300
aagtgctgaa cctgcagcat aacgaactga gccagctgag cgataaaacc tttgcgtttt   360
gcaccaacct gaccgaactg catctgatga gcaacaccga tcagaaaatt aaaaaacaac   420
cgtttgtgaa acagaaaaac ctgattaccc tggatctgag ccataacggc ctgagcagca   480
ccaaactggg cacccaggtg cagctggaaa acctgcagga actgctgctg agcaacaaca   540
aaattcaggc gctgaaaagc gaagaactgg atattttttgc gaacagcagc ctgaaaaaac   600
tggaactgag cagcaaccag attaaagaat ttagcccgag ctgctttcat gcgattggcc   660
gcctgtttgg cctgtttctg aacaacgtgc agctgggccc gagcctgacc gaaaaactgt   720
gcctggaact ggcgaacacc agcattcgca acctgagcct gagcaacagc cagctgagca   780
ccaccagcaa caccaccttt ctgggcctga atggaccaa cctgaccatg ctggatctga   840
gctataacaa cctgaacgtg gtgggcaacg atagctttgc gtggctgccg cagctggaat   900
attttttct ggaatataac aacattcagc atctgtttta ccatagcctg catgcctgt   960
ttaacgtgcg ctatctgaac ctgaaacgca gctttaccaa acagagcatt agcctgccga  1020
gcctgccgaa aattgatgat tttagctttc agtggctgaa atgcctggaa catctgaaca  1080
tggaagataa cgatatccg ggcattaaaa gcaacatgtt taccggcctg attaacctga  1140
aatatctgag cctgagcaac agctttacca gcctgcgcaa cctgaccaac gaaaccttg  1200
tgagcctggc gcatagcccg ctgcatattc tgaacctgac caaaaacaaa attagcaaaa  1260
ttgaaagcga tgccgtttagc tggctgggcc atctggaagt gctggatctg ggcctgaacg  1320
aaaattggcca ggaactgacc ggccaggaat ggcgcggcct ggaaaacatt tttgaaattt  1380
atctgcgcta taacaaatat ctgcagctga cccgcaacga ctttgcgctg tgccgagcc  1440
tgcagcgcct gatgctgcgc cgcgtggcgc tgaaaacgt ggatagcagc ccgagccgt  1500
ttcagccgct cgcaacctg accattctgg atctgagcaa caacaacatt gcgaacatta  1560
acgatgatat gctggaaggc ctggaaaaac tggaaattct ggatctgcag cataacaacc  1620
tggcgcgcct gtggaaacat gcgaacccgg gcggcccgat ttattttctg aaaggcctga  1680
gccatctgca tattctgaac ctggaaagca acgctttga tgaaattccg gtggaagtgt  1740
ttaaagatct gtttgaactg aaaattattg atctgggcct gaacaacctg aacaccctgc  1800
cggcgagcgt gtttaacaac caggtgagcc tgaaagcct gaacctgcag aaaaacctga  1860
ttaccagcgt ggaaaaaaa gtgttttggcc cggcgttttc caacctgacc gaactggata  1920
tgcgcttaa cccgtttgat tgcacctgcg aaagcattgc gtggtttgtg aactggatta  1980
acgaaaccca taccaacatt ccggaactga gcagccatta tctgtgcaac ccccgccgc  2040
attatcatgg ctttccggtg cgcctgttt ataccagcag ctgcaaagat agcgcgccgt  2100
ttgaactgtt tttttatgatt aacaccagca ttctgctgat ttttattttt attgtgctgc  2160
tgattcattt tgaaggctgg cgcattagct ttattggaa cgtgagcgtg catcgcgtgc  2220
tgggctttaa agaaattgat cgccagaccg aacagtttga atatgcggcg tatattattc  2280
atgcgtataa agataaagat tgggtgtggg aacattttag cagcatggaa aaagaagatc  2340
agagcctgaa atttttcctg gaagaacgcg atttttgaagc gggcgtgttt gaactggaag  2400
cgattgtgaa cagcattaaa cgcagccgca aaattattt tgtgattacc catcatctgc  2460
tgaaagatcc gctgtgcaaa cgctttaaag tgcatcatgc ggtgcagcag gcgattgaac  2520
agaacctgga tagcattatt ctggtgtttc tggaagaat tccggattat aaactgaacc  2580
atgcgctgtg cctgcgccgc ggcatgttta aagccattg cattctgaac tggccggtgc  2640
agaaagaacg cattggcgcg tttcgccata aactgcaggt ggcgctgggc tgcaaaaaca  2700
gcgtgcatgg gcggatcagg cggatcaccc aaatcttgtg acaaaactca cacatgccca  2760
ccgtgcccag cacctgaact cctgggggga ccgtcagtct tcctcttccc cccaaaaccc  2820
aaggacaccc tcatgatctc ccggaccct gaggtcacat gcgtggtggt ggacgtgagc  2880
cacgaagacc ctgaggtcaa gttcaactgg tacgtggacg gcgtggaggt gcataatgcc  2940
aagacaaagc cgcgggagga gcagtacaac agcacgtacc gtgtggtcag cgtcctcacc  3000
gtcctgcacc aggactggct gaatggcaag gagtacaagt gcaaggtctc caacaaagcc  3060
ctcccagccc ccatcgagaa aaccatctcc aaagccaaag gcagccccg agaaccacag  3120
gtgtacaccc tgcccccatc ccgggaggag atgaccaaga accaggtcag cctgacctgc  3180
ctggtcaaag gcttctatcc cagcgacatc gccgtggagt gggagagcaa tgggcagccg  3240
gagaacaact acaagaccac gcctcccgtg ctgactccga cggctccttc ttcctctac  3300
agcaagctca ccgtggacaa gagcaggtgg cagcagggga acgtcttctc atgctccgtg  3360
atgcatgagg ctctgcacaa ccactacacg cagaagagcc tctccctgtc tccgggtaaa  3420
tag                                                               3423

SEQ ID NO: 4            moltype = DNA  length = 3877
```

| FEATURE | Location/Qualifiers |
|---|---|
| source | 1..3877 |
| | mol_type = other DNA |
| | organism = synthetic construct |

SEQUENCE: 4

```
atgaggggca tgaagctgct gggggcgctg ctggcactgg cggccctact gcaggggcc    60
gtgtccatgg gcttttgccg cagcgcgctg catccgctga gcctgctggt gcaggcgatt   120
atgctggcga tgaccctggc gctgggcacc ctgccggcgt ttctgccgtg cgaactgcag   180
ccgcatggcc tggtgaactg caactggctg ttttctgaaaa gcgtgccgca ttttagcatg   240
gcggcgccgc gcggcaacgt gaccagcctg agcctgagca gcaaccgcat tcatcatctg   300
catgatagcg attttgcgca tctgccgagc ctgcgccatc tgaacctgaa atggaactgc   360
ccgcggtgg gcctgagccc gatgcatttt ccgtgccata tgaccattga accgagcacc   420
tttctggcg tgccgaccct ggaagaactg aacctgagct ataacaacat tatgaccgtg   480
ccggcgctgc cgaaaagcct gattagcctg agcctgaacaa taccaacat tctgatgctg   540
gatagcgcga gcctggcggg cctgcatgcg ctgcgctttc tgtttatgga tggcaactgc   600
tattataaaa acccgtgccg ccaggcgctg aagtggcgc cgggcgcgct gctgggcctg   660
ggcaacctga cccatctgag cctgaaatat aacaacctga ccgtggtgcc gcgcaacctg   720
ccgagccgc tggaatatct gctgctgagc tataaccgca ttgtgaaact ggcgccgaaa   780
gatctggcga acctgaccgc gctgcgcgtg ctggatgtgg gcggcaactg ccgccgctgc   840
gatcatcgcg cgaacccgtg catggaatgc ccgcgccatt ttccgcagct gcatccggat   900
acctttagcc atctgagccg cctggaaggc ctggtgctga agatagcag cctgagctgg   960
ctgaacgcga gctggtttcg cggcctgggc aacctgcgcg tgctggatct gagcgaaaac  1020
tttctgtata aatgcattac caaaaccaaa gcgtttcagg gcctgaccca gctgcgcaaa  1080
ctgaacctga gctttaacta tcagaaacgc gtgagctttg cgcatctgag cctggcgccg  1140
agctttggca gcctggtggc gctgaaagaa ctggatatgc atggcatttt ttttcgcagc  1200
ctggatgaaa ccaccctgcg cccgcgtgcg gcctgccga tgctgcagac cctgcgcctg  1260
cagatgaact ttattaacca ggcgcagctg gcattttttc gcgcgtttcc gggcctgcgc  1320
tatgtggatc tgagcgataa ccgcattagc ggcgcgagcg aactgaccgc gaccatgggc  1380
gaagcggatg gcggcgaaaa agtgtggctg cagccgggcg atctggcgcc ggcgccggtg  1440
gataccccga gcagcgaaga ttttcgcccg aactgcgaca ccctgaactt taccctggtg  1500
ctgagccgca caacctggt gaccgtgcag ccggaaatgt tgcgcagct gagccatctg  1560
cagtgcctgc gcctgagcca taactgcatt agcaggcgg tgaacggcag ccagtttctg  1620
ccgctgaccg gcctgcaggt gctggatctg agccataaca actggatct gtatcatgaa  1680
catagcttta ccgaactgcc cgccctgaa gcgctggatc tgagctataa cagccagccg  1740
tttggcatgc agggcgtggg ccataacttt agctttgtgg cgcatctgcg cacctgcgc  1800
catctgagcc tggcgcataa caacattcat agccaggtga ccagcagct gtgcagcacc  1860
agcctgcgcg cgctggattt tagcggcaac gcgctgggcc atatgtgggc ggaaggcgat  1920
ctgtatctgc atttttttca gggcctgagc ggcctgattt ggctggatct gagccagaac  1980
cgcctgcata ccctgctgcc gcagaccctc cgcaacctgc cgaaaagcct gcaggtgctg  2040
cgcctgcgcg ataactatct ggcgtttttt aaatggtgga gctgcatttt tctgccgaaa  2100
ctggaagtgc tggatctggc gggcaaccag ctgaaagcgc tgaccaacgg cagcctgccg  2160
gcgggcaccc gcctgcgccg cctggatgtg agctgcaaca gcattagctt tgtggcgccg  2220
ggcttttttta gcaaagcgaa agaactgcgc gaactgaacc tgagcgcgaa cgcgctgaaa  2280
accgtggatc atagctggtt tggccccgctg gcgagcgcgc tgcagattct ggatgtgagc  2340
gcgaacccgc tgcattgcgc gtgcggcgcg cgtttatgg attttctgct ggaagtgcag  2400
gcggcggtgc cgggcctgcc gagccgcgtg aaatgcggca gcccgggcca gctgcagggc  2460
ctgagcattt ttgcgcagga tctgcgctgc tgcctggatg aagcgctgag ctgggattgc  2520
tttgcgctga gcctgctggc ggtggcgctg gcctgggcg tgccgatgct gcatcatctg  2580
tgcggctggg atctgtggta ttgctttcat ctgtgcctgg cgtggctgcc gtggcgcggc  2640
cgccagagcg gccgcgatga agatgcgctg ccgtatgatg cgtttgtggt gtttgataaa  2700
acccagaccg cggtggcga ttgggtgtat aacgaactgc gcggccagct ggaagaatgc  2760
cgcggccgct gggcgctgcg cctgtgcctg gaagaacgcg attggctgcc gggcaaaacc  2820
ctgtttgaaa acctgtgggc gagcgtgtat ggcagccgca aaaccctgtt tgtgctggcg  2880
cataccgatc gcgtgagcgg cctgctgcgc gcgagctttc tgctggcgca gcagcgcctg  2940
ctggaagatc gcaaagatgt ggtggtgctg gtgattctga gcccggatgg ccgccgcagc  3000
cgctatgtgc gcctgcgcca gcgcctgtgc cgccagagcg tgctgctgtg gccgcatcag  3060
ccgagcggcc agcgcagctt tgggcgcag ctgggcatgg cgctgacccg cgataaccat  3120
catttttata accgcaactt tgccagggc ccgaccgcgg aagggcggat caggcggatc  3180
acccaaatct tgtgacaaaa ctcacacatg cccaccgtgc ccagcacctg aactcctggg  3240
gggaccgtca gtcttcctct tccccccaaa acccaaggac accctcatga tctcccgatg  3300
ccctgaggtc acatgcgtgg tggtggacgt gagccacgaa gaccctgagg tcaagttcaa  3360
ctggtacgtg gacggcgtgg aggtgcataa tgccaagaca aagccgcggg aggagcagta  3420
caacagcacg taccgtgtgg tcagcgtcct caccgtcctg caccaggact ggctgaatgg  3480
caaggagtac aagtgcaagg tctccaacaa agcctcccca gccccatcg agaaaaccat  3540
ctccaaagcc aaagggcagc ccgagaacc acaggtgtac accctgcccc catcccggga  3600
ggagatgacc aagaaccagg tcagcctgac ctgcctggtc aaaggcttct atcccagcga  3660
catcgccgtg gagtgggaga gcaatgggca gccggagaac aactacaaga ccacgcctcc  3720
cgtgctggac tccgacggct ccttcttcct ctacagcaag ctcaccgtgg acaagagcag  3780
gtggcagcag gggaacgtct tctcatgctc cgtgatgcat gaggctctgc acaaccacta  3840
cacgcagaag agcctctccc tgtctccggg taaatag                           3877
```

| SEQ ID NO: 5 | moltype = DNA length = 1503 |
|---|---|
| FEATURE | Location/Qualifiers |
| source | 1..1503 |
| | mol_type = other DNA |
| | organism = synthetic construct |

SEQUENCE: 5

```
atgaggggca tgaagctgct gggggcgctg ctggcactgg cggccctact gcaggggcc    60
gtgtccatga gcatgctgtt ttatacccctg attaccgcgt ttctgattgg cattcaggcg   120
```

```
gaaccgcata gcgaaagcaa cgtgccggcg ggccatacca ttccgcaggc gcattggacc    180
aaactgcagc atagcctgga taccgcgctg cgccgcgcgc gcagcgcgcc ggcggcggcg    240
attgcgcgc gcgtggcggg ccagaccegc aacattaccg tggatccgcg cctgtttaaa    300
aaacgccgcc tgcgcagccc gcgcgtgctg tttagcaccc agccgccgcg cgaagcggcg    360
gataccgcagg atctggattt tgaagtgggc ggcgcggcgc cgtttaaccg cacccatcgc    420
agcaaacgca gcagcagcca tccgattttt catcgcggcg aatttagcgt gtgcgatagc    480
gtgagcgtgt gggtgggcga taaaaccacc gcgaccgata ttaaaggcaa agaagtgatg    540
gtgctgggcg aagtgaacat taacaacagc gtgtttaaac agtattttt tgaaaccaaa    600
tgccgcgatc cgaacccggt ggatagcggc tgccgcgcga ttgatagcaa acattggaac    660
agctattgca ccaccaccca tacctttgtg aaagcgctga ccatggatgg caaacaggcg    720
gcgtggcgct ttattcgcat tgataccgcg tgcgtgtgcg tgctgagccg caaagcggtg    780
cgccgcgcgg gcgatcagg cggatcaccc aaatcttgtg acaaaactca cacatgccca    840
ccgtgcccag cacctgaact cctgggggga ccgtcagtct tcctcttccc cccaaaaccc    900
aaggacaccc tcatgatctc ccggacccct gaggtcacat gcgtggtggt ggacgtgagc    960
cacgaagacc ctgaggtcaa gttcaactgg tacgtggacg gcgtggaggt gcataatgcc   1020
aagacaaagc cgcgggagga gcagtacaac agcacgtacc gtgtggtcag cgtcctcacc   1080
gtcctgcacc aggactggct gaatggcaag gagtacaagt gcaaggtctc caacaaagcc   1140
ctcccagccc ccatcgagaa aaccatctcc aaagccaaag ggcagccccg agaaccacag   1200
gtgtacaccc tgcccccatc ccgggaggag atgaccaaga accaggtcag cctgacctgc   1260
ctggtcaaag gcttctatcc cagcgacatc gccgtggagt gggagagcaa tgggcagccg   1320
gagaacaact acaagaccac gcctcccgtg ctggactccg acggctcctt cttcctctac   1380
agcaagctca ccgtggacaa gagcaggtgg cagcagggga acgtcttctc atgctccgtg   1440
atgcatgagg ctctgcacaa ccactacacg cagaagagcc tctccctgtc tccgggtaaa   1500
tag                                                                 1503

SEQ ID NO: 6          moltype = DNA  length = 1111
FEATURE               Location/Qualifiers
source                1..1111
                      mol_type = other DNA
                      organism = synthetic construct
SEQUENCE: 6
atgaggggca tgaagctgct gggggcgctg ctggcactgg cggccctact gcaggggggcc     60
gtgtccatgc gcgtgtggat gcgcctgctg ccgctgctgg cgctgctggc gctgtggggc    120
ccggatccgg cggcggcgtt tgtgaaccag catctgtgcg gcagccatct ggtggaagcg    180
ctgtatctgg tgtgcggcga acgcggcttt tttataccc gcaaaacccg ccgcgaagcg    240
gaagatctgc aggtgggcca ggtggaactg ggccgcggcc cgggcgcggg cagcctgcag    300
ccgctggcgc tggaaggcag cctgcagaaa cgcggcattg tggaacagtg ctgcaccagc    360
atttgcagcc tgtatcagct ggaaaactat tgcaacgggc ggatcaggcg gatcacccaa    420
atcttgtgac aaaactcaca catgcccacc gtgcccagca cctgaactcc tggggggacc    480
gtcagtcttc ctcttccccc caaaacccaa ggacaccctc atgatctccc ggacccctga    540
ggtcacatgc gtggtggtgg acgtgagcca cgaagaccct gaggtcaagt tcaactggta    600
cgtggacggc gtggaggtgc ataatgccaa gacaaagccg cgggaggagc agtacaacag    660
cacgtaccgt gtggtcagcg tcctcaccgt cctgcaccag gactggctga atggcaagga    720
gtacaagtgc aaggtctcca acaaagcccc tcccagcccc atcgagaaaa ccatctccaa    780
agccaaaggg cagccccgag aaccacaggt gtacaccctg cccccatccc gggaggagat    840
gaccaagaac caggtcagcc tgacctgcct ggtcaaaggc ttctatccca gcgacatcgc    900
cgtggagtgg gagagcaatg ggcagccgga gaacaactac aagaccacgc ctcccgtgct    960
ggactccgac ggctccttct tcctctacag caagctcacc gtggacaaga gcaggtggca   1020
gcaggggaac gtcttctcat gctccgtgat gcatgaggct ctgcacaacc actacacgca   1080
gaagagcctc tccctgtctc cgggtaaata g                                  1111

SEQ ID NO: 7          moltype = DNA  length = 7421
FEATURE               Location/Qualifiers
source                1..7421
                      mol_type = other DNA
                      organism = synthetic construct
SEQUENCE: 7
ttctagaata atcaacctct ggattacaaa atttgtgaaa gattgactgg tattcttaac     60
tatgttgctc cttttacgct atgtggatac gctgctttaa tgcctttgta tcatgctatt    120
gcttcccgta tggctttcat tttctcctcc ttgtataaat cctggttgct gtctctttat    180
gaggagttgt ggcccgttgt caggcaacgt ggcgtggtgt gcactgtgtt tgctgacgca    240
acccccactg gttggggcat tgccaccacc tgtcagctcc tttccgggac tttcgctttc    300
ccctcccta ttgccacggc ggaactcatc gccgcctgcc ttgcccgctg ctggacaggg    360
gctcggctgt tgggcactga caattccgtg gtgttgtcgg ggaaatcatc gtcctttcct    420
tggctgctcg cctgtgttgc cacctggatt ctgcgcggga cgtccttctg ctacgtccct    480
tcggccctca atccagcgga ccttccttcc cgcggcctgc tgccggctct gcggcctctt    540
ccgcgtcttc gccttcgccc tcagacgagt cggatctccc tttgggccgc ctccccgcct    600
aagcttatcg ataccgtcga tctaacttt gtttttgca gcttataatt gttacaaata    660
aagcaatagc atcacaaatt tcacaaataa agcattttt tcactgcatt ctagttgtgg    720
tttgtccaaa ctcatcaatg tatcttatca tgtctggatc tcgacctcga ctagagcatg    780
gctacgtaga taagtagcat ggcgggttaa tcattaacta caaggaaccc ctagtgatgg    840
agttggccac tccctctctg cgcgctcgct cgctcactga ggccgggcga ccaaaggtcg    900
cccgacgccc gggctttgcc cggcggcct cagtgagcga gcgagcgcgc agctggcgt    960
aatagcgaag aggcccgcac cgatcgccct tcccaacagt tgcgcagcct gaatggcgaa   1020
tggaattcca gacgattgag cgtcaaaatg taggtatttc catgagcgtt tttcctgttg   1080
caatggctgg cggtaatatt gttctggata ttaccagcaa ggccgatagt ttgagttctt   1140
ctactcagg aagtgatgtt attactaatc aaagaagtat tgcgacaacg gttaatttgc   1200
gtgatggaca gactcttta tcggtggcc tcactgatta taaaaacact tctcaggatt   1260
ctggcgtacc gttcctgtct aaaatccctt taatcggcct cctgtttagc tcccgctctg   1320
```

```
attctaacga ggaaagcacg ttatacgtgc tcgtcaaagc aaccatagta cgcgccctgt   1380
agcggcgcat taagcgcggc gggtgtggtg gttacgcgca gcgtgaccgc tacacttgcc   1440
agcgccctag cgcccgctcc tttcgctttc ttcccttcct ttctcgccac gttcgccggc   1500
tttcccgtc  aagctctaaa tcgggggctc cctttagggt tccgatttag tgctttacgg   1560
cacctcgacc ccaaaaaact tgattagggt gatggttcac gtagtgggcc atcgccctga   1620
tagacggttt ttcgcccttt gacgttgag  tccacgttct ttaatagtgg actcttgttc   1680
caaactggaa caacactcaa ccctatctcg gtctattctt ttgatttata agggattttg   1740
ccgatttcgg cctattggtt aaaaaatgag ctgatttaac aaaaatttaa cgcgaatttt   1800
aacaaaatat taacgtttac aatttaaata tttgcttata caatcttcct gttttggg    1860
cttttctgat tatcaaccgg ggtacatatg attgacatgc tagttttacg attaccgttc   1920
atcgattctc ttgtttgctc cagactctca ggcaatgacc tgatagcctt tgtagagacc   1980
tctcaaaaat agctaccctc tccggcatga atttatcagc tagaacggtt gaatatcata   2040
ttgatggtga tttgactgtc tccggccttt ctcacccgtt tgaatcttta cctacacatt   2100
actcaggcat tgcatttaaa atatatgagg gttctaaaaa tttttatcct tgcgttgaaa   2160
taaaggcttc tcccgcaaaa gtattacagg gtcataatgt ttttggtaca accgatttag   2220
ctttatgctc tgaggcttta ttgcttaatt ttgctaattc tttgccttgc ctgtatgatt   2280
tattggatgt tggaattcct gatgcggtat tttctcctta cgcatctgtg cggtatttca   2340
caccgcatat ggtgcactct cagtacaatc tgctctgatg ccgcatagtt aagccagccc   2400
cgacacccgc caacacccgc tgacgcgccc tgacgggctt gtctgctccc ggcatccgct   2460
tacagacaag ctgtgaccgt ctccgggagc tgcatgtgtc agaggttttc accgtcatca   2520
ccgaaacgcg cgagacgaaa gggcctcgtg atacgcctat ttttataggt taatgtcatg   2580
ataatactgg tttcttagac gtcaggtggc acttttcggg gaaatgtgcg cggaacccct   2640
atttgtttat ttttctaaat acattcaaat atgtatccgc tcatgagaca ataaccctga   2700
taaatgcttc aataatattg aaaaaggaag agtatgagta ttcaacattt ccgtgtcgcc   2760
cttattccct tttttgcggc attttgcctt cctgtttttg ctcacccaga aacgctggtg   2820
aaagtaaaag atgctgaaga tcagttgggt gcacgagtgg gttacatcga actggatctc   2880
aacagcggta agatccttga gttttcgc   cccgaagaac gttttccaat gatgagcact   2940
tttaaagttc tgctatgtgg cgcggtatta tcccgtattg acgccgggca agagcaactc   3000
ggtcgccgca tacactattc tcagaatgac ttggttgagt actcaccagt cacagaaaag   3060
catcttacgg atggcatgac agtaagagaa ttatgcagtg ctgccataac catgagtgat   3120
aacactgcgg ccaacttact tctgacaacg atcggaggac cgaaggagct aaccgctttt   3180
ttgcacaaca tggggggatca tgtaactcgc cttgatcgtt gggaaccgga gctgaatgaa   3240
gccataccaa acgacgagcg tgacaccacg atgcctgtag caatggcaac aacgttgcgc   3300
aaactattaa ctggcgaact acttactcta gcttcccggc aacaattaat agactggatg   3360
gaggcggata aagttgcagg accacttctg cgctcggccc ttccggctgg ctggtttatt   3420
gctgataaat ctggagccgg tgagcgtggg tctcgcggta tcattgcagc actggggcca   3480
gatggtaagc cctcccgtat cgtagttatc tacacgacgg ggagtcaggc aactatggat   3540
gaacgaaata gacagatcgc tgagataggt gcctcactga ttaagcattg gtaactgtca   3600
gaccaagttt actcatatat actttagatt gatttaaaac ttcattttta atttaaaagg   3660
atctaggtga agatccttt  tgataatctc atgaccaaaa tcccttaacg tgagttttcg   3720
ttccactgag cgtcagaccc cgtagaaaag atcaaaggat cttcttgaga tccttttttt   3780
ctgcgcgtaa tctgctgctt gcaaacaaaa aaaccaccgc taccagcggt ggtttgtttg   3840
ccggatcaag agctaccaac tcttttttcg aaggtaactg gcttcagcag agcgcagata   3900
ccaaatactg tccttctagt gtagccgtag ttaggccacc acttcaagaa ctctgtagca   3960
ccgcctacat acctcgctct gctaatcctg ttaccagtgg ctgctgccag tggcgataag   4020
tcgtgtctta ccgggttgga ctcaagacga tagttaccgg ataaggcgca gcggtcgggc   4080
tgaacggggg gttcgtgcac acagcccagc ttggagcgaa cgacctacac cgaactgaga   4140
tacctacagc gtgagctatg agaaagcgcc acgcttcccg aagggagaaa ggcggacagg   4200
tatccggtaa gcggcagggt cggaacagga gagcgcacga gggagcttcc agggggaaac   4260
gcctggtatc tttatagtcc tgtcgggttt cgccacctct gacttgagcg tcgatttttg   4320
tgatgctcgt caggggggcg gagccatgg  aaaaacgcca gcaacgcggc cttttacgg   4380
ttcctggcct tttgctggcc ttttgctcac atgttctttc ctgcgttatc ccctgattct   4440
gtggataacc gtattaccgc ctttgagtga gctgataccg ctcgccgcag ccgaacgacc   4500
gagcgcagcg agtcagtgag cgaggaagcg gaagagcgcc caatacgcaa accgcctctc   4560
cccgcgcgtt ggccgattca ttaatgcagc agctgcgc   tcgctcgctc actgaggccg   4620
cccgggcaaa gcccgggcgt cgggcgacct ttggtcgccc ggcctcagtg agcgagcgag   4680
cgcgcagaga gggagtggcc aactccatca ctaggggttc cttgtagtta atgattaacc   4740
cgccatgcta cttatctacg tagccatgct ctaggacatt gattattgac tagtggagtt   4800
ccgcgttaca taacttacgg taaatggccc gcctggctga ccgcccaacg acccccgccc   4860
attgacgtca ataatgacgt atgttcccat agtaacgcca atagggactt tccattgacg   4920
tcaatgggtg gagtatttac ggtaaactgc ccacttggca gtacatcaag tgtatcatat   4980
gccaagtacg ccccctattg acgtcaatga cggtaaatgg cccgcctggc attatgccca   5040
gtacatgacc ttatgggact ttcctacttg gcagtacatc tacgtattag tcatcgctat   5100
taccatggtc gaggtgagcc ccacgttctg cttcactctc cccatctccc ccccctccc   5160
acccccaatt ttgtatttat ttatttttta attattttgt gcagcgatgg gggcggggg   5220
gggggggggc gcgcgccagg cggggcgggg cgggcgaggc ggcggggcgg ggcgaggcgg   5280
agaggtgcgg cggcagccaa tcagagcggc gcgctccgaa agtttccttt tatggcgagg   5340
cggcggcggc ggcggcccta taaaaagcga agcgcgcggc gggcgggagt cgctgcgcgc   5400
tgccttcgcc ccgtgccccg ctccgccgcc gcctcgcgcc gcccgccccg gctctgactg   5460
accgcgttac taaaacaggt aagtccggcc tccgcgccgg gttttggcgc ctcccgcggg   5520
cgcccccctc ctcacggcga gcgctgccac gtcagacgaa gggcgcagcg agcgtcctga   5580
tccttccgcc cggacgctca ggacagcggc ccgctgctca taagactcgg ccttagaacc   5640
ccagtatcag cagaaggaca ttttaggacg ggacttgggt gactctaggg cactggtttt   5700
ctttccagag agcggaacag gcgaggaaaa gtagtcccct ctcggcgatt ctgcggaggg   5760
atctccgtgg ggcggtgaac gccgatgatg cctctactaa ccatgttcat gttttctttt   5820
tttttctaca ggtcctgggt gacgaacagg gtaccgccac catgagggc  atgaagctgc   5880
tgggggcgct gctggcactg gcggccctac tgcaggggc  cgtgtccctg aagatcgcag   5940
ccttcaacat ccagacattt ggggagacca agatgtccaa tgccaccctc gtcagctaca   6000
ttgtgcagat cctgagccgc tatgacatcg ccctggtcca ggaggtcaga gacagccacc   6060
```

```
tgactgccgt ggggaagctg ctggacaacc tcaatcagga tgcaccagac acctatcact    6120
acgtggtcag tgagccactg ggacggaaca gctataagga gcgctacctg ttcgtgtaca    6180
ggcctgacca ggtgtctgcg gtggacagct actactacga tgatggctgc gagccctgcg    6240
ggaacgacac cttcaaccga gagccagcca ttgtcaggtt cttctcccgg ttcacagagg    6300
tcagggagtt tgccattgtt cccctgcatg cggccccggg ggacgcagta gccgagatcg    6360
acgctctcta tgacgtctac ctggatgtcc aagagaaatg gggcttggag gacgtcatgt    6420
tgatgggcga cttcaatgcg ggctgcagct atgtgagacc ctccagtgg tcatccatcc    6480
gcctgtggac aagccccacc ttccagtggc tgatccccga cagcgctgac accacagcta    6540
cacccacgca ctgtgcctat gacaggatcg tggttgcagg gatgctgctc cgaggcgcac    6600
ttgttcccga ctccggctct cccctttaact tccaggctgc ctatggcctg agtgaccaac    6660
tggcccaagc catcagtgac cactatccag tggaggtgat gctgaagggc ggatcaggcg    6720
gatcacccaa atcttgtgac aaaactcaca catgcccacc gtgcccagca cctgaactcc    6780
tggggggacc gtcagtcttc ctcttccccc caaaacccaa ggacaccctc atgatctccc    6840
ggacccctga ggtcacatgc gtggtggtgg acgtgagcca cgaagaccct gaggtcaagt    6900
tcaactggta cgtggacggc gtggaggtgc ataatgccaa gacaaagccg cgggaggagc    6960
agtacaacag cacgtaccgt gtggtcagcg tcctcaccgt cctgcaccag gactggctga    7020
atggcaagga gtacaagtgc aaggtctcca acaaagcccc cagccccc atcgagaaaa    7080
ccatctccaa agccaaaggg cagccccgag aaccacaggt gtacaccctg cccccatccc    7140
gggaggagat gaccaagaac caggtcagcc tgacctgcct ggtcaaaggc ttctatccca    7200
gcgacatcgc cgtggagtgg gagagcaatg ggcagccgga gaacaactac aagaccacgc    7260
ctcccgtgct ggactccgac ggctccttct tcctctacag caagctcacc gtggacaaga    7320
gcaggtggca gcaggggaac gtcttctcat gctccgtgat gcatgaggct ctgcacaacc    7380
actacacgca gaagagcctc tccctgtctc cgggtaaata g                       7421

SEQ ID NO: 8            moltype = DNA   length = 9284
FEATURE                 Location/Qualifiers
source                  1..9284
                        mol_type = other DNA
                        organism = synthetic construct
SEQUENCE: 8
ttctagaata atcaacctct ggattacaaa atttgtgaaa gattgactgg tattcttaac     60
tatgttgctc cttttacgct atgtggatac gctgctttaa tgcctttgta tcatgctatt    120
gcttcccgta tggctttcat tttctcctcc ttgtataaat cctggttgct gtctctttat    180
gaggagttgt ggcccgttgt caggcaacgt ggcgtggtgt gcactgtgtt tgctgacgca    240
accccactg gttgggcat tgccaccacc tgtcagctcc tttcgggac tttcgctttc    300
cccctcccta ttgccacggc ggaactcatc gccgcctgcc ttgcccgctg ctggacaggg    360
gctcggctgt tgggcactga caattccgtg gtgttgtcgg ggaaatcatc gtcctttcct    420
tggctgctcg cctgtgttgc cacctggatt ctgcgcggga cgtccttctg ctacgtccct    480
tcggccctca atccagcgga ccttccttcc cgcggcctgc tgccggctct gcggcctctt    540
ccgcgtcttc gccttcgccc tcagacgagt cggatctccc tttgggccgc ctccccgcct    600
aagcttatcg ataccgtcga gatcaacttg gtttattgca gcttataatg gttacaaata    660
aagcaatagc atcacaaatt tcacaaataa agcatttttt tcactgcatt ctagttgtgg    720
tttgtccaaa ctcatcaatg tatcttatca tgtctgtata cctgaactcg a ctagagcatg    780
gctacgtaga taagtagcat ggcgggttaa tcattaacta caaggaaccc ctagtgatgg    840
agttggccac tccctctctg cgcgctcgct cgctcactga ggccgggcga ccaaaggtcg    900
cccgacgccc gggctttgcc cgggcggcct cagtgagcga gcgagcgcgc agctggcgt    960
aatagcgaag aggcccgcac cgatcgccct tcccaacagt tgcgcagcct gaatggcgaa    1020
tggaattcca gacgattgag cgtcaaaatg taggtatttc catgagcgtt tttcctgttg    1080
caatggctgg cggtaatatt gttctggata ttaccagcaa ggccgatagt ttgagttctt    1140
ctactcaggc aagtgatgtt attactaatc aaagaagtat tgcgacaacg gttaatttgc    1200
gtgatgaaca gactctttta ctcggtggcc tcactgatta taaaaacact tctcaggatt    1260
ctggcgtacc gttcctgtct aaaatccctt taatcggcct cctgtttagc tcccgctctg    1320
attctaacga ggaaagcacg ttatacgtgt ccgtcaaagc aaccatagta cgcgcccgt    1380
agcggcgcat taagcgcggc gggtgtggtg gttacgcgca gcgtgaccgc tacacttgcc    1440
agcgccctag cgcccgctcc tttcgctttc ttcccttcct ttctcgccac gttcgccggc    1500
tttccccgtc aagctctaaa tcgggggctc cctttagggt tccgatttag tgctttacgg    1560
cacctcgacc ccaaaaaact tgattagggt gatggttcac gtagtgggcc atcgccctga    1620
tagacggttt ttcgcccttt gacgttggag tccacgttct ttaatagtgg actcttgttc    1680
caaactggaa caacactcaa ccctatctcg gtctattctt ttgatttata agggattttg    1740
ccgatttcgg cctattggtt aaaaaatgag ctgatttaac aaaaatttaa cgcgaatttt    1800
aacaaaatat taacgtttac aatttaaata tttgcttata caatcttcct gttttggg    1860
ctttttctgat tatcaaccgg ggtacatatg attgacatgc tagttttacg attaccgttc    1920
atcgattctc ttgtttgctc cagactctca ggcaatgacc tgatagcctt tgtagagacc    1980
tctcaaaaat agctaccctc tccggcatga atttatcagc tagaacggtt gaatatcata    2040
ttgatggtga tttgactgtc tccggccttt ctcacccgtt tgaatcttta cctacacatt    2100
actcaggcat tgcatttaaa atatatgagg gttctaaaaa tttttatcct tgcgttgaaa    2160
taaaggcttc tcccgcaaaa gtattacagg gtcataatgt ttttggtaca accgatttag    2220
ctttatgctc tgaggcttta ttgcttaatt ttgctaattc tttgccttgc ctgtatgatt    2280
tattggatgt tggaattcct gatgcggtat tttctcctta cgcatctgtg cggtatttca    2340
caccgcatat ggtgcactct cagtacaatc tgctctgatg ccgcatagtt aagccagccc    2400
cgacacccgc caacacccgc tgacgcgccc tgacgggctt gtctgctccc ggcatccgct    2460
tacagacaag ctgtgaccgt ctccgggagc tgcatgtgtc agaggttttc accgtcatca    2520
ccgaaacgcg cgagacgaaa gggcctcgtg atacgcctat ttttataggt taatgtcatg    2580
ataataatgg tttcttagac gtcaggtggc acttttcggg gaaatgtgcg cggaacccct    2640
atttgtttat ttttctaaat acattcaaat atgtatccgc tcatgagaca ataaccctga    2700
taaatgcttc aataatattg aaaaaggaag agtatgagta ttcaacattt ccgtgtcgcc    2760
cttattccct tttttgcggc attttgcctt cctgtttttg ctcacccaga aacgctggtg    2820
aaagtaaaag atgctgaaga tcagttgggt gcacgagtgg gttacatcga actggatctc    2880
aacagcggta agatccttga gagttttcgc cccgaagaac gttttccaat gatgagcact    2940
```

```
tttaaagttc tgctatgtgg cgcggtatta tcccgtattg acgccgggca agagcaactc   3000
ggtcgccgca tacactattc tcagaatgac ttggttgagt actcaccagt cacagaaaag   3060
catcttacgg atggcatgac agtaagagaa ttatgcagtg ctgccataac catgagtgat   3120
aacactgcgg ccaacttact tctgacaacg atcggaggac cgaaggagct aaccgctttt   3180
ttgcacaaca tgggggatca tgtaactcgc cttgatcgtt gggaaccgga gctgaatgaa   3240
gccataccaa acgacgagcg tgacaccacg atgcctgtag caatggcaac aacgttgcgc   3300
aaactattaa ctggcgaact acttactcta gcttcccggc aacaattaat agactggatg   3360
gaggcggata aagttgcagg accacttctg cgctcggccc ttccggctgg ctggtttatt   3420
gctgataaat ctggagccgg tgagcgtggg tctcgcggta tcattgcagc actggggcca   3480
gatggtaagc cctcccgtat cgtagttatc tacacgacgg ggagtcaggc aactatggat   3540
gaacgaaata gacagatcgc tgagataggt gcctcactga ttaagcattg gtaactgtca   3600
gaccaagttt actcatatat actttagatt gatttaaaac ttcattttta atttaaaagg   3660
atctaggtga agatccttt tgataatctc atgaccaaaa tcccttaacg tgagttttcg   3720
ttccactgag cgtcagaccc cgtagaaaag atcaaaggat cttcttgaga tccttttttt   3780
ctgcgcgtaa tctgctgctt gcaaacaaaa aaaccaccgc taccagcggt ggtttgtttg   3840
ccggatcaag agctaccaac tctttttccg aaggtaactg gcttcagcag agcgcagata   3900
ccaaatactg tccttctagt gtagccgtag ttaggccacc acttcaagaa ctctgtagca   3960
ccgcctacat acctcgctct gctaatcctg ttaccagtgg ctgctgccag tggcgataag   4020
tcgtgtctta ccgggttgga ctcaagacga tagttaccgg ataaggcgca gcggtcgggc   4080
tgaacggggg gttcgtgcac acagcccagc ttggagcgaa cgacctacac cgaactgaga   4140
tacctacagc gtgagctatg agaaagcgcc acgcttcccg aagggagaaa ggcggacagg   4200
tatccggtaa gcggcagggt cggaacagga gagcgcacga gggagcttcc agggggaaac   4260
gcctggtatc tttatagtcc tgtcgggttt cgccacctct gacttgagcg tcgatttttg   4320
tgatgctcgt cagggggggcg gagcctatgg aaaaacgcca gcaacgcggc ctttttacgg   4380
ttcctggcct tttgctggcc ttttgctcac atgttctttc ctgcgttatc ccctgattct   4440
gtggataacc gtattaccgc ctttgagtga gctgataccg ctcgccgcag ccgaacgacc   4500
gagcgcagcg agtcagtgag cgaggaagcg gaagagcgcc caatacgcaa accgcctctc   4560
cccgcgcgtt ggccgattca ttaatgcagc agctgcgcgc tcgctcgctc actgaggccg   4620
cccgggcaaa gcccgggcgt cgggcgacct ttggtcgccc ggcctcagtg agcgagcgag   4680
cgcgcagaga gggagtggcc aactccatca ctaggggttc cttgtagtta atgattaacc   4740
cgccatgcta cttatctacg tagccatgct ctaggacatt gattattgac tagtggagtt   4800
ccgcgttaca taacttacgg taaatggccc gcctggctga ccgcccaacg accccgcgcc   4860
attgacgtca ataatgacgt atgttcccat agtaacgcca atagggactt tccattgacg   4920
tcaatgggtg gagtatttac ggtaaactgc ccacttggca gtacatcaag tgtatcatat   4980
gccaagtacg cccctattg acgtcaatga cggtaaatgg cccgcctggc attatgccca   5040
gtacatgacc ttatgggact ttcctacttg gcagtacatc tacgtattag tcatcgctat   5100
taccatggtc gaggtgagcc ccacgttctg cttcactctc cccatctccc cccctcccc   5160
accccccaatt ttgtatttat ttattttta attatttgt gcagcgatgg gggcgggggg   5220
ggggggggc gcgcgccagg cggggcgggg cggggcgagg ggcggggcgg ggcgaggcgg   5280
agaggtgcgg cggcagccaa tcagagcggc gcgctccgaa agtttccttt tatggcgagg   5340
cggcggcggc ggcggcccta taaaaagcga agcgcgcggc gggcgggagt cgctgcgcgc   5400
tgccttcgcc ccgtgccccg ctccgccgcc gcctcgcgcc gcccgccccg gctctgactg   5460
accgcgttac taaaacaggt aagtccggcc tccgcgccgg gttttggcgc ctcccgcggg   5520
cgccccctc ctcacggcga gcgctgccac gtcagacgaa gggcgcagcg agcgtcctga   5580
tccttccgcc cggacgctca ggacagcggc ccgctgctca taagactcgg ccttagaacc   5640
ccagtatcag cagaaggaca ttttaggacg ggacttgggt gactctaggg cactggtttt   5700
ctttccagag agcggaacag gcgaggaaaa gtagtccctt ctcggcgatt ctgcggaggg   5760
atctccgtgg ggcggtgaac gccgatgatg cctctactaa ccatgttcat gttttcttt   5820
tttttctaca ggtcctgggt gacgaacagg gtaccgccac cgccagaccc tgccgtgcat   5880
ttattttggg ggcggcctgc tgccgtttgg catgctgtgc gcgagcagca ccaccaaatg   5940
caccgtggca catgaagtgg cggattgcag ccatctgaaa ctgacccagg tgccgagga   6000
tctgccgacc aacattaccg tgctgaacct gacccataac cagctgcgcc gcctgccgga   6060
ggcgaacttt acccgctata gccagctgac cagcctggat gtgggctta acaccattag   6120
caaactggaa ccggaactgt gccagaaact gccgatgctg aaagtgctga acctgcagca   6180
taaccaactg agccagctga gcgataaaac ctttgcgttt gccaccaacc tgaccgaact   6240
gcatctgatg agcaacagca ttcagaaaat taaaaacaac ccgtttgtga acagaaaaa   6300
cctgattacc ctggatctga gccataacgg cctgagcagc accaaactgg cacccaggt   6360
gcagctggaa aacctgcagg aactgctgct gagcaacaac aaaattcagg cgctgaaaag   6420
cgagaactg gatatttttg cgaacagcag cctgaaaaaa ctggaactga gcagcaacca   6480
gattaaagaa tttagccgg gctgctttca tgcgattggc cgcctgtttg gctgttttct   6540
gaacaacgtg cagctgggcc gagcctgac cgaaaaactg tgcctggaac tggcgaacac   6600
cagcattcgc aacctgagcc tgagcaacag ccagctgagc accaccagca acaccacctt   6660
tctgggcctg aaatggacca acctgaccat gctggatctg agctataaca acctgaacgt   6720
ggtgggcaac gatagctttc cgtggctgcc gcagctggaa tatttttttc tggaatataa   6780
caacattcag catctgttta gccatagcct gcatgcctg tttaacgtgc gctatctgaa   6840
cctgaaacgc agctttacca aacagagcat tagcctggcg agcctgccga aaattgatga   6900
ttttagcttt cagtggctga aatgcctgga acatctgaac atggaagata cgatattcc   6960
gggcattaaa agcaacatgt ttaccggcct gattaacctg aaatatctga gcctgagcaa   7020
cagctttacc agcctgcgca ccctgaccaa cgaaaccttt gtgagcctgg cgcatagccc   7080
gctgcatatt ctgaacctga ccaaaaacaa aattagcaaa attgaaagcg atgcgtttag   7140
ctggctgggc catctggaag tgctggatct gggcctgaac gaaattggcc aggaactgac   7200
cggccaggaa tggcgcggcc tggaaaacat ttttgaaatt tatctgagct ataacaaata   7260
tctgcagctg acccgcaaca gctttgcgct ggtgccgagc ctgcagcgcc tgatgctgcg   7320
ccgcgtgggc tgaaaaacg tggatagcag ccgcagccgc ttcagcgcc tgcgcaacct   7380
gaccattctg gatctgagca caacaacat tgcgaacatt aacgatgata tgctgaaggg   7440
cctggaaaaa ctggaaattc tggatctgca gcataacaac ctggcgcgcc tgtgaaaaca   7500
tgcgaacccg ggcggcccga tttatttctt gaaaggcctg agccatcgc atattctgaa   7560
cctgaaaagc aacggctttg atgaaattcc ggtggaagtg tttaaagatc tgtttgaact   7620
gaaaattatt gatctgggcc tgaacaacct gaacaccctg ccggcgagcg tgtttaacaa   7680
```

```
ccaggtgagc ctgaaaagcc tgaacctgca gaaaaacctg attaccagcg tggaaaaaaa    7740
agtgtttggc ccggcgtttc gcaacctgac cgaactggat atgcgcttta acccgtttga    7800
ttgcacctgc gaaagcattg cgtggtttgt gaactggatt aacgaaaccc ataccaacat    7860
tccgaactg  agcagccatt atctgtgcaa cacccccgcg cattatcatg ctttccggt     7920
gcgcctgttt gataccagca gctgcaaaga tagcgcgccg tttgaactgt tttttatgat    7980
taacaccagc attctgctga ttttatttt  tattgtgctg ctgattcatt ttgaaggctg    8040
gcgcattagc ttttattgga acgtgagcgt gcatcgcgtg ctgggcttta agaaattga    8100
tcgccagacc gaacagtttg aatatgcggc gtatattatt catgcgtata agataaaga    8160
ttgggtgtgg gaacattta  gcagcatgga aaaagaagat cagagcctga aattttgcct    8220
ggaagaacgc gattttgaag cgggcgtgtt tgaactggaa gcgattgtga acagcattaa    8280
acgcagccgc aaaattattt ttgtgattac ccatcatctg ctgaaagatc cgctgtgcaa    8340
acgctttaaa gtgcatcatg cggtgcagca ggcgattgaa cagaacctgg atagcattat    8400
tctggtgttt ctggaagaaa ttccggatta taaactgaac catgcgctgt gcctgcgccg    8460
cggcatgttt aaaagccatt gcattctgaa ctggccggtg cagaaagaac gcattgatga    8520
gtttcgccat aaactgcagg tggcgctggg cagcaaaaac agcgtgcatg gcggatcag    8580
gcggatcacc caaatcttgt gacaaaactc acacatgccc accgtgccca gcacctgaac    8640
tcctgggggg accgtcagtc ttcctcttcc ccccaaaacc caaggacacc ctcatgatct    8700
cccggacccc tgaggtcaca tgcgtggtgg tggacgtgag ccacgaagac cctgaggtca    8760
agttcaactg gtacgtggac ggcgtggagg tgcataatgc caagacaaag ccgcggagg    8820
agcagtacaa cagcacgtac cgtgtggtca gcgtcctcac cgtcctgcac caggactggc    8880
tgaatggcaa ggagtacaag tgcaaggtct ccaacaaagc cctcccagcc cccatcgaga    8940
aaaccatctc caaagccaaa gggcagcccc gagaaccaca ggtgtacacc ctgcccccat    9000
cccgggagga tgatgaccaag aaccaggtca gcctgacctg cctggtcaaa ggcttctatc    9060
ccagcgacat cgccgtggag tgggagagca atgggcagcc ggagaacaac tacaagacca    9120
cgcctcccgt gctggactcc gacggctcct tcttcctcta cagcaagctc accgtggaca    9180
agagcaggtg gcagcagggg aacgtcttct catgctccgt gatgcatgag gctctgcaca    9240
accactacac gcagaagagc ctctccctgt ctccgggtaa atag                     9284

SEQ ID NO: 9            moltype = DNA   length = 9738
FEATURE                 Location/Qualifiers
source                  1..9738
                        mol_type = other DNA
                        organism = synthetic construct
SEQUENCE: 9
ttctagaata atcaacctct ggattacaaa atttgtgaaa gattgactgg tattcttaac     60
tatgttgctc cttttacgct atgtggatac gctgctttaa tgcctttgta tcatgctatt   120
gcttcccgta tggctttcat tttctcctcc ttgtataaat cctggttgct gtctctttat   180
gaggagttgt ggcccgttgt caggcaacgt ggcgtggtgt gcactgtgtt tgctgacgca   240
accccactg  gttggggcat tgccaccacc tgtcagctcc tttccgggac tttcgctttc   300
cccctcccta ttgccacggc ggaactcatc gccgcctgcc ttgcccgctg ctggacaggg   360
gctcggctgt tgggcactga caattccgtg gtgttgtcgg ggaaatcatc gtcctttcct   420
tggctgctcg cctgtgttgc cacctggatt ctgcgcggga cgtccttctg ctacgtccct   480
tcggccctca atccagcgga ccttccttcc cgcggcctgc tgccggctct gcggcctcttc   540
ccgcgtcttc gccttcgccc tcagacgagt cggatctccc tttgggccgc ctccccgcct   600
aagcttatcg ataccgtcga gatcaactt  gtttattgca gcttataatg gttacaaata   660
aagcaatagc atcacaaatt tcacaaataa agcatttttt tcactgcatt ctagttgtgg   720
tttgtccaaa ctcatcaatg tatcttatca tgtctggatc taacctcga ctagagcatg   780
gctacgtaga taagtagcat ggcgggttaa tcattaacta caaggaaccc ctagtgatgg   840
agttggccac tccctctctg cgcgctcgct cgctcactga ggccgggcga ccaaaggtcg   900
cccgacgccc gggctttgcc cgggcggcct cagtgagcga gcgagcgcgc cagctggcgt   960
aatagcgaag aggcccgcac cgatcgccct cccaacagt  tgcgcagcct gaatggcgaa  1020
tggaattcca gacgattgag cgtcaaaatg taggtatttc catgagcgtt tttcctgttg  1080
caatggctgg cggtaaatatt gttctggata ttaccagcaa ggccgatagt ttgagttctt  1140
ctactcaggc aagtgatgtt attactaatc aaagaagtat tgcgacaacg gttaatttgc  1200
gtgatgaaca gactctttta ctcggtggcc tcactgatta taaaaacact tctcaggatt  1260
ctggcgtacc gttcctgtct aaaatcccct taatcggcct cctgtttagc tcccgctctg  1320
attctaacga ggaaagcacg ttatacgtgt cgtcaaagc  aaccatagta cgcgccctgt  1380
agcggcgcat taagcgcggc gggtgtggtg gttacgcgca gcgtgaccgc tacacttgcc  1440
agcgccctag cgcccgctcc tttcgctttc ttcccttcct ttctcgccac gttcgccggc  1500
tttccccgtc aagctctaaa tcggggctc  cctttagggt tccgatttag tgctttacgg  1560
cacctcgacc ccaaaaaact tgattagggt gatggttcac gtagtgggcc atcgccctga  1620
tagacgtttt ttcgcccttt gacgttggag tccacgttct ttaatagtgg actcttgttc  1680
caaactggaa caacactcaa ccctatctcg gtctattctt ttgatttata agggatttg   1740
ccgatttcgg cctattggtt aaaaaatgag ctgatttaac aaaaatttaa cgcgaattt   1800
aacaaaatat taacgtttac aatttaaata tttgcttata caatcttcct gttttggg   1860
cttttctgat tatcaaccgg ggtacatatg attgacatgc tagttttacg attaccgttc  1920
atcgattctc ttgtttgctc cagactctca ggcaatgacc tgatagcctt tgtagagacc  1980
tctcaaaaat agtaccctc  tccggcatga atttatcagc taagaacggt gaatatcata  2040
ttgatggtga tttgactgtc tccggccttt ctcaccgttt tgaatcttta cctacacatt  2100
actcaggcat tgcatttaaa atatatgagg gttctaaaaa tttttatcct tgcgttgaaa  2160
taaaggcttc tcccgcaaaa gtattacagg gtcataatgt ttttggtaca accgatttag  2220
ctttatgctc tgaggcttta ttgcttaatt ttgctaattc tttgccttgc ctgtatgatt  2280
tattggatgt tggaattcct gatgcggtat ttcctcttga cgcatctgtg cggtatttca  2340
caccgcatat ggtgcactct cagtacaatc tgctctgatg ccgcatagtt aagccagccc  2400
cgacacccgc caacacccgc tgacgcgccc tgacgggcct gtctgctccc ggcatccgct  2460
tacagacaag ctgtgaccgt ctccgggagc tgcatgtgtc agaggttttc accgtcatca  2520
ccgaaacgcg cgagacgaaa gggcctcgtg atacgcctat ttttataggt taatgtcatg  2580
ataataatgg tttcttagac gtcaggtggc acttttcggg gaaatgtgcg cggaacccct  2640
atttgtttat ttttctaaat acattcaaat atgtatccgc tcatgagaca ataaccctga  2700
```

```
taaatgcttc aataatattg aaaaaggaag agtatgagta ttcaacattt ccgtgtcgcc  2760
cttattccct tttttgcggc attttgcctt cctgttttg ctcacccaga acgctggtg   2820
aaagtaaaag atgctgaaga tcagttgggt gcacgagtgg gttacatcga actggatctc  2880
aacagcggta agatccttga gagttttcgc cccgaagaac gttttccaat gatgagcact  2940
tttaaagttc tgctatgtgg cgcggtatta tcccgtattg acgccgggca agagcaactc  3000
ggtcgccgca tacactattc tcagaatgac ttggttgagt actcaccagt cacagaaaag  3060
catcttacgg atggcatgac agtaagagaa ttatgcagtg ctgccataac catgagtgat  3120
aacactgcgg ccaacttact tctgacaacg atcggaggac cgaaggagct aaccgctttt  3180
ttgcacaaca tgggggatca tgtaactcgc cttgatcgtt gggaaccgga gctgaatgaa  3240
gccataccaa acgacgagcg tgacaccacg atgcctgtag caatggcaac aacgttgcgc  3300
aaactattaa ctggcgaact acttactcta gcttcccggc aacaattaat agactggatg  3360
gaggcggata agttgcagg accacttctg cgctcggccc ttccggctgg ctggtttatt   3420
gctgataaat ctggagccgg tgagcgtggg tctcgcggta tcattgcagc actggggcca  3480
gatggtaagc cctcccgtat cgtagttatc tacacgacgg ggagtcaggc aactatggat  3540
gaacgaaata gacagatcgc tgagataggt gcctcactga ttaagcattg gtaactgtca  3600
gaccaagttt actcatatat actttagatt gatttaaaac ttcattttta atttaaaagg  3660
atctaggtga agatcctttt tgataatctc atgaccaaaa tcccttaacg tgagttttcg  3720
ttccactgag cgtcagaccc cgtagaaaag atcaaaggat cttcttgaga tcctttttt   3780
ctgcgcgtaa tctgctgctt gcaaacaaaa aaaccaccgc taccagcggt ggtttgtttg  3840
ccggatcaag agctaccaac tctttttccg aaggtaactg gcttcagcag agcgcagata  3900
ccaaatactg tccttctagt gtagccgtag ttaggccacc acttcaagaa ctctgtagca  3960
ccgcctacat acctcgctct gctaatcctg ttaccagtgg ctgccgcca tggcgataag  4020
tcgtgtctta ccgggttgga ctcaagacga tagttaccgg ataaggcgca gcggtcgggc  4080
tgaacggggg gttcgtgcac acagcccagc ttggagcgaa cgacctacac cgaactgaga  4140
tacctacagc gtgagctatg agaaagcgcc acgcttcccg aagggagaaa ggcggacagg  4200
tatccggtaa gcggcagggt cggaacagga gagcgcacga gggagcttcc agggggaaac  4260
gcctggtatc tttatagtcc tgtcgggttt cgccacctct gacttgagcg tcgatttttg  4320
tgatgctcgt caggggggcg gagcctatgg aaaaacgcca gcaacgcggc ctttttacgg  4380
ttcctggcct tttgctggcc ttttgctcac atgttctttc ctgcgttatc ccctgattct  4440
gtggataacc gtattaccgc ctttgagtga gctgataccg ctcgccgcag ccgaacgacc  4500
gagcgcagcg agtcagtgag cgaggaagcg gaagagcgcc caatacgcaa accgcctctc  4560
cccgcgcgtt ggccgattca ttaatgcagc agctgcgcgc tcgctcgctc actgaggccg  4620
cccgggcaaa gcccgggcgt cgggcgacct ttggtcgccc ggcctcagtg agcgagcgag  4680
cgcgcagaga gggagtggcc aactccatca ctaggggttc cttgtagtta atgattaacc  4740
cgccatgcta cttatctacg tagccatgct ctaggacatt gattattgac tagtggagtt  4800
ccgcgttaca taacttacgg taaatggccc gcctggctga ccgcccaacg accccccgcc  4860
attgacgtca ataatgacgt atgttcccat agtaacgcca atagggactt tccattgacg  4920
tcaatggggt gagtatttac ggtaaactgc ccacttggca gtacatcaag tgtatcatat  4980
gccaagtacg ccccctattg acgtcaatga cggtaaatgg cccgcctggc attatgccca  5040
gtacatgacc ttatgggact ttcctacttg gcagtacatc tacgtattag tcatcgctat  5100
taccatggtc gaggtgagcc ccacgttctg cttcactctc cccatctccc cccctcccc   5160
accccaatt ttgtatttat ttatttttta attatttgt gcagcgatgg gggcgggggg    5220
gggggggggc gcgcgccagg cgggggcgggg cggggcggg gggcggaggcgg           5280
agaggtgcgg cggcagccaa tcagagcggc gcgctccgaa agtttccttt tatggcgagg  5340
cggcggcggc ggcggcccta taaaaagcga agcgcgcggc gggcgggagt cgctgcgcgc  5400
tgccttcgcc ccgtgcccg ctccgccgcc gcctcgcgcc gcccgccccg ctctgactg   5460
accgcgttac taaaacaggt aagtccggcc tccgcgccag cttttggcgc ctccgcgggg  5520
cgcccccctc ctcacggcga cgcctgccac gtcagacgaa gggcgcagcg agcgtcctga  5580
tccttccgcc cggacgctca ggacagcggc ccgctgctca taagactcgg ccttagaacc  5640
ccagtatcag cagaaggaca ttttaggacg ggacttgggt gactctaggg cactggtttt  5700
ctttccagag agcggaacag gcgaggaaaa gtagtccctt ctcggcgatt ctgcggaggg  5760
atctccgtgg ggcggtgaac gccgatgatg cctctactaa ccatgttcat gttttctttt  5820
ttttctaca ggtcctgggt gacgaacagg gtaccgccac catgagggggc atgaagctgc   5880
tgggggcgct gctggcactg gcggcctac tgcaggggc cgtgtccatg ggcttttgcc    5940
gcagcgcgct gcatccgctg agcctgctgg tgcaggcgat tatgctggcg atgacccctga 6000
cgctgggcac cctgccggcg tttctgccgt gcgaactgca gccgcatggc ctggtgaact  6060
gcaactggct gtttctgaaa agcgtgccgc attttagcat ggcggcgccg cgcggcaacg  6120
tgaccagcct gagcctgagc agcaaccgca ttcatcatct gcatgatagc gattttgcgc  6180
atctccgag cctgcgccat ctgaacctga aatgaactg ccgccggtg ggcctgccga    6240
cgatgcattt tccgtgccat atgaccattg aaccgagcac ctttctgccg gtgccgaccc  6300
tggaagaact gaacctgagc tataacaaca ttatgaccgt gccggcgctg ccgaaaagcc  6360
tgattagcct gagcctgagc cataccaaca ttctgatgct ggatagcgcg agcctggcgg  6420
gcctgcatgc gctgcgcttt ctgtttatgg atggcaactg ctattataaa aacccgtgcc  6480
gccaggcgct ggaagtggcg ccgggcgcgc tgctggcgc gggcaacctg acccatctga  6540
gcctgaaata taaccctg accggtgtgc cgcgcaacct gccgagcagc ctggaatatc   6600
tgctgctgag ctataaccgc attgtgaaac tggcgccgga agatctggcg aacctgaccg  6660
cgctgcgcgt gctggatgtg ggcggcaact gccgccgctg cgatcatgcg ccgaacccgt  6720
gcatgaaatg cccgcgccat tttccgcagc tgcatccgga tacctttagc catctgagcc  6780
gcctggaagg cctggtgctg aaagatagca gctgagctg gctgaacgtg agctggttct   6840
gcggcctggg caacctgcgc gtgctggatc tgagcgaaaa cttttctgtat aaatgcatta  6900
ccaaaaccaa agcgtttcag ggctgagacc agctgcgcaa actgaacctg agcttttaact  6960
atcagaaacg cgtgagcttt gcgcatctga gcctggcgcc gagcttggc agcctggtgg   7020
cgctgaaaga actggatatg catggcattt ttttttcgcag cctggatgaa accaccctgc  7080
gcgctggc gcgcctgcg atgctgcaa ccctgcgcct gcagatgaac tttattaacc    7140
aggcgcagct gggcatttttt cgcgcgtttc cgggcctgcg ctatgtggat ctgagcgata  7200
accgcattag cggcgcgagc gaactgaccg cgaccatggg cgaagcggat ggcggcgaaa  7260
aagtgtggct gcagccgggc gatctggcgc cggcgcggt ggatacccg agcagcgaag    7320
attttcgccc gaactgcagc accctgaact ttaccctgga tctgagccgc aacaacctgg  7380
tgaccgtgca gccggaaatg tttgcgcagc tgagccatct gcagtgcctg cgcctgagcc  7440
```

```
ataactgcat tagccaggcg gtgaacggca gccagtttct gccgctgacc ggcctgcagg   7500
tgctggatct gagccataac aaactggatc tgtatcatga acatagcttt accgaactgc   7560
cgcgcctgga agcgctggat ctgagctata acagccagcc gtttggcatg cagggcgtgg   7620
gccataactt tagctttgtg gcgcatctgc gcaccctgcg ccatctgagc ctggcgcata   7680
acaacattca tagccaggtg agccagcagc tgtgcagcac cagcctgccg gcgctggatt   7740
ttagcggcaa cgcgctgggc catatgtggg cggaaggcga tctgtatctg cattttttc    7800
agggcctgag cggcctgatt tggctggatc tgagccagaa ccgcctgcat accctgctgc   7860
cgcagaccct gcgcaacctg ccgaaaagcc tgcaggtgct gcgcctgcgc gataactatc   7920
tggcgttttt taaatggtgg agcctgcatt ttctgccgaa actggaagtg ctggatctgg   7980
cgggcaacca gctgaaagcg ctgaccaacg gcagcctgcc ggcgggcacc cgcctgcgcc   8040
gcctggatgt gagctgcaac agcattagct ttgtggcgcc gggctttttt agcaaagcga   8100
aagaactgcg cgaactgaac ctgagcgcga acgcgctgaa aaccgtggat catagctggt   8160
ttggcccgct ggcgagcgcg ctgcagattc tggatgtgag cgcgaacccg ctgcattgcg   8220
cgtgcggcgc ggcgtttatg gattttctgc tggaagtgca ggcggcggtg ccgggcctgc   8280
cgagccgcgt gaaatgcggc agcccggggc agctgcaggg cctgagcatt tttgcgcagg   8340
atctgcgcct gtgcctggat gaagcgctga gctgggattg ctttgcgctg agcctgctga   8400
cggtggcgct gggcctgggc gtgccgatgc tgcatcatct gtgcggctgg gatctgtggt   8460
attgctttca tctgtgcctg gcgtggctgc cgtggcgcgg ccgccagagc ggccgcggtg   8520
aagatgcgct gccgtatgat gcgtttgtgg tgtttgataa acccagagc gcggtggcgg    8580
attgggtgta taacgaactg cgcggccagc tggaagaatg ccgcggccgc tgggcgctgc   8640
gcctgtgcct ggaagaacgc gattggctgc cgggcaaaac cctgtttgaa aacctgtggg   8700
cgagcgtgta tggcagccgc aaaaccctgt ttgtgctggc gcataccgat cgcgtgagcg   8760
gcctgctgcg cgcgagcttt ctgctggcgc agcagcgcct gctggaagat cgcaaagatg   8820
tggtggtgct ggtgattctg agcccggatg gccgccgcag ccgctatgtg cgcctgcgcc   8880
agcgcctgtg ccgccagagc gtgctgctgt ggccgcatca gccgagcggc cagcgcagct   8940
tttgggcgca gctgggcatg gcgctgaccc gcgataacca tcattttat aaccgcaact    9000
tttgccaggg cccgaccgcg gaagggcgga tcaggcggat caccccaaatc ttgtgacaaa   9060
actcacacat gcccaccgtg cccagcacct gaactcctgg ggggaccgtc agtcttcctc   9120
ttcccccccaa aacccaagga caccctcatg atctcccgga ccccctgaggt cacatgcgtg   9180
gtggtggacg tgagccacga agaccctgag gtcaagttca actgtacgt ggacggcgtg    9240
gaggtgcata atgccaagac aaagccgcgg gaggagcagt acaacagcac gtaccgtgtg   9300
gtcagcgtcc tcaccgtcct gcaccaggac tggctgaatg gcaaggagta caagtgcaag   9360
gtctccaaca aagccctccc agcccccatc gagaaaacca tctccaaagc caagggcag    9420
ccccgagaac cacaggtgta cacccctgccc ccatcccggg aggagatgac caagaaccag   9480
gtcagcctga cctgcctggt caaaggcttc tatcccagcg acatcgccgt ggagtgggag   9540
agcaatgggc agccggagaa caactacaag accacgcctc ccgtgctgga ctccgacggc   9600
tccttcttcc tctacagcaa gctcaccgtg gacaagagca ggtggcagca ggggaacgtc   9660
ttctcatgct ccgtgatgca tgaggctctg cacaaccact acacgcagaa gagcctctcc   9720
ctgtctccgg gtaaatag                                                 9738

SEQ ID NO: 10         moltype = DNA   length = 7364
FEATURE               Location/Qualifiers
source                1..7364
                      mol_type = other DNA
                      organism = synthetic construct
SEQUENCE: 10
ttctagaata atcaacctct ggattacaaa atttgtgaaa gattgactgg tattcttaac    60
tatgttgctc cttttacgct atgtggatac gctgctttaa tgcctttgta tcatgctatt   120
gcttcccgta tggctttcat tttctcctcc ttgtataaat cctggttgct gtctctttat   180
gaggagttgg gcccgttgt caggcaacgt ggcgtggtgt gcactgtgtt tgctgacgca    240
accccgttg gtggggcat tgccaccacc tgtcagctcc tttccgggac tttcgctttc     300
ccctccccta ttgccacggc ggaactcatc gccgcctgcc ttgcccgctc tggacaggg    360
gctcggctgt tgggcactga caattccgtg gtgttgtcgg ggaaatcatc gtcctttcct   420
tggctgctcg cctgtgttgc cacctggatt ctgcgcggga cgtccttctg ctacgtccct   480
tcggccctca atccagcgga ccttccttcc cgcggcctgc tgccggctct gcggcctcttc   540
ccgcgtcttc gccttcgccc tcagacgagt cggatctccc tttgggccgc ctccccgcct   600
aagcttatcg ataccgtcga gatcaacttg gttattgca gcttataatg gttacaaata    660
aagcaatagc atcacaaatt tcacaaataa agcatttttt tcactgcatt ctagttgtgg   720
tttgtccaaa ctcatcaatg tatcttatca gtctctggatc tgacctcga ctagagcatg   780
gctacgtaga taagtagcat ggcgggttaa tcattaacta caaggaaccc ctagtgatgg   840
agttggccac tccctctctg cgcgctcgct cgctcactga ggccgggcga ccaaaggtcg    900
cccgacgccc gggctttgcc cggcggcct cagtgagcga gcgagcgcgc cagctggcgt    960
aatagcgaag aggcccgcac cgatcgccct tcccaacagt tgcgcagcct gaatggcgaa   1020
tggaattcca gacgattgag cgtcaaaatg taggtatttc catgagcgtt tcctgttca   1080
caatggctgg cggtaatatt gttctggata ttaccagcaa ggccgatagt ttgagttctt   1140
ctactcaggc aagtgatgtt attactaatc aaagaagtat tgcgacaacg gttaatttgc   1200
gtgatggaca gactcttta ctcggtgcc tcactgatta taaaaacact ctcaggatt     1260
ctggcgtacc gttcctgtct aaaatccctt aatcggcctc cctgtttagc tcccgctctg   1320
attctaacga ggaaagcacg ttatacgtgc tcgtcaaagc aaccatagta cgcgccccgt   1380
agcggcgcat taagcgcggc gggtgtggtg gttacgcgca gcgtgaccgc tacacttgcc   1440
agcgccctag cgcccgctcc tttcgctttc ttccccttcct ttctcgccac gttcgccggc   1500
tttccccgtc aagctctaaa tcgggggctc cctttagggt tccgatttag tgctttacgg   1560
cacctcgacc ccaaaaaact tgattagggt gatggttcac gtagtgggcc atcgccctga   1620
tagacggttt ttcgcccttt gacgttggag tccacgttct ttaatagtgg actcttgttc   1680
caaactggaa caacactcaa ccctatctcg gtctattctt ttgatttata agggattttg   1740
ccgatttcgg cctattggtt aaaaaatgag ctgatttaac aaaaatttaa cgcgaatttt   1800
aacaaaatat taacgtttac aatttaaata tttgcttata caatcttcct gtttttgggg   1860
cttttctgat tatcaaccgg ggtacatatg attgacatgc tagttttacg attaccgttc   1920
atcgattctc ttgtttgctc cagactctca ggcaatgacc tgatagcctt tgtagagacc   1980
```

```
tctcaaaaat agctaccctc tccggcatga atttatcagc tagaacggtt gaatatcata  2040
ttgatggtga tttgactgtc tccggccttt ctcacccgtt tgaatcttta cctacacatt  2100
actcaggcat tgcatttaaa atatatgagg gttctaaaaa ttttttatcct tgcgttgaaa  2160
taaaggcttc tcccgcaaaa gtattacagg gtcataatgt ttttggtaca accgatttag  2220
ctttatgctc tgaggcttta ttgcttaatt ttgctaattc tttttgccttgc ctgtatgatt  2280
tattggatgt tggaattcct gatgcggtat tttctcctta cgcatctgtg cggtatttca  2340
caccgcatat ggtgcactct cagtacaatc tgctctgatg ccgcatagtt aagccagccc  2400
cgacacccgc caacacccgc tgacgcgccc tgacgggctt gtctgctccc ggcatccgct  2460
tacagacaag ctgtgaccgt ctccgggagc tgcatgtgtc agaggttttc accgtcatca  2520
ccgaaacgcg cgagacgaaa gggcctcgtg atacgcctat ttttataggt taatgtcatg  2580
ataataatgg tttcttagac gtcaggtggc acttttcggg gaaatgtgcg cggaacccct  2640
atttgtttat ttttctaaat acattcaaat atgtatccgc tcatgagaca ataaccctga  2700
taaatgcttc aataatattg aaaaaggaag agtatgagta ttcaacattt ccgtgtcgcc  2760
cttattccct ttttttgcgg attttgcctt cctgttttttg ctcacccaga aacgctggtg  2820
aaagtaaaag atgctgaaga tcagttgggg gcacgagtgg gttacatcga actggatctc  2880
aacagcggta agatccttga gagttttcgc cccgaagaac gttttccaat gatgagcact  2940
tttaaagttc tgctatgtgg cgcggtatta tcccgtattg acgccgggca agagcaactc  3000
ggtcgccgca tacactattc tcagaatgac ttggttgagt actcaccagt cacagaaaag  3060
catcttacgg atggcatgac agtaagagaa ttatgcagtg ctgccataac catgagtgat  3120
aacactgcgg ccaacttact tctgacaacg atcggaggac cgaaggagct aaccgctttt  3180
ttgcacaaca tgggggatca tgtaactcgc cttgatcgtt gggaaccgga gctgaatgaa  3240
gccataccaa acgacgagcg tgacaccacg atgcctgtag caatggcaac aacgttgcgc  3300
aaactattaa ctggcgaact acttactcta gcttcccggc aacaattaat agactggatg  3360
gaggcggata aagttgcagg accacttctg cgctcggccc ttccggctgg ctggtttatt  3420
gctgataaat ctggagccgg tgagcgtggg tctcgcggta tcattgcagc actggggcca  3480
gatggtaagc cctcccgtat cgtagttatc tacacgacgg gagtcaggc aactatggat  3540
gaacgaaata gacagatcgc tgagataggt gcctcactga ttaagcattg gtaactgtca  3600
gaccaagttt actcatatat actttagatt gatttaaaac ttcatttttta atttaaaagg  3660
atctaggtga agatccttt tgataatctc atgaccaaaa tcccttaacg tgagttttcg  3720
ttccactgag cgtcagaccc cgtagaaaag atcaaaggat cttcttgaga tccttttttt  3780
ctgcgcgtaa tctgctgctt gcaaacaaaa aaaccaccgc taccagcggt ggtttgtttg  3840
ccggatcaag agctaccaac tctttttccg aaggtaactg gcttcagcag agcgcagata  3900
ccaaatactg tccttctagt gtagccgtag ttaggccacc acttcaagaa ctctgtagca  3960
ccgcctacat acctcgctct gctaatcctg ttaccagtgg ctgctgccag tggcgataag  4020
tcgtgtctta ccgggttgga ctcaagacga tagttaccgg ataaggcgca gcggtcgggc  4080
tgaacgggggg gttcgtgcac acagcccagc ttggagcgaa cgacctacac cgaactgaga  4140
tacctacagc gtgagctatg agaaagcgcc acgcttcccg aagggagaaa ggcggacagg  4200
tatccggtaa gcggcagggt cggaacagga gagcgcacga gggagcttcc agggggaaac  4260
gcctggtatc tttatagtcc tgtcgggttt cgccacctct gacttgagcg tcgatttttg  4320
tgatgctcgt caggggggcg gagcctatgg aaaaacgcca gcaacgcggc cttttttacgg  4380
ttcctgtgcct tttgctggcc ttttgctcac atgttcttttc ctgcgttatc ccctgattct  4440
gtggataacc gtattaccgc ctttgagtga gctgataccg ctcgccgcag ccgaacgacc  4500
gagcgcagcg agtcagtgag cgaggaagcg gaagagcgcc caatacgcaa accgcctctc  4560
cccgcgcgtt ggccgattca ttaatgcagc agctgcgcgc tcgctcgctc actgaggccg  4620
cccgggcaaa gcccgggcgt cgggcgacct tggtcgccc ggcctcagtg agcgagcgag  4680
cgcgcagaga gggagtggcc aactccatca ctaggggttc cttgtagtta atgattaacc  4740
cgcgcttgcta cttatctacg tagccatgct ctaggacatt gattattgac tagtggagtt  4800
ccgcgttaca taacttacgg taaatgcccc gcctggctga ccgcccaacg acccccgccc  4860
attgacgtca ataatgacgt atgttcccat agtaacgcca atagggactt tccattgacg  4920
tcaatggtgt gagtatttac ggtaaactgc ccacttggca gtacatcaag tgtatcatat  4980
gccaagtacg cccctattg acgtcaatga cggtaaatgg cccgcctggc attatgccca  5040
gtacatgacc ttatgggact ttcctacttg gcagtacatc tacgtattag tcatcgctat  5100
taccatggtc gaggtgagcc ccacgttctg cttcactctc cccatctccc cccctcccc  5160
acccccaatt ttgtatttat ttattttta attattttgt gcagcgatgg gggcggggg  5220
gggggggc gcgcgccagg cggggcgggg cggggcgagg ggcggggcgg ggcgaggcgg  5280
agaggtgcgg cggcagccaa tcagagcggc gcgctccgaa agtttccttt tatggcgagg  5340
cggcggcggc ggcggcccta taaaagcga agcgcgcggc gggcgggagt cgctgcgcgc  5400
tgccttcgcc ccgtgcccg ctccgccgcc gcctcgcgcc gcccgcccg gctctgactg  5460
accgcgttac taaaacaggt aagtccggcc tccgcgccgg gttttggcgc ctcccgcggg  5520
cgcccccctc ctcacggcga gcgctgccac gtcagacgaa gggcgcagcg agcgtcctga  5580
tccttccgcc cggacgctca ggacagcggc ccgctgctca taagactcgg ccttagaacc  5640
ccagtatcag cagaaggaca ttttaggacg ggacttgggt gactctaggg cactggtttt  5700
cttttccagag agcggaacag gcgaggaaaa gtagtcccctt tccggcgatt ctgcggaggg  5760
atctccgtgg ggcggtgaac gccgatgatg cctctactaa ccatgttcat gttttcttt  5820
tttttctaca ggtcctgggt gacgaacagg gtaccgccac catgaggggc atgaagctgt  5880
tggggggcgct gctggcactg gcggccctac tgcagggggc cgtgtccatg agcatgctgt  5940
tttatcccctt gattaccgcg tttctgattg gcattcaggc ggaaccgcat agcgaaagca  6000
acgtgccggc gggccatacc attccgcagg gcattggac caaactgcag catagcctgg  6060
ataccgcgct gcgccgcgcg cgcagcgcgc cggcggcgcg gattgcggcg cgctggcgg  6120
gccagacccg caacattacc gtggatccgc gcctgtttaa aaaacgccgc ctgcgcagcc  6180
cgcgcgtgct gtttagcacc cagccgccgc gcgaagcggc ggataccag gatctggatt  6240
tgaagtgggg cggcgcggcg ccgtttaacc gcacccatcg cagcaaacgc agcagcagcc  6300
atccgatttt tcatcgcggc gaatttagcg tgtgcgatag cgtgagcgtg tgggtgggcg  6360
ataaaaccac cgcgaccgat attaaaggca aagaagtgat ggtgctgggc gaagtgaaca  6420
ttaacaacag cgtgtttaaa cagtattttt ttgaaaccaa atgccgcgat ccgaacccgg  6480
tggatagcgc ctgccgcggc attgatagca aacattggaa cagctattgc accaccaccc  6540
atacctttgt gaaagcgctg accatggatg gcaaacaggc ggcgtggcgc tttattcgca  6600
ttgataccgc gtgcgtgtgc gtgctgagcc gcaaagcggt gcgccgcgcg gcggatcag  6660
gcggatcacc caaatcttgt gacaaaactc acacatgccc accgtgccca gcacctgaac  6720
```

```
tcctgggggg accgtcagtc ttcctcttcc ccccaaaacc caaggacacc ctcatgatct   6780
cccggacccc tgaggtcaca tgcgtggtgg tggacgtgag ccacgaagac cctgaggtca   6840
agttcaactg gtacgtggac ggcgtggagg tgcataatgc caagacaaag ccgcgggagg   6900
agcagtacaa cagcacgtac cgtgtggtca gcgtcctcac cgtcctgcac caggactggc   6960
tgaatggcaa ggagtacaag tgcaaggtct ccaacaaagc cctcccagcc ccatcgaga   7020
aaaccatctc caaagccaaa gggcagcccc gagaaccaca ggtgtacacc ctgcccccat   7080
cccgggagga tgaccaagaa ccaggtca gcctgacctg cctggtcaaa ggcttctatc    7140
ccagcgacat cgccgtggag tgggagagca atgggcagcc ggagaacaac tacaagacca   7200
cgcctcccgt gctggactcc gacggctcct tcttcctcta cagcaagctc accgtggaca   7260
agagcaggtg gcagcagggg aacgtcttct catgctccgt gatgcatgag gctctgcaca   7320
accactacac gcagaagagc ctctccctgt ctccgggtaa atag                   7364
```

```
SEQ ID NO: 11              moltype = DNA   length = 6972
FEATURE                    Location/Qualifiers
source                     1..6972
                           mol_type = other DNA
                           organism = synthetic construct
SEQUENCE: 11
ttctagaata atcaacctct ggattacaaa atttgtgaaa gattgactgg tattcttaac   60
tatgttgctc cttttacgct atgtggatac gctgctttaa tgcctttgta tcatgctatt   120
gcttcccgta tggctttcat tttctcctcc ttgtataaat cctggttgct gtctctttat   180
gaggagttgt ggcccgttgt caggcaacgt ggcgtggtgt tgctgacgca   240
acccccactg gttggggcat tgccaccacc tgtcagctcc tttccgggac tttcgctttc   300
ccctccccta ttgccacggc ggaactcatc gccgcctgcc ttgcccgctg ctggacaggg   360
gctcggctgt tgggcactga caattccgtg gtgttgtcgg ggaaatcatc gtcctttcct   420
tggctgctcg cctgtgttgc cacctggatt ctgcgcggga cgtccttctg ctacgtcccct   480
tcggccctca atccagcgga ccttccttcc cgcggcctgc tgccggctct cggcctctt   540
ccgcgtcttc gccttcgccc tcagacgagt cggatctccc tttgggccgc ctccccgcct   600
aagcttatcg ataccgtcga gatctaactt gtttattgca gcttataatg gttacaaata   660
aagcaatagc atcacaaatt tcacaaataa agcatttttt tcactgcatt ctagttgtgg   720
tttgtccaaa ctcatcaatg tatcttatca tgtctggatc tcgacctcga ctagagcatg   780
gctacgtaga taagtagcat ggcgggttaa tcattaacta caaggaaccc ctagtgatgg   840
agttggccac tccctctctg cgcgctcgct cgctcactga ggccgggcga ccaaaggtcg   900
cccgacgccc gggctttgcc cgggcggcct cagtgagcga gcgagcgcgc cagctggcgt   960
aatagcgaag aggcccgcac cgatcgccct tcccaacagt tgcgcagcct gaatggcgaa   1020
tggaattcca gacgattgag cgtcaaaatg taggtatttc catgagcgtt tttcctgttg   1080
caatggctgg cggtaatatt gttctggata ttaccagcaa ggccgatagt ttgagttctt   1140
ctactcaggc aagtgatgtt attactaatc aaagaagtat tgcgacaacg gttaatttgc   1200
gtgatggaca gactctttta ctcggtggcc tcactgatta taaaaacact tctcaggatt   1260
ctggcgtacc gttcctgtct aaaatccctt taatcggcct cctgtttagc tcccgctctg   1320
attctaacga ggaaagcacg ttatacgtgt cgtcaaagc aaccatagta cgcgccctgt   1380
agcggcgcat taagcgcggc gggtgtggtg gttacgcgca gcgtgaccgc tacacttgcc   1440
agcgccctag cgcccgctcc tttcgctttc ttccctttca cttctcgcca cgttcgccggc   1500
tttccccgtc aagctctaaa tcggggctc ccttaggt tccgatttag tgctttacgg    1560
cacctcgacc ccaaaaaact tgattagggt gatggttcac gtagtgggcc atcgccctga   1620
tagacggttt ttcgcccttt gacgttggag tccacgttct ttaatagtgg actcttgttc   1680
caaactggaa caacactcaa ccctatctcg gtctattctt ttgatttata ggggattttg   1740
ccgatttcgg cctattggtt aaaaaatgag ctgatttaac aaaaatttaa cgcgaatttt   1800
aacaaaatat taacgtttac aatttaaata tttgcttata caatcttcct gttttttgggg   1860
cttttctgat tatcaaccgg ggtacatatg attgacatgc tagttttacg attaccgttc   1920
atcgattctc ttgtttgctc cagactctca ggcaatgacc tgatagcctt tgtagagaca   1980
tctcaaaaat agctaccctc tccggcatga atttatcagc tagaacggtt gaatatcata   2040
ttgatggtga tttgactgtc tccggccttt ctcacccgtt tgaatcttta cctacacatt   2100
actcaggcat tgcatttaaa atatatgagg gttctaaaaa tttttatcct tgcgttgaaa   2160
taaaggcttc tcccgcaaaa gtattacagg gtcataattt ttggtaca accgatttag   2220
ctttatgctc tgaggcttta ttgcttaatt ttgctaattc tttgccttgc ctgtatgatt   2280
tattggatgt tggaattcct gatgcggtat tttctcctta cgcatctgtg cggtatttca   2340
caccgcatat ggtgcactct cagtacaatc tgctctgatg ccgcatagtt aagccagccc   2400
cgacacccgc caacacccgc tgacgcgccc tgacgggctt gtctgctccc ggcatccgct   2460
tacagacaag ctgtgaccgt ctccgggagc tgcatgtgtc agaggttttc accgtcatca   2520
ccgaaacgcg cgagacgaaa gggcctcgtg atacgcctat ttttataggt taatgtcatg   2580
ataataatgg tttcttagac gtcaggtggc acttttcggg gaaatgtgcg cggaaccct   2640
atttgtttat ttttctaaat acattcaaat atgtatccgc tcatgagaca ataaccctga   2700
taaatgcttc aataatattg aaaaaggaag agtatgagta tcaacatttc cgtgtcgcc   2760
cttattccct ttttgcggc attttgcctt cctgttttg ctcacccaga aacgctggtg   2820
aaagtaaaag atgctgaaga tcagttgggt gcacgagtgg gttacatcga actggatctc   2880
aacagcggta agatccttga gagttttcgc cccgaagaac gttttccaat gatgagcact   2940
tttaaagttc tgctatgtgg cgcggtatta tcccgtatga cgccgggcaa gagcaactc   3000
ggtcgccgca tacactattc tcagaatgac ttggttgagt actcaccagt cacagaaaag   3060
catcttacgg atggcatgac agtaagagaa ttatgcagtg ctgccataac catgagtgat   3120
aacactgcgg ccaacttact tctgacaacg atcggaggac cgaaggagct aaccgctttt   3180
ttgcacaaca tgggggatca tgtaactcgc cttgatcgtt gggaaccgga gctgaatgaa   3240
gccataccaa acgacgagcg tgacaccacg atgcctgtag caatggcaac aacgttgcgc   3300
aaactattac tggcgaact acttactcta gcttcccggc aacaattaat agactggatg   3360
gaggcggata aagttgcagg accacttctg cgctcggccc ttccggctgg ctggtttatt   3420
gctgataaat ctggagccgg tgagcgtggg tctcgcggta tcattgcagc actggggcca   3480
gatggtaagc cctcccgtat cgtagttatc tacacgacgg ggagtcaggc aactatggat   3540
gaacgaaata gacagatcgc tgagataggg cctcactgaa ttaagcattg gtaactgtca   3600
gaccaagttt actcatatat actttagatt gatttaaaac ttcattttta atttaaaagg   3660
```

```
-continued
atctaggtga agatccttttt tgataatctc atgaccaaaa tcccttaacg tgagttttcg  3720
ttccactgag cgtcagaccc cgtagaaaag atcaaaggat cttcttgaga tccttttttt  3780
ctgcgcgtaa tctgctgctt gcaaacaaaa aaaccaccgc taccagcggt ggtttgtttg  3840
ccggatcaag agctaccaac tcttttttccg aaggtaactg gcttcagcag agcgcagata  3900
ccaaatactg tccttctagt gtagccgtag ttaggccacc acttcaagaa ctctgtagca  3960
ccgcctacat acctcgctct gctaatcctg ttaccagtgg ctgctgccag tggcgataag  4020
tcgtgtctta ccgggttgga ctcaagacga tagttaccgg ataaggcgca gcggtcgggc  4080
tgaacggggg gttcgtgcac acagcccagc ttggagcgaa cgacctacac cgaactgaga  4140
tacctacagc gtgagctatg agaaagcgcc acgcttcccg aagggagaaa ggcggacagg  4200
tatccggtaa gcggcagggt cggaacagga gagcgcacga gggagcttcc aggggggaaac  4260
gcctggtatc tttatagtcc tgtcgggttt cgccacctct gacttgagcg tcgatttttg  4320
tgatgctcgt cagggggggcg gagcctatgg aaaaacgcca gcaacgcggc cttttacgg  4380
ttcctggcct tttgctggcc ttttgctcac atgttctttc ctgcgttatc ccctgattct  4440
gtggataacc gtattaccgc ctttgagtga gctgataccg ctcgccgcag ccgaacgacc  4500
gagcgcagcg agtcagtgag cgaggaagcg gaagagcgcc caatacgcaa accgcctctc  4560
cccgcgcgtt ggccgattca ttaatgcagc agctgcgcgc tcgctcgctc actgaggccg  4620
cccgggcaaa gcccggcgt cgggcgacct ttggtcgccc ggcctcagtg agcgagcgag  4680
cgcgcagaga gggagtggcc aactccatca ctaggggttc cttgtagtta atgattaacc  4740
cgccatgcta cttatctacg tagccatgct ctaggacatt gattattgac tagtggagtt  4800
ccgcgttaca taacttacgg taaatggccc gcctggctga ccgcccaacg acccccgccc  4860
attgacgtca ataatgacgt atgttcccat agtaacgcca atagggactt tccattacg  4920
tcaatgggtg gagtatttac ggtaaactgc ccacttggca gtacatcaag tgtatcatat  4980
gccaagtacg cccccctattg acgtcaatga cggtaaatgg cccgcctggc attatgccca  5040
gtacatgacc ttatgggact ttcctacttg gcagtacatc tacgtattag tcatcgctat  5100
taccatggtc gaggtgagcc ccacgttctg ctttcactctc cccatctccc ccccctcccc  5160
acccccaatt ttgtatttat ttattttta attattttgt gcagcgatgg gggcggggg  5220
gggggggggc gcgcgccagg cggggcgggg cggggcgagg ggcgggggcgg ggcgaggcgg  5280
agaggtcgcg cggcagccaa tcagagcggc gcgctccgaa agtttccttt tatggcgagg  5340
cggcggcggc ggcggcccta taaaaagcga agcgcgcggc gggcgggagt cgctgcgcgc  5400
tgccttcgcc ccgtgcccg ctccgccgcc gcctcgcgcc gcccgccccg gctctgactg  5460
accgcgttac taaaacaggt aagtccggcc tccgcgccgg gttttggcgc ctcccgcggg  5520
cgcccccctc ctcacggcga gcgctgccac gtcagacgaa gggcgcagcg agcgtcctga  5580
tccttccgcc cggacgctca ggacagcggc ccgctgctca taagactcgg ccttagaacc  5640
ccagtatcag cagaaggaca ttttaggacg ggacttgggt gacttaggg cactggtttt  5700
ctttccagag agcggaacag gcgaggaaaa gtagtccctt ctcggcgatt ctgcggaggg  5760
atctccgtgg ggcggtgaac gccgatgatg cctctactaa ccatgttcat gtttctttt  5820
tttttctaca ggtcctgggt gacgaacagg gtaccgccac catgaggggc atgaagctgc  5880
tggggggcgct gctggcactg gcggcctac tgcaggggggc cgtgtccatg gcgctgtgga  5940
tgcgctgct gccgctgctg gcgctgctgg cgctgtgggg cccggatccg gcggcggcgtg  6000
ttgtgaacca gcatctgtgc ggcagccatc tggtggaagc gctgtatctg gtgtgcggcg  6060
aacgcggctt ttttatacc ccgaaaaccc gccgcgaagc ggaagatctg caggtgggcc  6120
aggtggaact gggcggcggc ccgggcgcgg gcagcctgca gccgctggcg ctggaaggca  6180
gcctggaa acgcggcatt gtggaacagt gctgcaccag catttgcagc ctgtatcagc  6240
tggaaaacta ttgcaacggg cggatcaggc ggatcaccca aatcttgtga caaaactcac  6300
acatgcccac cgtgcccagc acctgaactc ctggggggac cgtcagtctt cctcttcccc  6360
ccaaaaccca aggacaccct catgatctcc cggacccctg aggtcacatg cgtggtggtg  6420
gacgtgagcc acgaagaccc tgaggtcaag ttcaactggt acgtggacgg cgtggaggtg  6480
cataatgcca agacaaagcc gcgggaggag cagtacaaca gcacgtaccg tgtggtcagc  6540
gtcctcaccg tcctgcacca ggactggctg aatggcaagg agtacaagtg caaggtctcc  6600
aacaaagccc tcccagcccc catcgagaaa accatctcca aagccaaagg gcagcccga  6660
gaaccacagg tgtacaccct gccccccatc cgggaggaga tgaccaagaa ccaggtcagc  6720
ctgacctgcc tggtcaaagg cttctatccc agcgacatcg ccgtggagtg ggagagcaat  6780
gggcagccgg agaacaacta caagaccacg cctcccgtgc tggactccga cggctccttc  6840
ttcctctaca gcaagctcac cgtggacaag agcaggtggc agcaggggaa cgtcttctca  6900
tgctccgtga tgcatgaggc tctgcacaac cactacacg agaagagcct ctccctgtct  6960
ccgggtaaat ag                                                       6972
```

PLASMID ENCODING A TLR9 AND Fc FUSION PROTEIN

This application contains a Sequence Listing electronically submitted via Patent Center to the United States Patent and Trademark Office as an XML Document file entitled "A8149440US-Sequence Listing.xml" created on 2024 Feb. 8 and having a size of 68,245 bytes. The information contained in the Sequence Listing is incorporated by reference herein.

TECHNICAL FIELD

The present disclosure generally relates to compositions for regulating the production of fusion proteins. In particular, the present disclosure relates to compositions for regulating gene expression and, consequently, the production of fusion proteins.

BACKGROUND

Bioactive molecules, including toll-like receptors, enzymes, and hormones, are necessary for the homeostatic control of biological systems.

When bioactive molecules are over-expressed, under-expressed or mis-expressed, homeostasis is lost, and disease is often the result.

As such, it may be desirable to establish therapies, treatments and/or interventions that address when homeostasis and the regulation of bioactive molecules are lost in order to prevent or treat the resulting disease.

SUMMARY

Some embodiments of the present disclosure relate to one or more compositions that upregulate the production of one or more sequences of mRNA. The sequences of mRNA may encode for translation of a target biomolecule, thereby causing an increase in bioavailability of the target biomolecule within a subject that is administered the one or more compositions. In some embodiments of the present disclosure, the target biomolecule is a fusion protein with an Fc fragment, such as a toll-like receptor 3-Fc (TLR3-Fc). In some embodiments of the present disclosure, the target biomolecule is toll-like receptor 9-Fc (TLR9-Fc). In some embodiments of the present disclosure, the target biomolecule is deoxyribonuclease I-Fc (DNAse I-Fc). In some embodiments of the present disclosure, the target biomolecule is neural growth factor-Fc (NGF-Fc). In some embodiments of the present disclosure, the target biomolecule is insulin-Fc.

In some embodiments of the present disclosure the compositions comprise a plasmid of deoxyribonucleic acid (DNA) that includes one or more insert sequences of nucleic acids that encode for the production of mRNA and a backbone sequence of nucleic acids that facilitates introduction of the one or more insert sequences into one or more of a subject's cells where it is expressed and/or replicated. Expression of the one or more insert sequences by one or more cells of the subject results in an increased production of the mRNA and, consequently, increased translation of the target biomolecule by one or more of the subject's cells.

Some embodiments of the present disclosure relate to a recombinant plasmid (RP). In some embodiments of the present disclosure, the RP comprises a nucleotide sequence of SEQ ID NO. 1 and SEQ ID NO. 2. The RP comprises a nucleotide sequence encoding one or more nucleotide sequences encoding an mRNA sequence that encodes for the fusion protein DNAse I-Fc.

Some embodiments of the present disclosure relate to a recombinant plasmid. In some embodiments of the present disclosure, the RP comprises a nucleotide sequence of SEQ ID NO. 1 and SEQ ID NO. 3. The RP comprises a nucleotide sequence encoding one or more nucleotide sequences encoding an mRNA sequence that encodes for the fusion protein TLR3-Fc.

Some embodiments of the present disclosure relate to a recombinant plasmid. In some embodiments of the present disclosure, the RP comprises a nucleotide sequence of SEQ ID NO. 1 and SEQ ID NO. 4. The RP comprises a nucleotide sequence encoding one or more nucleotide sequences encoding an mRNA sequence that encodes for the fusion protein TLR9-Fc.

Some embodiments of the present disclosure relate to a recombinant plasmid. In some embodiments of the present disclosure, the RP comprises a nucleotide sequence of SEQ ID NO. 1 and SEQ ID NO. 5. The RP comprises a nucleotide sequence encoding one or more nucleotide sequences encoding an mRNA sequence that encodes for the fusion protein NGF-Fc.

Some embodiments of the present disclosure relate to a recombinant plasmid. In some embodiments of the present disclosure, the RP comprises a nucleotide sequence of SEQ ID NO. 1 and SEQ ID NO. 6. The RP comprises a nucleotide sequence encoding one or more nucleotide sequences encoding an mRNA sequence that encodes for the fusion protein insulin-Fc.

Some embodiments of the present disclosure relate to a method of making a composition/target cell complex. The method comprising a step of administering a RP comprising SEQ ID NO. 1 and one of SEQ ID NO. 2, SEQ ID NO. 3, SEQ ID NO. 4, SEQ ID NO. 5 or SEQ ID NO. 6 to a target cell for forming the composition/target cell complex, wherein the composition/target cell complex causes the target cell to increase production of one or more sequences of mRNA that increases production of a target biomolecule.

Embodiments of the present disclosure relate to at least one approach for inducing endogenous production of one or more sequences of mRNA that encodes for a target biomolecule, for example TLR3-Fc. A first approach utilizes gene vectors containing nucleotide sequences for increasing the endogenous production of one or more sequences of mRNA, which are complete or partial sequences and/or combinations thereof of TLR3-Fc, which can be administered to a subject to increase the subject's production of one or more sequences of the mRNA.

Embodiments of the present disclosure relate to at least one approach for inducing endogenous production of one or more sequences of mRNA that encodes for a target biomolecule, for example TLR9-Fc. A first approach utilizes gene vectors containing nucleotide sequences for increasing the endogenous production of one or more sequences of mRNA, which are complete or partial sequences and/or combinations thereof of TLR9-Fc, which can be administered to a subject to increase the subject's production of one or more sequences of the mRNA.

Embodiments of the present disclosure relate to at least one approach for inducing endogenous production of one or more sequences of mRNA that encodes for a target biomolecule, for example DNAse I-Fc. A first approach utilizes gene vectors containing nucleotide sequences for increasing the endogenous production of one or more sequences of mRNA, which are complete or partial sequences and/or combinations thereof of DNAse I-Fc, which can be administered to a subject to increase the subject's production of one or more sequences of the mRNA.

Embodiments of the present disclosure relate to at least one approach for inducing endogenous production of one or more sequences of mRNA that encodes for a target biomolecule, for example NGF-Fc. A first approach utilizes gene vectors containing nucleotide sequences for increasing the endogenous production of one or more sequences of mRNA, which are complete or partial sequences and/or combinations thereof of NGF-Fc, which can be administered to a subject to increase the subject's production of one or more sequences of the mRNA.

Embodiments of the present disclosure relate to at least one approach for inducing endogenous production of one or more sequences of mRNA that encodes for a target biomolecule, for example insulin-Fc. A first approach utilizes gene vectors containing nucleotide sequences for increasing the endogenous production of one or more sequences of mRNA, which are complete or partial sequences and/or combinations thereof of insulin-Fc, which can be administered to a subject to increase the subject's production of one or more sequences of the mRNA.

DETAILED DESCRIPTION

Unless defined otherwise, all technical and scientific terms used therein have the meanings that would be commonly understood by one of skill in the art in the context of the present description. Although any methods and materials similar or equivalent to those described therein can also be used in the practice or testing of the present disclosure, the preferred compositions, methods and materials are now described. All publications mentioned therein are incorporated therein by reference to disclose and describe the methods and/or materials in connection with which the publications are cited.

As used therein, the singular forms "a", "an", and "the" include plural references unless the context clearly dictates otherwise. For example, reference to "a composition" includes one or more compositions and reference to "a subject" or "the subject" includes one or more subjects.

As used therein, the terms "about" or "approximately" refer to within about 25%, preferably within about 20%, preferably within about 15%, preferably within about 10%, preferably within about 5% of a given value or range. It is understood that such a variation is always included in any given value provided therein, whether or not it is specifically referred to.

As used therein, the term "ameliorate" refers to improve and/or to make better and/or to make more satisfactory.

As used therein, the term "cell" refers to a single cell as well as a plurality of cells or a population of the same cell type or different cell types. Administering a composition to a cell includes in vivo, in vitro and ex vivo administrations and/or combinations thereof.

As used therein, the term "complex" refers to an association, either direct or indirect, between one or more particles of a composition and one or more target cells. This association results in a change in the metabolism of the target cell. As used therein, the phrase "change in metabolism" refers to an increase or a decrease in the one or more target cells' production of one or more proteins, and/or any post-translational modifications of one or more proteins.

As used therein, the term "composition" refers to a substance that, when administered to a subject, causes one or more chemical reactions and/or one or more physical reactions and/or one or more physiological reactions and/or one or more immunological reactions in the subject. In some embodiments of the present disclosure, the composition is a plasmid vector.

As used therein, the term "endogenous" refers to the production and/or modification of a molecule that originates within a subject.

As used therein, the term "exogenous" refers to a molecule that is within a subject but that did not originate within the subject. As used therein, the terms "production", "producing" and "produce" refer to the synthesis and/or replication of DNA, the transcription of one or more sequences of RNA, the translation of one or more amino acid sequences, the post-translational modifications of an amino acid sequence, and/or the production of one or more regulatory molecules that can influence the production and/or functionality of an effector molecule or an effector cell. For clarity, "production" is also used therein to refer to the functionality of a regulatory molecule, unless the context reasonably indicates otherwise.

As used therein, the term "subject" refers to any therapeutic target that receives the composition. The subject can be a vertebrate, for example, a mammal including a human. The term "subject" does not denote a particular age or sex. The term "subject" also refers to one or more cells of an organism, an in vitro culture of one or more tissue types, an in vitro culture of one or more cell types, ex vivo preparations, and/or a sample of biological materials such as tissue, and/or biological fluids.

As used therein, the term "target biomolecule" refers to a protein-Fc fusion molecule that is found within a subject. A biomolecule may be endogenous or exogenous to a subject.

As used therein, the term "target cell" refers to one or more cells and/or cell types that are affected, either directly or indirectly, by a biomolecule.

As used therein, the term "therapeutically effective amount" refers to the amount of the composition used that is of sufficient quantity to ameliorate, treat and/or inhibit one or more of a disease, disorder or a symptom thereof. The "therapeutically effective amount" will vary depending on the composition used, the route of administration of the composition and the severity of the disease, disorder or symptom thereof. The subject's age, weight and genetic make-up may also influence the amount of the composition that will be a therapeutically effective amount.

As used therein, the terms "treat", "treatment" and "treating" refer to obtaining a desired pharmacologic and/or physiologic effect. The effect may be prophylactic in terms of completely or partially preventing an occurrence of a disease, disorder or symptom thereof and/or the effect may be therapeutic in providing a partial or complete amelioration or inhibition of a disease, disorder, or symptom thereof. Additionally, the term "treatment" refers to any treatment of a disease, disorder, or symptom thereof in a subject and includes: (a) preventing the disease from occurring in a subject which may be predisposed to the disease but has not yet been diagnosed as having it; (b) inhibiting the disease, i.e., arresting its development; and (c) ameliorating the disease.

As used therein, the terms "unit dosage form" and "unit dose" refer to a physically discrete unit that is suitable as a unitary dose for patients. Each unit contains a predetermined quantity of the composition and optionally, one or more suitable pharmaceutically acceptable carriers, one or more excipients, one or more additional active ingredients, or combinations thereof. The amount of composition within each unit is a therapeutically effective amount.

Where a range of values is provided therein, it is understood that each intervening value, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges, and are also, encompassed within the disclosure, subject to any specifically excluded limit in the stated range. Where the stated range includes one or both of the limits, ranges excluding either or both of those included limits are also included in the disclosure.

In some embodiments of the present disclosure, a composition is a recombinant plasmid (RP) for introducing genetic material, such as one or more nucleotide sequences, into a target cell for reproduction or transcription of an insert that comprises one or more nucleotide sequences that are carried within the RP. In some embodiments of the present disclosure, the RP is delivered without a carrier, by a viral vector, by a protein coat, or by a lipid vesicle. In some embodiments of the present disclosure, the vector is an adeno-associated virus vector.

In some embodiments of the present disclosure, the insert comprises one or more nucleotide sequences that encode for production of at least one sequence of mRNA that increases the production of target biomolecules, such as a fusion protein with an Fc fragment. An Fc fragment is the distal portion of the heavy chain of an antibody.

In some embodiments of the present disclosure, the target biomolecule is TLR3-Fc.

In some embodiments of the present disclosure, the target biomolecule is TLR9-Fc.

In some embodiments of the present disclosure, the target biomolecule is DNAse I-Fc.

In some embodiments of the present disclosure, the target biomolecule is NGF-Fc.

In some embodiments of the present disclosure, the target biomolecule is insulin-Fc.

Some embodiments of the present disclosure relate to a composition that can be administered to a subject with a condition that results, directly or indirectly, from the dysregulated production of a biomolecule. When a therapeutically effective amount of the composition is administered to the subject, the subject may change production and/or functionality of one or more biomolecules.

In some embodiments of the present disclosure, the subject may respond to receiving the therapeutic amount of the composition by changing production and/or functionality of one or more intermediary molecules by changing production of one or more DNA sequences, one or more RNA sequences, and/or one or more proteins that regulate the levels and/or functionality of the one or more intermediary molecules. The one or more intermediary molecules regulate the subject's levels and/or functionality of the one or more biomolecules.

In some embodiments of the present disclosure, administering a therapeutic amount of the composition to a subject upregulates the production, functionality or both one or more sequences of mRNA that each encode for one or more biomolecules.

In some embodiments of the present disclosure, the composition is an RP that may be used for gene therapy. The gene therapy is useful for increasing the subject's endogenous production of one or more sequences of mRNA that encode for a target biomolecule. For example, the RP can contain one or more nucleotide sequences that cause increased production of one or more nucleotide sequences that cause an increased production of one or more mRNA sequences that encode for one biomolecule, such as TLR3-Fc, TLR9-Fc, DNAse I-Fc, NGF-Fc or insulin-Fc.

In some embodiments of the present disclosure, the delivery vehicle of the RP used for gene therapy may be a vector that comprises a virus that can be enveloped, or not (unenveloped), replication effective or not (replication ineffective), or combinations thereof. In some embodiments of the present disclosure, the vector is a virus that is not enveloped and not replication effective. In some embodiments of the present disclosure, the vector is a virus of the Parvoviridae family. In some embodiments of the present disclosure, the vector is a virus of the genus *Dependoparvovirus*. In some embodiments of the present disclosure, the vector is an adeno-associated virus (AAV). In some embodiments of the present disclosure, the vector is a recombinant AAV. In some embodiments of the present disclosure, the vector is a recombinant AAV6.2FF.

In some embodiments of the present disclosure, the delivery vehicle of the RP used for gene therapy may be a protein coat.

In some embodiments of the present disclosure, the delivery vehicle of the RP used for gene therapy may be a lipid vesicle.

The embodiments of the present disclosure also relate to administering a therapeutically effective amount of the composition. In some embodiments of the present disclosure, the therapeutically effective amount of the composition that is administered to a patient is between about 10 and about $1 \times 10^{16}$ TCID$_{50}$/kg (50% tissue culture infective dose per kilogram of the patient's body mass). In some embodiments of the present disclosure, the therapeutically effective amount of the composition that is administered to the patient is about $1 \times 10^{13}$ TCID$_{50}$/kg. In some embodiments of the present disclosure, the therapeutically effective amount of the composition that is administered to a patient is measured in TPC/kg (total particle count of the composition per kilogram of the patient's body mass). In some embodiments of the present disclosure, the therapeutically effective amount of the composition is between about 10 and about $1 \times 10^{16}$ TCP/kg.

Some embodiments of the present disclosure relate to an adeno-associated virus (AAV) genome consisting of a RP that when operable inside a target cell will cause the target cell to produce a mRNA sequence that upregulates production of a biomolecule, with examples being TLR3-Fc, TLR9-Fc, DNAse I-Fc, NGF-Fc, or insulin-Fc. The RP is comprised of AAV2 inverted terminal repeats (ITRs), a composite CASI promoter, and a human growth hormone (HGH) signal peptide followed by a mRNA expression cassette encoding for TLR3-Fc, TLR9-Fc, DNAse I-Fc, NGF-Fc, or insulin-Fc, followed by a Woodchuck Hepatitis Virus post-transcriptional regulatory element (WPRE) and a Simian virus 40 (SV40) polyadenylation (polyA) signal.

SEQ ID NO. 1 (backbone sequence No.1):
5'TTCTAGAATAATCAACCTCTGGATTACAAAATTTGTGAAAGATTGACTGGTATTCTTAACT

ATGTTGCTCCTTTTACGCTATGTGGATACGCTGCTTTAATGCCTTTGTATCATGCTATTGCTT

-continued

```
CCCGTATGGCTTTCATTTTCTCCTCCTTGTATAAATCCTGGTTGCTGTCTCTTTATGAGGAGT
TGTGGCCCGTTGTCAGGCAACGTGGCGTGGTGTGCACTGTGTTTGCTGACGCAACCCCCACTG
GTTGGGGCATTGCCACCACCTGTCAGCTCCTTTCCGGGACTTTCGCTTTCCCCCTCCCTATTG
CCACGGCGGAACTCATCGCCGCCTGCCTTGCCCGCTGCTGGACAGGGGCTCGGCTGTTGGGCA
CTGACAATTCCGTGGTGTTGTCGGGGAAATCATCGTCCTTTCCTTGGCTGCTCGCCTGTGTTG
CCACCTGGATTCTGCGCGGGACGTCCTTCTGCTACGTCCCTTCGGCCCTCAATCCAGCGGACC
TTCCTTCCCGCGGCCTGCTGCCGGCTCTGCGGCCTCTTCCGCGTCTTCGCCTTCGCCCTCAGA
CGAGTCGGATCTCCCTTTGGGCCGCCTCCCCGCCTAAGCTTATCGATACCGTCGAGATCTAAC
TTGTTTATTGCAGCTTATAATGGTTACAAATAAAGCAATAGCATCACAAATTTCACAAATAAA
GCATTTTTTCACTGCATTCTAGTTGTGGTTTGTCCAAACTCATCAATGTATCTTATCATGTC
TGGATCTCGACCTCGACTAGAGCATGGCTACGTAGATAAGTAGCATGGCGGGTTAATCATTAA
CTACAAGGAACCCCTAGTGATGGAGTTGGCCACTCCCTCTGCGCGCTCGCTCGCTCACTGA
GGCCGGGCGACCAAAGGTCGCCCGACGCCCGGGCTTTGCCCGGGCGGCCTCAGTGAGCGAGCG
AGCGCGCCAGCTGGCGTAATAGCGAAGAGGCCCGCACCGATCGCCCTTCCCAACAGTTGCGCA
GCCTGAATGGCGAATGGAATTCCAGACGATTGAGCGTCAAAATGTAGGTATTTCCATGAGCGT
TTTTCCTGTTGCAATGGCTGGCGGTAATATTGTTCTGGATATTACCAGCAAGGCCGATAGTTT
GAGTTCTTCTACTCAGGCAAGTGATGTTATTACTAATCAAAGAAGTATTGCGACAACGGTTAA
TTTGCGTGATGGACAGACTCTTTTACTCGGTGGCCTCACTGATTATAAAAACACTTCTCAGGA
TTCTGGCGTACCGTTCCTGTCTAAAATCCCTTTAATCGGCCTCCTGTTTAGCTCCCGCTCTGA
TTCTAACGAGGAAAGCACGTTATACGTGCTCGTCAAAGCAACCATAGTACGCGCCCTGTAGCG
GCGCATTAAGCGCGGCGGGTGTGGTGGTTACGCGCAGCGTGACCGCTACACTTGCCAGCGCCC
TAGCGCCCGCTCCTTTCGCTTTCTTCCCTTCCTTTCTCGCCACGTTCGCCGGCTTTCCCCGTC
AAGCTCTAAATCGGGGGCTCCCTTTAGGGTTCCGATTTAGTGCTTTACGGCACCTCGACCCCA
AAAAACTTGATTAGGGTGATGGTTCACGTAGTGGGCCATCGCCCTGATAGACGGTTTTTCGCC
CTTTGACGTTGGAGTCCACGTTCTTTAATAGTGGACTCTTGTTCCAAACTGGAACAACACTCA
ACCCTATCTCGGTCTATTCTTTTGATTTATAAGGGATTTTGCCGATTTCGGCCTATTGGTTAA
AAAATGAGCTGATTTAACAAAAATTTAACGCGAATTTTAACAAAATATTAACGTTTACAATTT
AAATATTTGCTTATACAATCTTCCTGTTTTTGGGGCTTTTCTGATTATCAACCGGGGTACATA
TGATTGACATGCTAGTTTTACGATTACCGTTCATCGATTCTCTTGTTTGCTCCAGACTCTCAG
GCAATGACCTGATAGCCTTTGTAGAGACCTCTCAAAAATAGCTACCCTCTCCGGCATGAATTT
ATCAGCTAGAACGGTTGAATATCATATTGATGGTGATTTGACTGTCTCCGGCCTTTCTCACCC
GTTTGAATCTTTACCTACACATTACTCAGGCATTGCATTTAAAATATATGAGGGTTCTAAAAA
TTTTTATCCTTGCGTTGAAATAAAGGCTTCTCCCGCAAAAGTATTACAGGGTCATAATGTTTT
TGGTACAACCGATTTAGCTTTATGCTCTGAGGCTTTATTGCTTAATTTTGCTAATTCTTTGCC
TTGCCTGTATGATTTATTGGATGTTGGAATTCCTGATGCGGTATTTTCTCCTTACGCATCTGT
GCGGTATTTCACACCGCATATGGTGCACTCTCAGTACAATCTGCTCTGATGCCGCATAGTTAA
GCCAGCCCCGACACCCGCCAACACCCGCTGACGCGCCCTGACGGGCTTGTCTGCTCCCGGCAT
CCGCTTACAGACAAGCTGTGACCGTCTCCGGGAGCTGCATGTGTCAGAGGTTTTCACCGTCAT
CACCGAAACGCGCGAGACGAAAGGGCCTCGTGATACGCCTATTTTTATAGGTTAATGTCATGA
TAATAATGGTTTCTTAGACGTCAGGTGGCACTTTTCGGGGAAATGTGCGCGGAACCCCTATTT
```

-continued

```
GTTTATTTTTCTAAATACATTCAAATATGTATCCGCTCATGAGACAATAACCCTGATAAATGC

TTCAATAATATTGAAAAAGGAAGAGTATGAGTATTCAACATTTCCGTGTCGCCCTTATTCCCT

TTTTTGCGGCATTTTGCCTTCCTGTTTTTGCTCACCCAGAAACGCTGGTGAAAGTAAAAGATG

CTGAAGATCAGTTGGGTGCACGAGTGGGTTACATCGAACTGGATCTCAACAGCGGTAAGATCC

TTGAGAGTTTTCGCCCCGAAGAACGTTTTCCAATGATGAGCACTTTTAAAGTTCTGCTATGTG

GCGCGGTATTATCCCGTATTGACGCCGGGCAAGAGCAACTCGGTCGCCGCATACACTATTCTC

AGAATGACTTGGTTGAGTACTCACCAGTCACAGAAAAGCATCTTACGGATGGCATGACAGTAA

GAGAATTATGCAGTGCTGCCATAACCATGAGTGATAACACTGCGGCCAACTTACTTCTGACAA

CGATCGGAGGACCGAAGGAGCTAACCGCTTTTTTGCACAACATGGGGGATCATGTAACTCGCC

TTGATCGTTGGGAACCGGAGCTGAATGAAGCCATACCAAACGACGAGCGTGACACCACGATGC

CTGTAGCAATGGCAACAACGTTGCGCAAACTATTAACTGGCGAACTACTTACTCTAGCTTCCC

GGCAACAATTAATAGACTGGATGGAGGCGGATAAAGTTGCAGGACCACTTCTGCGCTCGGCCC

TTCCGGCTGGCTGGTTTATTGCTGATAAATCTGGAGCCGGTGAGCGTGGGTCTCGCGGTATCA

TTGCAGCACTGGGGCCAGATGGTAAGCCCTCCCGTATCGTAGTTATCTACACGACGGGGAGTC

AGGCAACTATGGATGAACGAAATAGACAGATCGCTGAGATAGGTGCCTCACTGATTAAGCATT

GGTAACTGTCAGACCAAGTTTACTCATATATACTTTAGATTGATTTAAAACTTCATTTTTAAT

TTAAAAGGATCTAGGTGAAGATCCTTTTTGATAATCTCATGACCAAAATCCCTTAACGTGAGT

TTTCGTTCCACTGAGCGTCAGACCCCGTAGAAAAGATCAAAGGATCTTCTTGAGATCCTTTTT

TTCTGCGCGTAATCTGCTGCTTGCAAACAAAAAAACCACCGCTACCAGCGGTGGTTTGTTTGC

CGGATCAAGAGCTACCAACTCTTTTTCCGAAGGTAACTGGCTTCAGCAGAGCGCAGATACCAA

ATACTGTCCTTCTAGTGTAGCCGTAGTTAGGCCACCACTTCAAGAACTCTGTAGCACCGCCTA

CATACCTCGCTCTGCTAATCCTGTTACCAGTGGCTGCTGCCAGTGGCGATAAGTCGTGTCTTA

CCGGGTTGGACTCAAGACGATAGTTACCGGATAAGGCGCAGCGGTCGGGCTGAACGGGGGGTT

CGTGCACACAGCCCAGCTTGGAGCGAACGACCTACACCGAACTGAGATACCTACAGCGTGAGC

TATGAGAAAGCGCCACGCTTCCCGAAGGGAGAAAGGCGGACAGGTATCCGGTAAGCGGCAGGG

TCGGAACAGGAGAGCGCACGAGGGAGCTTCCAGGGGGAAACGCCTGGTATCTTTATAGTCCTG

TCGGGTTTCGCCACCTCTGACTTGAGCGTCGATTTTTGTGATGCTCGTCAGGGGGGCGGAGCC

TATGGAAAAACGCCAGCAACGCGGCCTTTTTACGGTTCCTGGCCTTTTGCTGGCCTTTTGCTC

ACATGTTCTTTCCTGCGTTATCCCCTGATTCTGTGGATAACCGTATTACCGCCTTTGAGTGAG

CTGATACCGCTCGCCGCAGCCGAACGACCGAGCGCAGCGAGTCAGTGAGCGAGGAAGCGGAAG

AGCGCCCAATACGCAAACCGCCTCTCCCCGCGCGTTGGCCGATTCATTAATGCAGCAGCTGCG

CGCTCGCTCGCTCACTGAGGCCGCCCGGGCAAAGCCCGGGCGTCGGGCGACCTTTGGTCGCCC

GGCCTCAGTGAGCGAGCGAGCGCGCAGAGAGGGAGTGGCCAACTCCATCACTAGGGGTTCCTT

GTAGTTAATGATTAACCCGCCATGCTACTTATCTACGTAGCCATGCTCTAGGACATTGATTAT

TGACTAGTGGAGTTCCGCGTTACATAACTTACGGTAAATGGCCCGCCTGGCTGACCGCCCAAC

GACCCCCGCCCATTGACGTCAATAATGACGTATGTTCCCATAGTAACGCCAATAGGGACTTTC

CATTGACGTCAATGGGTGGAGTATTTACGGTAAACTGCCCACTTGGCAGTACATCAAGTGTAT

CATATGCCAAGTACGCCCCCTATTGACGTCAATGACGGTAAATGGCCCGCCTGGCATTATGCC

CAGTACATGACCTTATGGGACTTTCCTACTTGGCAGTACATCTACGTATTAGTCATCGCTATT

ACCATGGTCGAGGTGAGCCCCACGTTCTGCTTCACTCTCCCCATCTCCCCCCCCTCCCCACCC

CCAATTTTGTATTTATTTATTTTTTAATTATTTTGTGCAGCGATGGGGGCGGGGGGGGGGGGG
```

-continued

GGCGCGCGCCAGGCGGGGCGGGGGGGGCGAGGGGGGGGCGGGGCGAGGCGGAGAGGTGCGGC

GGCAGCCAATCAGAGCGGCGCGCTCCGAAAGTTTCCTTTTATGGCGAGGCGGCGGCGGCGGCG

GCCCTATAAAAAGCGAAGCGCGCGGCGGGCGGGAGTCGCTGCGCGCTGCCTTCGCCCCGTGCC

CCGCTCCGCCGCCGCCTCGCGCCGCCCGCCCCGGCTCTGACTGACCGCGTTACTAAAACAGGT

AAGTCCGGCCTCCGCGCCGGGTTTTGGCGCCTCCCGCGGGCGCCCCCCTCCTCACGGCGAGCG

CTGCCACGTCAGACGAAGGGCGCAGCGAGCGTCCTGATCCTTCCGCCCGGACGCTCAGGACAG

CGGCCCGCTGCTCATAAGACTCGGCCTTAGAACCCCAGTATCAGCAGAAGGACATTTTAGGAC

GGGACTTGGGTGACTCTAGGGCACTGGTTTTCTTTCCAGAGAGCGGAACAGGCGAGGAAAAGT

AGTCCCTTCTCGGCGATTCTGCGGAGGGATCTCCGTGGGGCGGTGAACGCCGATGATGCCTCT

ACTAACCATGTTCATGTTTTCTTTTTTTTTCTACAGGTCCTGGGTGACGAACAGGGTACCGCC

ACC3'

SEQ ID NO. 2 (mRNA expression cassette No.2 - DNAse I-Fc):
5'ATGAGGGGCATGAAGCTGCTGGGGCGCTGCTGGCACTGGCGGCCCTACTGCAGGGGGCCG

TGTCCCTGAAGATCGCAGCCTTCAACATCCAGACATTTGGGGAGACCAAGATGTCCAATGCCA

CCCTCGTCAGCTACATTGTGCAGATCCTGAGCCGCTATGACATCGCCCTGGTCCAGGAGGTCA

GAGACAGCCACCTGACTGCCGTGGGAAGCTGCTGGACAACCTCAATCAGGATGCACCAGACA

CCTATCACTACGTGGTCAGTGAGCCACTGGGACGGAACAGCTATAAGGAGCGCTACCTGTTCG

TGTACAGGCCTGACCAGGTGTCTGCGGTGGACAGCTACTACTACGATGATGGCTGCGAGCCCT

GCGGGAACGACACCTTCAACCGAGAGCCAGCCATTGTCAGGTTCTTCTCCCGGTTCACAGAGG

TCAGGGAGTTTGCCATTGTTCCCCTGCATGCGGCCCCGGGGGACGCAGTAGCCGAGATCGACG

CTCTCTATGACGTCTACCTGGATGTCCAAGAGAAATGGGGCTTGGAGGACGTCATGTTGATGG

GCGACTTCAATGCGGGCTGCAGCTATGTGAGACCCTCCCAGTGGTCATCCATCCGCCTGTGGA

CAAGCCCCACCTTCCAGTGGCTGATCCCCGACAGCGCTGACACCACAGCTACACCCACGCACT

GTGCCTATGACAGGATCGTGGTTGCAGGGATGCTGCTCCGAGGCGCCGTTGTTCCCGACTCGG

CTCTTCCCTTTAACTTCCAGGCTGCCTATGGCCTGAGTGACCAACTGGCCCAAGCCATCAGTG

ACCACTATCCAGTGGAGGTGATGCTGAAGGGCGGATCAGGCGGATCACCCAAATCTTGTGACA

AAACTCACACATGCCCACCGTGCCCAGCACCTGAACTCCTGGGGGGACCGTCAGTCTTCCTCT

TCCCCCCAAAACCCAAGGACACCCTCATGATCTCCCGGACCCCTGAGGTCACATGCGTGGTGG

TGGACGTGAGCCACGAAGACCCTGAGGTCAAGTTCAACTGGTACGTGGACGGCGTGGAGGTGC

ATAATGCCAAGACAAAGCCGCGGGAGGAGCAGTACAACAGCACGTACCGTGTGGTCAGCGTCC

TCACCGTCCTGCACCAGGACTGGCTGAATGGCAAGGAGTACAAGTGCAAGGTCTCCAACAAAG

CCCTCCCAGCCCCCATCGAGAAAACCATCTCCAAAGCCAAAGGGCAGCCCCGAGAACCACAGG

TGTACACCCTGCCCCCATCCCGGGAGGAGATGACCAAGAACCAGGTCAGCCTGACCTGCCTGG

TCAAAGGCTTCTATCCCAGCGACATCGCCGTGGAGTGGGAGAGCAATGGGCAGCCGGAGAACA

ACTACAAGACCACGCCTCCCGTGCTGGACTCCGACGGCTCCTTCTTCCTCTACAGCAAGCTCA

CCGTGGACAAGAGCAGGTGGCAGCAGGGGAACGTCTTCTCATGCTCCGTGATGCATGAGGCTC

TGCACAACCACTACACGCAGAAGAGCCTCTCCCTGTCTCCGGGTAAATAG3'

SEQ ID NO. 3 (mRNA expression cassette No. 3 - TLR3-Fc):
5'GCCAGACCCTGCCGTGCATTTATTTTTGGGGCGGCCTGCTGCCGTTTGGCATGCTGTGCGC

GAGCAGCACCACCAAATGCACCGTGAGCCATGAAGTGGCGGATTGCAGCCATCTGAAACTGAC

CCAGGTGCCGGATGATCTGCCGACCAACATTACCGTGCTGAACCTGACCCATAACCAGCTGCG

-continued

```
CCGCCTGCCGGCGGCGAACTTTACCCGCTATAGCCAGCTGACCAGCCTGGATGTGGGCTTTAA
CACCATTAGCAAACTGGAACCGGAACTGTGCCAGAAACTGCCGATGCTGAAAGTGCTGAACCT
GCAGCATAACGAACTGAGCCAGCTGAGCGATAAAACCTTTGCGTTTTGCACCAACCTGACCGA
ACTGCATCTGATGAGCAACAGCATTCAGAAAATTAAAAACAACCCGTTTGTGAAACAGAAAAA
CCTGATTACCCTGGATCTGAGCCATAACGGCCTGAGCAGCACCAAACTGGGCACCCAGGTGCA
GCTGGAAAACCTGCAGGAACTGCTGCTGAGCAACAACAAAATTCAGGCGCTGAAAAGCGAAGA
ACTGGATATTTTTGCGAACAGCAGCCTGAAAAAACTGGAACTGAGCAGCAACCAGATTAAAGA
ATTTAGCCCGGGCTGCTTTCATGCGATTGGCCGCCTGTTTGGCCTGTTTCTGAACAACGTGCA
GCTGGGCCCGAGCCTGACCGAAAAACTGTGCCTGGAACTGGCGAACACCAGCATTCGCAACCT
GAGCCTGAGCAACAGCCAGCTGAGCACCACCAGCAACACCACCTTTCTGGGCCTGAAATGGAC
CAACCTGACCATGCTGGATCTGAGCTATAACAACCTGAACGTGGTGGGCAACGATAGCTTTGC
GTGGCTGCCGCAGCTGGAATATTTTTTTCTGGAATATAACAACATTCAGCATCTGTTTAGCCA
TAGCCTGCATGGCCTGTTTAACGTGCGCTATCTGAACCTGAAACGCAGCTTTACCAAACAGAG
CATTAGCCTGGCGAGCCTGCCGAAAATTGATGATTTTAGCTTTCAGTGGCTGAAATGCCTGGA
ACATCTGAACATGGAAGATAACGATATTCCGGGCATTAAAAGCAACATGTTTACCGGCCTGAT
TAACCTGAAATATCTGAGCCTGAGCAACAGCTTTACCAGCCTGCGCACCCTGACCAACGAAAC
CTTTGTGAGCCTGGCGCATAGCCCGCTGCATATTCTGAACCTGACCAAAAACAAAATTAGCAA
AATTGAAAGCGATGCGTTTAGCTGGCTGGGCCATCTGGAAGTGCTGGATCTGGGCCTGAACGA
AATTGGCCAGGAACTGACCGGCCAGGAATGGCGCGGCCTGGAAAACATTTTTGAAATTTATCT
GAGCTATAACAAATATCTGCAGCTGACCCGCAACAGCTTTGCGCTGGTGCCGAGCCTGCAGCG
CCTGATGCTGCGCCGCGTGGCGCTGAAAAACGTGGATAGCAGCCCGAGCCCGTTTCAGCCGCT
GCGCAACCTGACCATTCTGGATCTGAGCAACAACAACATTGCGAACATTAACGATGATATGCT
GGAAGGCCTGGAAAAACTGGAAATTCTGGATCTGCAGCATAACAACCTGGCGCGCCTGTGGAA
ACATGCGAACCCGGGCGGCCCGATTTATTTTCTGAAAGGCCTGAGCCATCTGCATATTCTGAA
CCTGGAAAGCAACGGCTTTGATGAAATTCCGGTGGAAGTGTTTAAAGATCTGTTTGAACTGAA
AATTATTGATCTGGGCCTGAACAACCTGAACACCCTGCCGGCGAGCGTGTTTAACAACCAGGT
GAGCCTGAAAAGCCTGAACCTGCAGAAAAACCTGATTACCAGCGTGGAAAAAAAAGTGTTTGG
CCCGGCGTTTCGCAACCTGACCGAACTGGATATGCGCTTTAACCCGTTTGATTGCACCTGCGA
AAGCATTGCGTGGTTTGTGAACTGGATTAACGAAACCCATACCAACATTCCGGAACTGAGCAG
CCATTATCTGTGCAACACCCCGCCGCATTATCATGGCTTTCCGGTGCGCCTGTTTGATACCAG
CAGCTGCAAAGATAGCGCGCCGTTTGAACTGTTTTTTATGATTAACACCAGCATTCTGCTGAT
TTTTATTTTATTGTGCTGCTGATTCATTTTGAAGGCTGGCGCATTAGCTTTTATTGGAACGT
GAGCGTGCATCGCGTGCTGGGCTTTAAAGAAATTGATCGCCAGACCGAACAGTTTGAATATGC
GGCGTATATTATTCATGCGTATAAAGATAAAGATTGGGTGTGGGAACATTTTAGCAGCATGGA
AAAAGAAGATCAGAGCCTGAAATTTTGCCTGGAAGAACGCGATTTTGAAGCGGGCGTGTTTGA
ACTGGAAGCGATTGTGAACAGCATTAAACGCAGCCGCAAAATTATTTTTGTGATTACCCATCA
TCTGCTGAAAGATCCGCTGTGCAAACGCTTTAAAGTGCATCATGCGGTGCAGCAGGCGATTGA
ACAGAACCTGGATAGCATTATTCTGGTGTTTCTGGAAGAAATTCCGGATTATAAACTGAACCA
TGCGCTGTGCCTGCGCCGCGGCATGTTTAAAAGCCATTGCATTCTGAACTGGCCGGTGCAGAA
AGAACGCATTGGCGCGTTTCGCCATAAACTGCAGGTGGCGCTGGGCAGCAAAAACAGCGTGCA
TGGGCGGATCAGGCGGATCACCCAAATCTTGTGACAAAACTCACACATGCCCACCGTGCCCAG
```

-continued

```
CACCTGAACTCCTGGGGGGACCGTCAGTCTTCCTCTTCCCCCCAAAACCCAAGGACACCCTCA
TGATCTCCCGGACCCCTGAGGTCACATGCGTGGTGGTGGACGTGAGCCACGAAGACCCTGAGG
TCAAGTTCAACTGGTACGTGGACGGCGTGGAGGTGCATAATGCCAAGACAAAGCCGCGGGAGG
AGCAGTACAACAGCACGTACCGTGTGGTCAGCGTCCTCACCGTCCTGCACCAGGACTGGCTGA
ATGGCAAGGAGTACAAGTGCAAGGTCTCCAACAAAGCCCTCCCAGCCCCCATCGAGAAAACCA
TCTCCAAAGCCAAAGGGCAGCCCCGAGAACCACAGGTGTACACCCTGCCCCCATCCCGGGAGG
AGATGACCAAGAACCAGGTCAGCCTGACCTGCCTGGTCAAAGGCTTCTATCCCAGCGACATCG
CCGTGGAGTGGGAGAGCAATGGGCAGCCGGAGAACAACTACAAGACCACGCCTCCCGTGCTGG
ACTCCGACGGCTCCTTCTTCCTCTACAGCAAGCTCACCGTGGACAAGAGCAGGTGGCAGCAGG
GGAACGTCTTCTCATGCTCCGTGATGCATGAGGCTCTGCACAACCACTACACGCAGAAGAGCC
TCTCCCTGTCTCCGGGTAAATAG3'
```

SEQ ID NO. 4 (miRNA expression cassette No. 4 - TLR9-Fc):
```
5'ATGAGGGGCATGAAGCTGCTGGGGGCGCTGCTGGCACTGGCGGCCCTACTGCAGGGGGCCG
TGTCCATGGGCTTTTGCCGCAGCGCGCTGCATCCGCTGAGCCTGCTGGTGCAGGCGATTATGC
TGGCGATGACCCTGGCGCTGGGCACCCTGCCGGCGTTTCTGCCGTGCGAACTGCAGCCGCATG
GCCTGGTGAACTGCAACTGGCTGTTTCTGAAAAGCGTGCCGCATTTTAGCATGGCGGCGCCGC
GCGGCAACGTGACCAGCCTGAGCCTGAGCAGCAACCGCATTCATCATCTGCATGATAGCGATT
TTGCGCATCTGCCGAGCCTGCGCCATCTGAACCTGAAATGGAACTGCCCGCCGGTGGGCCTGA
GCCCGATGCATTTTCCGTGCCATATGACCATTGAACCGAGCACCTTTCTGGCGGTGCCGACCC
TGGAAGAACTGAACCTGAGCTATAACAACATTATGACCGTGCCGGCGCTGCCGAAAAGCCTGA
TTAGCCTGAGCCTGAGCCATACCAACATTCTGATGCTGGATAGCGCGAGCCTGGCGGGCCTGC
ATGCGCTGCGCTTTCTGTTTATGGATGGCAACTGCTATTATAAAAACCCGTGCCGCCAGGCGC
TGGAAGTGGCGCCGGGCGCGCTGCTGGGCCTGGGCAACCTGACCCATCTGAGCCTGAAATATA
ACAACCTGACCGTGGTGCCGCGCAACCTGCCGAGCAGCCTGGAATATCTGCTGCTGAGCTATA
ACCGCATTGTGAAACTGGCGCCGGAAGATCTGGCGAACCTGACCGCGCTGCGCGTGCTGGATG
TGGGCGGCAACTGCCGCCGCTGCGATCATGCGCCGAACCCGTGCATGGAATGCCCGCGCCATT
TTCCGCAGCTGCATCCGGATACCTTTAGCCATCTGAGCCGCCTGGAAGGCCTGGTGCTGAAAG
ATAGCAGCCTGAGCTGGCTGAACGCGAGCTGGTTTCGCGGCCTGGGCAACCTGCGCGTGCTGG
ATCTGAGCGAAAACTTTCTGTATAAATGCATTACCAAAACCAAAGCGTTTCAGGGCCTGACCC
AGCTGCGCAAACTGAACCTGAGCTTTAACTATCAGAAACGCGTGAGCTTTGCGCATCTGAGCC
TGGCGCCGAGCTTTGGCAGCCTGGTGGCGCTGAAAGAACTGGATATGCATGGCATTTTTTTTC
GCAGCCTGGATGAAACCACCCTGCGCCCGCTGGCGCGCCTGCCGATGCTGCAGACCCTGCGCC
TGCAGATGAACTTTATTAACCAGGCGCAGCTGGGCATTTTTCGCGCGTTTCCGGGCCTGCGCT
ATGTGGATCTGAGCGATAACCGCATTAGCGGCGCGAGCGAACTGACCGCGACCATGGGCGAAG
CGGATGGCGGCGAAAAAGTGTGGCTGCAGCCGGGCGATCTGGCGCCGGCGCCGGTGGATACCC
CGAGCAGCGAAGATTTTCGCCCGAACTGCAGCACCCTGAACTTTACCCTGGATCTGAGCCGCA
ACAACCTGGTGACCGTGCAGCCGGAAATGTTTGCGCAGCTGAGCCATCTGCAGTGCCTGCGCC
TGAGCCATAACTGCATTAGCCAGGCGGTGAACGGCAGCCAGTTTCTGCCGCTGACCGGCCTGC
AGGTGCTGGATCTGAGCCATAACAAACTGGATCTGTATCATGAACATAGCTTTACCGAACTGC
CGCGCCTGGAAGCGCTGGATCTGAGCTATAACAGCCAGCCGTTTGGCATGCAGGGCGTGGGCC
ATAACTTTAGCTTTGTGGCGCATCTGCGCACCCTGCGCCATCTGAGCCTGGCGCATAACAACA
```

-continued

TTCATAGCCAGGTGAGCCAGCAGCTGTGCAGCACCAGCCTGCGCGCGCTGGATTTTAGCGGCA

ACGCGCTGGGCCATATGTGGGCGGAAGGCGATCTGTATCTGCATTTTTTTCAGGGCCTGAGCG

GCCTGATTTGGCTGGATCTGAGCCAGAACCGCCTGCATACCCTGCTGCCGCAGACCCTGCGCA

ACCTGCCGAAAAGCCTGCAGGTGCTGCGCCTGCGCGATAACTATCTGGCGTTTTTTAAATGGT

GGAGCCTGCATTTTCTGCCGAAACTGGAAGTGCTGGATCTGGCGGGCAACCAGCTGAAAGCGC

TGACCAACGGCAGCCTGCCGGCGGGCACCCGCCTGCGCCGCCTGGATGTGAGCTGCAACAGCA

TTAGCTTTGTGGCGCCGGGCTTTTTTAGCAAAGCGAAAGAACTGCGCGAACTGAACCTGAGCG

CGAACGCGCTGAAAACCGTGGATCATAGCTGGTTTGGCCCGCTGGCGAGCGCGCTGCAGATTC

TGGATGTGAGCGCGAACCCGCTGCATTGCGCGTGCGGCGCGGCGTTTATGGATTTTCTGCTGG

AAGTGCAGGCGGCGGTGCCGGGCCTGCCGAGCCGCGTGAAATGCGGCAGCCCGGGCCAGCTGC

AGGGCCTGAGCATTTTTGCGCAGGATCTGCGCCTGTGCCTGGATGAAGCGCTGAGCTGGGATT

GCTTTGCGCTGAGCCTGCTGGCGGTGGCGCTGGGCCTGGGCGTGCCGATGCTGCATCATCTGT

GCGGCTGGGATCTGTGGTATTGCTTTCATCTGTGCCTGGCGTGGCTGCCGTGGCGCGGCCGCC

AGAGCGGCCGCGATGAAGATGCGCTGCCGTATGATGCGTTTGTGGTGTTTGATAAAACCCAGA

GCGCGGTGGCGGATTGGGTGTATAACGAACTGCGCGGCCAGCTGGAAGAATGCCGCGGCCGCT

GGGCGCTGCGCCTGTGCCTGGAAGAACGCGATTGGCTGCCGGGCAAAACCCTGTTTGAAAACC

TGTGGGCGAGCGTGTATGGCAGCCGCAAAACCCTGTTTGTGCTGGCGCATACCGATCGCGTGA

GCGGCCTGCTGCGCGCGAGCTTTCTGCTGGCGCAGCAGCGCCTGCTGGAAGATCGCAAAGATG

TGGTGGTGCTGGTGATTCTGAGCCCGGATGGCCGCCGCAGCCGCTATGTGCGCCTGCGCCAGC

GCCTGTGCCGCCAGAGCGTGCTGCTGTGGCCGCATCAGCCGAGCGGCCAGCGCAGCTTTTGGG

CGCAGCTGGGCATGGCGCTGACCCGCGATAACCATCATTTTTATAACCGCAACTTTTGCCAGG

GCCCGACCGCGAAGGGCGGATCAGGCGGATCACCCAAATCTTGTGACAAAACTCACACATGC

CCACCGTGCCCAGCACCTGAACTCCTGGGGGGACCGTCAGTCTTCCTCTTCCCCCCAAAACCC

AAGGACACCCTCATGATCTCCCGGACCCCTGAGGTCACATGCGTGGTGGTGGACGTGAGCCAC

GAAGACCCTGAGGTCAAGTTCAACTGGTACGTGGACGGCGTGGAGGTGCATAATGCCAAGACA

AAGCCGCGGGAGGAGCAGTACAACAGCACGTACCGTGTGGTCAGCGTCCTCACCGTCCTGCAC

CAGGACTGGCTGAATGGCAAGGAGTACAAGTGCAAGGTCTCCAACAAAGCCCTCCCAGCCCCC

ATCGAGAAAACCATCTCCAAAGCCAAAGGGCAGCCCCGAGAACCACAGGTGTACACCCTGCCC

CCATCCCGGGAGGAGATGACCAAGAACCAGGTCAGCCTGACCTGCCTGGTCAAAGGCTTCTAT

CCCAGCGACATCGCCGTGGAGTGGGAGAGCAATGGGCAGCCGGAGAACAACTACAAGACCACG

CCTCCCGTGCTGGACTCCGACGGCTCCTTCTTCCTCTACAGCAAGCTCACCGTGGACAAGAGC

AGGTGGCAGCAGGGGAACGTCTTCTCATGCTCCGTGATGCATGAGGCTCTGCACAACCACTAC

ACGCAGAAGAGCCTCTCCCTGTCTCCGGGTAAATAG3'

SEQ ID NO. 5 (mRNA expression cassette No. 5 - NGF-Fc):
5'ATGAGGGGCATGAAGCTGCTGGGGCGCTGCTGGCACTGGCGGCCCTACTGCAGGGGGCCG

TGTCCATGAGCATGCTGTTTTATACCCTGATTACCGCGTTTCTGATTGGCATTCAGGCGGAAC

CGCATAGCGAAAGCAACGTGCCGGCGGGCCATACCATTCCGCAGGCGCATTGGACCAAACTGC

AGCATAGCCTGGATACCGCGCTGCGCCGCGCGCGCAGCGCGCCGGCGGCGGCGATTGCGGCGC

GCGTGGCGGGCCAGACCCGCAACATTACCGTGGATCCGCGCCTGTTTAAAAAACGCCGCCTGC

GCAGCCCGCGCGTGCTGTTTAGCACCCAGCCGCCGCGCGAAGCGGCGGATACCCAGGATCTGG

ATTTTGAAGTGGGCGGCGCGGCGCCGTTTAACCGCACCCATCGCAGCAAACGCAGCAGCAGCC

-continued

ATCCGATTTTTCATCGCGGCGAATTTAGCGTGTGCGATAGCGTGAGCGTGTGGGTGGGCGATA

AAACCACCGCGACCGATATTAAAGGCAAAGAAGTGATGGTGCTGGGCGAAGTGAACATTAACA

ACAGCGTGTTTAAACAGTATTTTTTTGAAACCAAATGCCGCGATCCGAACCCGGTGGATAGCG

GCTGCCGCGGCATTGATAGCAAACATTGGAACAGCTATTGCACCACCACCCATACCTTTGTGA

AAGCGCTGACCATGGATGGCAAACAGGCGGCGTGGCGCTTTATTCGCATTGATACCGCGTGCG

TGTGCGTGCTGAGCCGAAAGCGGTGCGCCGCGCGGGCGGATCAGGCGGATCACCCAAATCTT

GTGACAAAACTCACACATGCCCACCGTGCCCAGCACCTGAACTCCTGGGGGACCGTCAGTCT

TCCTCTTCCCCCCAAAACCCAAGGACACCCTCATGATCTCCCGGACCCCTGAGGTCACATGCG

TGGTGGTGGACGTGAGCCACGAAGACCCTGAGGTCAAGTTCAACTGGTACGTGGACGGCGTGG

AGGTGCATAATGCCAAGACAAAGCCGCGGGAGGAGCAGTACAACAGCACGTACCGTGTGGTCA

GCGTCCTCACCGTCCTGCACCAGGACTGGCTGAATGGCAAGGAGTACAAGTGCAAGGTCTCCA

ACAAAGCCCTCCCAGCCCCCATCGAGAAAACCATCTCCAAAGCCAAAGGGCAGCCCCGAGAAC

CACAGGTGTACACCCTGCCCCCATCCCGGGAGGAGATGACCAAGAACCAGGTCAGCCTGACCT

GCCTGGTCAAAGGCTTCTATCCCAGCGACATCGCCGTGGAGTGGGAGAGCAATGGGCAGCCGG

AGAACAACTACAAGACCACGCCTCCCGTGCTGGACTCCGACGGCTCCTTCTTCCTCTACAGCA

AGCTCACCGTGGACAAGAGCAGGTGGCAGCAGGGGAACGTCTTCTCATGCTCCGTGATGCATG

AGGCTCTGCACAACCACTACACGCAGAAGAGCCTCTCCCTGTCTCCGGGTAAATAG3'

SEQ ID NO. 6 (mRNA expression cassette No. 6 - insulin-Fc):
5'ATGAGGGGCATGAAGCTGCTGGGGGCGCTGCTGGCACTGGCGGCCCTACTGCAGGGGGCCG

TGTCCATGGCGCTGTGGATGCGCCTGCTGCCGCTGCTGGCGCTGCTGGCGCTGTGGGGCCCGG

ATCCGGCGGCGGCGTTTGTGAACCAGCATCTGTGCGGCAGCCATCTGGTGGAAGCGCTGTATC

TGGTGTGCGGCGAACGCGGCTTTTTTTATACCCCGAAAACCCGCCGCGAAGCGGAAGATCTGC

AGGTGGGCCAGGTGGAACTGGCGGCGGCCCGGGCGCGGGCAGCCTGCAGCCGCTGGCGCTGG

AAGGCAGCCTGCAGAAACGCGGCATTGTGGAACAGTGCTGCACCAGCATTTGCAGCCTGTATC

AGCTGGAAAACTATTGCAACGGGCGGATCAGGCGGATCACCCAAATCTTGTGACAAAACTCAC

ACATGCCCACCGTGCCCAGCACCTGAACTCCTGGGGGACCGTCAGTCTTCCTCTTCCCCCCA

AAACCCAAGGACACCCTCATGATCTCCCGGACCCCTGAGGTCACATGCGTGGTGGTGGACGTG

AGCCACGAAGACCCTGAGGTCAAGTTCAACTGGTACGTGGACGGCGTGGAGGTGCATAATGCC

AAGACAAAGCCGCGGGAGGAGCAGTACAACAGCACGTACCGTGTGGTCAGCGTCCTCACCGTC

CTGCACCAGGACTGGCTGAATGGCAAGGAGTACAAGTGCAAGGTCTCCAACAAAGCCCTCCCA

GCCCCCATCGAGAAAACCATCTCCAAAGCCAAAGGGCAGCCCCGAGAACCACAGGTGTACACC

CTGCCCCCATCCCGGGAGGAGATGACCAAGAACCAGGTCAGCCTGACCTGCCTGGTCAAAGGC

TTCTATCCCAGCGACATCGCCGTGGAGTGGGAGAGCAATGGGCAGCCGGAGAACAACTACAAG

ACCACGCCTCCCGTGCTGGACTCCGACGGCTCCTTCTTCCTCTACAGCAAGCTCACCGTGGAC

AAGAGCAGGTGGCAGCAGGGGAACGTCTTCTCATGCTCCGTGATGCATGAGGCTCTGCACAAC

CACTACACGCAGAAGAGCCTCTCCCTGTCTCCGGGTAAATAG3'

SEQ ID NO: 7 = SEQ ID NO: 1 + SEQ ID NO: 2
5'TTCTAGAATAATCAACCTCTGGATTACAAAATTTGTGAAAGATTGACTGGTATTCTTAACT

ATGTTGCTCCTTTTACGCTATGTGGATACGCTGCTTTAATGCCTTTGTATCATGCTATTGCTT

CCCGTATGGCTTTCATTTTCTCCTCCTTGTATAAATCCTGGTTGCTGTCTCTTTATGAGGAGT

TGTGGCCCGTTGTCAGGCAACGTGGCGTGGTGTGCACTGTGTTTGCTGACGCAACCCCCACTG

-continued

```
GTTGGGGCATTGCCACCACCTGTCAGCTCCTTTCCGGGACTTTCGCTTTCCCCCTCCCTATTG

CCACGGCGGAACTCATCGCCGCCTGCCTTGCCCGCTGCTGGACAGGGGCTCGGCTGTTGGGCA

CTGACAATTCCGTGGTGTTGTCGGGGAAATCATCGTCCTTTCCTTGGCTGCTCGCCTGTGTTG

CCACCTGGATTCTGCGCGGGACGTCCTTCTGCTACGTCCCTTCGGCCCTCAATCCAGCGGACC

TTCCTTCCCGCGGCCTGCTGCCGGCTCTGCGGCCTCTTCCGCGTCTTCGCCTTCGCCCTCAGA

CGAGTCGGATCTCCCTTTGGGCCGCCTCCCCGCCTAAGCTTATCGATACCGTCGAGATCTAAC

TTGTTTATTGCAGCTTATAATGGTTACAAATAAAGCAATAGCATCACAAATTTCACAAATAAA

GCATTTTTTTCACTGCATTCTAGTTGTGGTTTGTCCAAACTCATCAATGTATCTTATCATGTC

TGGATCTCGACCTCGACTAGAGCATGGCTACGTAGATAAGTAGCATGGCGGGTTAATCATTAA

CTACAAGGAACCCCTAGTGATGGAGTTGGCCACTCCCTCTCTGCGCGCTCGCTCGCTCACTGA

GGCCGGGCGACCAAAGGTCGCCCGACGCCCGGGCTTTGCCCGGGCGGCCTCAGTGAGCGAGCG

AGCGCGCCAGCTGGCGTAATAGCGAAGAGGCCCGCACCGATCGCCCTTCCCAACAGTTGCGCA

GCCTGAATGGCGAATGGAATTCCAGACGATTGAGCGTCAAAATGTAGGTATTTCCATGAGCGT

TTTTCCTGTTGCAATGGCTGGCGGTAATATTGTTCTGGATATTACCAGCAAGGCCGATAGTTT

GAGTTCTTCTACTCAGGCAAGTGATGTTATTACTAATCAAAGAAGTATTGCGACAACGGTTAA

TTTGCGTGATGGACAGACTCTTTTACTCGGTGGCCTCACTGATTATAAAAACACTTCTCAGGA

TTCTGGCGTACCGTTCCTGTCTAAAATCCCTTTAATCGGCCTCCTGTTTAGCTCCCGCTCTGA

TTCTAACGAGGAAAGCACGTTATACGTGCTCGTCAAAGCAACCATAGTACGCGCCCTGTAGCG

GCGCATTAAGCGCGGCGGGTGTGGTGGTTACGCGCAGCGTGACCGCTACACTTGCCAGCGCCC

TAGCGCCCGCTCCTTTCGCTTTCTTCCCTTCCTTTCTCGCCACGTTCGCCGGCTTTCCCCGTC

AAGCTCTAAATCGGGGGCTCCCTTTAGGGTTCCGATTTAGTGCTTTACGGCACCTCGACCCCA

AAAAACTTGATTAGGGTGATGGTTCACGTAGTGGGCCATCGCCCTGATAGACGGTTTTTCGCC

CTTTGACGTTGGAGTCCACGTTCTTTAATAGTGGACTCTTGTTCCAAACTGGAACAACACTCA

ACCCTATCTCGGTCTATTCTTTTGATTTATAAGGGATTTTGCCGATTTCGGCCTATTGGTTAA

AAAATGAGCTGATTTAACAAAAATTTAACGCGAATTTTAACAAAATATTAACGTTTACAATTT

AAATATTTGCTTATACAATCTTCCTGTTTTTGGGGCTTTTCTGATTATCAACCGGGGTACATA

TGATTGACATGCTAGTTTTACGATTACCGTTCATCGATTCTCTTGTTTGCTCCAGACTCTCAG

GCAATGACCTGATAGCCTTTGTAGAGACCTCTCAAAAATAGCTACCCTCTCCGGCATGAATTT

ATCAGCTAGAACGGTTGAATATCATATTGATGGTGATTTGACTGTCTCCGGCCTTTCTCACCC

GTTTGAATCTTTACCTACACATTACTCAGGCATTGCATTTAAAATATATGAGGGTTCTAAAAA

TTTTTATCCTTGCGTTGAAATAAAGGCTTCTCCCGCAAAAGTATTACAGGGTCATAATGTTTT

TGGTACAACCGATTTAGCTTTATGCTCTGAGGCTTTATTGCTTAATTTTGCTAATTCTTTGCC

TTGCCTGTATGATTTATTGGATGTTGGAATTCCTGATGCGGTATTTTCTCCTTACGCATCTGT

GCGGTATTTCACACCGCATATGGTGCACTCTCAGTACAATCTGCTCTGATGCCGCATAGTTAA

GCCAGCCCCGACACCCGCCAACACCCGCTGACGCGCCCTGACGGGCTTGTCTGCTCCCGGCAT

CCGCTTACAGACAAGCTGTGACCGTCTCCGGGAGCTGCATGTGTCAGAGGTTTTCACCGTCAT

CACCGAAACGCGCGAGACGAAAGGGCCTCGTGATACGCCTATTTTTATAGGTTAATGTCATGA

TAATAATGGTTTCTTAGACGTCAGGTGGCACTTTCGGGGAAATGTGCGCGGAACCCCTATTT

GTTTATTTTTCTAAATACATTCAAATATGTATCCGCTCATGAGACAATAACCCTGATAAATGC

TTCAATAATATTGAAAAAGGAAGAGTATGAGTATTCAACATTTCC+NLGTGTCGCCCTTATTC

CCTTTTTTGCGGCATTTTGCCTTCCTGTTTTTGCTCACCCAGAAACGCTGGTGAAAGTAAAAG
```

-continued

```
ATGCTGAAGATCAGTTGGGTGCACGAGTGGGTTACATCGAACTGGATCTCAACAGCGGTAAGA

TCCTTGAGAGTTTTCGCCCCGAAGAACGTTTTCCAATGATGAGCACTTTTAAAGTTCTGCTAT

GTGGCGCGGTATTATCCCGTATTGACGCCGGGCAAGAGCAACTCGGTCGCCGCATACACTATT

CTCAGAATGACTTGGTTGAGTACTCACCAGTCACAGAAAAGCATCTTACGGATGGCATGACAG

TAAGAGAATTATGCAGTGCTGCCATAACCATGAGTGATAACACTGCGGCCAACTTACTTCTGA

CAACGATCGGAGGACCGAAGGAGCTAACCGCTTTTTTGCACAACATGGGGGATCATGTAACTC

GCCTTGATCGTTGGGAACCGGAGCTGAATGAAGCCATACCAAACGACGAGCGTGACACCACGA

TGCCTGTAGCAATGGCAACAACGTTGCGCAAACTATTAACTGGCGAACTACTTACTCTAGCTT

CCCGGCAACAATTAATAGACTGGATGGAGGCGGATAAAGTTGCAGGACCACTTCTGCGCTCGG

CCCTTCCGGCTGGCTGGTTTATTGCTGATAAATCTGGAGCCGGTGAGCGTGGGTCTCGCGGTA

TCATTGCAGCACTGGGGCCAGATGGTAAGCCCTCCCGTATCGTAGTTATCTACACGACGGGGA

GTCAGGCAACTATGGATGAACGAAATAGACAGATCGCTGAGATAGGTGCCTCACTGATTAAGC

ATTGGTAACTGTCAGACCAAGTTTACTCATATATACTTTAGATTGATTTAAAACTTCATTTTT

AATTTAAAAGGATCTAGGTGAAGATCCTTTTTGATAATCTCATGACCAAAATCCCTTAACGTG

AGTTTTCGTTCCACTGAGCGTCAGACCCCGTAGAAAAGATCAAAGGATCTTCTTGAGATCCTT

TTTTTCTGCGCGTAATCTGCTGCTTGCAAACAAAAAAACCACCGCTACCAGCGGTGGTTTGTT

TGCCGGATCAAGAGCTACCAACTCTTTTTCCGAAGGTAACTGGCTTCAGCAGAGCGCAGATAC

CAAATACTGTCCTTCTAGTGTAGCCGTAGTTAGGCCACCACTTCAAGAACTCTGTAGCACCGC

CTACATACCTCGCTCTGCTAATCCTGTTACCAGTGGCTGCTGCCAGTGGCGATAAGTCGTGTC

TTACCGGGTTGGACTCAAGACGATAGTTACCGGATAAGGCGCAGCGGTCGGGCTGAACGGGGG

GTTCGTGCACACAGCCCAGCTTGGAGCGAACGACCTACACCGAACTGAGATACCTACAGCGTG

AGCTATGAGAAAGCGCCACGCTTCCCGAAGGGAGAAAGGCGGACAGGTATCCGGTAAGCGGCA

GGGTCGGAACAGGAGAGCGCACGAGGGAGCTTCCAGGGGGAAACGCCTGGTATCTTTATAGTC

CTGTCGGGTTTCGCCACCTCTGACTTGAGCGTCGATTTTTGTGATGCTCGTCAGGGGGGCGGA

GCCTATGGAAAAACGCCAGCAACGCGGCCTTTTTACGGTTCCTGGCCTTTTGCTGGCCTTTTG

CTCACATGTTCTTTCCTGCGTTATCCCCTGATTCTGTGGATAACCGTATTACCGCCTTTGAGT

GAGCTGATACCGCTCGCCGCAGCCGAACGACCGAGCGCAGCGAGTCAGTGAGCGAGGAAGCGG

AAGAGCGCCCAATACGCAAACCGCCTCTCCCCGCGCGTTGGCCGATTCATTAATGCAGCAGCT

GCGCGCTCGCTCGCTCACTGAGGCCGCCCGGGCAAAGCCCGGGCGTCGGGCGACCTTTGGTCG

CCCGGCCTCAGTGAGCGAGCGAGCGCGCAGAGAGGGAGTGGCCAACTCCATCACTAGGGGTTC

CTTGTAGTTAATGATTAACCCGCCATGCTACTTATCTACGTAGCCATGCTCTAGGACATTGAT

TATTGACTAGTGGAGTTCCGCGTTACATAACTTACGGTAAATGGCCCGCCTGGCTGACCGCCC

AACGACCCCCGCCCATTGACGTCAATAATGACGTATGTTCCCATAGTAACGCCAATAGGGACT

TTCCATTGACGTCAATGGGTGGAGTATTTACGGTAAACTGCCCACTTGGCAGTACATCAAGTG

TATCATATGCCAAGTACGCCCCCTATTGACGTCAATGACGGTAAATGGCCCGCCTGGCATTAT

GCCCAGTACATGACCTTATGGGACTTTCCTACTTGGCAGTACATCTACGTATTAGTCATCGCT

ATTACCATGGTCGAGGTGAGCCCCACGTTCTGCTTCACTCTCCCCATCTCCCCCCCCTCCCCA

CCCCCAATTTTGTATTTATTTATTTTTAATTATTTTGTGCAGCGATGGGGGCGGGGGGGGGG

GGGGCGCGCGCCAGGCGGGGCGGGGGGGGCGAGGGGCGGGCGGGGCGAGGCGGAGAGGTG

CGGCGGCAGCCAATCAGAGCGGCGCGCTCCGAAAGTTTCCTTTTATGGCGAGGCGGCGGCGGC
```

-continued

GGCGGCCCTATAAAAAGCGAAGCGCGCGGCGGGCGGGAGTCGCTGCGCGCTGCCTTCGCCCCG

TGCCCCGCTCCGCCGCCGCCTCGCGCCGCCCGCCCCGGCTCTGACTGACCGCGTTACTAAAAC

AGGTAAGTCCGGCCTCCGCGCCGGGTTTTGGCGCCTCCCGCGGGCGCCCCCCTCCTCACGGCG

AGCGCTGCCACGTCAGACGAAGGGCGCAGCGAGCGTCCTGATCCTTCCGCCCGGACGCTCAGG

ACAGCGGCCCGCTGCTCATAAGACTCGGCCTTAGAACCCCAGTATCAGCAGAAGGACATTTTA

GGACGGGACTTGGGTGACTCTAGGGCACTGGTTTTCTTTCCAGAGAGCGGAACAGGCGAGGAA

AAGTAGTCCCTTCTCGGCGATTCTGCGGAGGGATCTCCGTGGGGCGGTGAACGCCGATGATGC

CTCTACTAACCATGTTCATGTTTTCTTTTTTTTTCTACAGGTCCTGGGTGACGAACAGGGTAC

CGCCACCATGAGGGGCATGAAGCTGCTGGGGCGCTGCTGGCACTGGCGGCCCTACTGCAGGG

GGCCGTGTCCCTGAAGATCGCAGCCTTCAACATCCAGACATTTGGGGAGACCAAGATGTCCAA

TGCCACCCTCGTCAGCTACATTGTGCAGATCCTGAGCCGCTATGACATCGCCCTGGTCCAGGA

GGTCAGAGACAGCCACCTGACTGCCGTGGGGAAGCTGCTGGACAACCTCAATCAGGATGCACC

AGACACCTATCACTACGTGGTCAGTGAGCCACTGGGACGGAACAGCTATAAGGAGCGCTACCT

GTTCGTGTACAGGCCTGACCAGGTGTCTGCGGTGGACAGCTACTACTACGATGATGGCTGCGA

GCCCTGCGGGAACGACACCTTCAACCGAGAGCCAGCCATTGTCAGGTTCTTCTCCCGGTTCAC

AGAGGTCAGGGAGTTTGCCATTGTTCCCCTGCATGCGGCCCCGGGGGACGCAGTAGCCGAGAT

CGACGCTCTCTATGACGTCTACCTGGATGTCCAAGAGAAATGGGGCTTGGAGGACGTCATGTT

GATGGGCGACTTCAATGCGGGCTGCAGCTATGTGAGACCCTCCCAGTGGTCATCCATCCGCCT

GTGGACAAGCCCCACCTTCCAGTGGCTGATCCCCGACAGCGCTGACACCACAGCTACACCCAC

GCACTGTGCCTATGACAGGATCGTGGTTGCAGGGATGCTGCTCCGAGGCGCCGTTGTTCCCGA

CTCGGCTCTTCCCTTTAACTTCCAGGCTGCCTATGGCCTGAGTGACCAACTGGCCCAAGCCAT

CAGTGACCACTATCCAGTGGAGGTGATGCTGAAGGGCGGATCAGGCGGATCACCCAAATCTTG

TGACAAAACTCACACATGCCCACCGTGCCCAGCACCTGAACTCCTGGGGGGACCGTCAGTCTT

CCTCTTCCCCCCAAAACCCAAGGACACCCTCATGATCTCCCGGACCCCTGAGGTCACATGCGT

GGTGGTGGACGTGAGCCACGAAGACCCTGAGGTCAAGTTCAACTGGTACGTGGACGGCGTGGA

GGTGCATAATGCCAAGACAAAGCCGCGGGAGGAGCAGTACAACAGCACGTACCGTGTGGTCAG

CGTCCTCACCGTCCTGCACCAGGACTGGCTGAATGGCAAGGAGTACAAGTGCAAGGTCTCCAA

CAAAGCCCTCCCAGCCCCCATCGAGAAAACCATCTCCAAAGCCAAAGGGCAGCCCCGAGAACC

ACAGGTGTACACCCTGCCCCCATCCCGGGAGGAGATGACCAAGAACCAGGTCAGCCTGACCTG

CCTGGTCAAAGGCTTCTATCCCAGCGACATCGCCGTGGAGTGGGAGAGCAATGGGCAGCCGGA

GAACAACTACAAGACCACGCCTCCCGTGCTGGACTCCGACGGCTCCTTCTTCCTCTACAGCAA

GCTCACCGTGGACAAGAGCAGGTGGCAGCAGGGGAACGTCTTCTCATGCTCCGTGATGCATGA

GGCTCTGCACAACCACTACACGCAGAAGAGCCTCTCCCTGTCTCCGGGTAAATAG3'

SEQ ID NO: 8 = SEQ ID NO: 1 + SEQ ID NO: 3
5'TTCTAGAATAATCAACCTCTGGATTACAAAATTTGTGAAAGATTGACTGGTATTCTTAACT

ATGTTGCTCCTTTTACGCTATGTGGATACGCTGCTTTAATGCCTTTGTATCATGCTATTGCTT

CCCGTATGGCTTTCATTTTCTCCTCCTTGTATAAATCCTGGTTGCTGTCTCTTTATGAGGAGT

TGTGGCCCGTTGTCAGGCAACGTGGCGTGGTGTGCACTGTGTTTGCTGACGCAACCCCCACTG

GTTGGGGCATTGCCACCACCTGTCAGCTCCTTTCCGGGACTTTCGCTTTCCCCCTCCCTATTG

CCACGGCGGAACTCATCGCCGCCTGCCTTGCCCGCTGCTGGACAGGGGCTCGGCTGTTGGGCA

CTGACAATTCCGTGGTGTTGTCGGGGAAATCATCGTCCTTTCCTTGGCTGCTCGCCTGTGTTG

-continued

```
CCACCTGGATTCTGCGCGGGACGTCCTTCTGCTACGTCCCTTCGGCCCTCAATCCAGCGGACC

TTCCTTCCCGCGGCCTGCTGCCGGCTCTGCGGCCTCTTCCGCGTCTTCGCCTTCGCCCTCAGA

CGAGTCGGATCTCCCTTTGGGCCGCCTCCCCGCCTAAGCTTATCGATACCGTCGAGATCTAAC

TTGTTTATTGCAGCTTATAATGGTTACAAATAAAGCAATAGCATCACAAATTTCACAAATAAA

GCATTTTTTCACTGCATTCTAGTTGTGGTTTGTCCAAACTCATCAATGTATCTTATCATGTC

TGGATCTCGACCTCGACTAGAGCATGGCTACGTAGATAAGTAGCATGGCGGGTTAATCATTAA

CTACAAGGAACCCCTAGTGATGGAGTTGGCCACTCCCTCTCTGCGCGCTCGCTCGCTCACTGA

GGCCGGGCGACCAAAGGTCGCCCGACGCCCGGGCTTTGCCCGGGCGGCCTCAGTGAGCGAGCG

AGCGCGCCAGCTGGCGTAATAGCGAAGAGGCCCGCACCGATCGCCCTTCCCAACAGTTGCGCA

GCCTGAATGGCGAATGGAATTCCAGACGATTGAGCGTCAAAATGTAGGTATTTCCATGAGCGT

TTTTCCTGTTGCAATGGCTGGCGGTAATATTGTTCTGGATATTACCAGCAAGGCCGATAGTTT

GAGTTCTTCTACTCAGGCAAGTGATGTTATTACTAATCAAAGAAGTATTGCGACAACGGTTAA

TTTGCGTGATGGACAGACTCTTTTACTCGGTGGCCTCACTGATTATAAAAACACTTCTCAGGA

TTCTGGCGTACCGTTCCTGTCTAAAATCCCTTTAATCGGCCTCCTGTTTAGCTCCCGCTCTGA

TTCTAACGAGGAAAGCACGTTATACGTGCTCGTCAAAGCAACCATAGTACGCGCCCTGTAGCG

GCGCATTAAGCGCGGCGGGTGTGGTGGTTACGCGCAGCGTGACCGCTACACTTGCCAGCGCCC

TAGCGCCCGCTCCTTTCGCTTTCTTCCCTTCCTTTCTCGCCACGTTCGCCGGCTTTCCCCGTC

AAGCTCTAAATCGGGGGCTCCCTTTAGGGTTCCGATTTAGTGCTTTACGGCACCTCGACCCCA

AAAAACTTGATTAGGGTGATGGTTCACGTAGTGGGCCATCGCCCTGATAGACGGTTTTTCGCC

CTTTGACGTTGGAGTCCACGTTCTTTAATAGTGGACTCTTGTTCCAAACTGGAACAACACTCA

ACCCTATCTCGGTCTATTCTTTTGATTTATAAGGGATTTTGCCGATTTCGGCCTATTGGTTAA

AAAATGAGCTGATTTAACAAAAATTTAACGCGAATTTTAACAAAATATTAACGTTTACAATTT

AAATATTTGCTTATACAATCTTCCTGTTTTTGGGGCTTTTCTGATTATCAACCGGGGTACATA

TGATTGACATGCTAGTTTTACGATTACCGTTCATCGATTCTCTTGTTTGCTCCAGACTCTCAG

GCAATGACCTGATAGCCTTTGTAGAGACCTCTCAAAAATAGCTACCCTCTCCGGCATGAATTT

ATCAGCTAGAACGGTTGAATATCATATTGATGGTGATTTGACTGTCTCCGGCCTTTCTCACCC

GTTTGAATCTTTACCTACACATTACTCAGGCATTGCATTTAAAATATATGAGGGTTCTAAAAA

TTTTTATCCTTGCGTTGAAATAAAGGCTTCTCCCGCAAAAGTATTACAGGGTCATAATGTTTT

TGGTACAACCGATTTAGCTTTATGCTCTGAGGCTTTATTGCTTAATTTTGCTAATTCTTTGCC

TTGCCTGTATGATTTATTGGATGTTGGAATTCCTGATGCGGTATTTTCTCCTTACGCATCTGT

GCGGTATTTCACACCGCATATGGTGCACTCTCAGTACAATCTGCTCTGATGCCGCATAGTTAA

GCCAGCCCCGACACCCGCCAACACCCGCTGACGCGCCCTGACGGGCTTGTCTGCTCCCGGCAT

CCGCTTACAGACAAGCTGTGACCGTCTCCGGGAGCTGCATGTGTCAGAGGTTTTCACCGTCAT

CACCGAAACGCGCGAGACGAAAGGGCCTCGTGATACGCCTATTTTTATAGGTTAATGTCATGA

TAATAATGGTTTCTTAGACGTCAGGTGGCACTTTTCGGGGAAATGTGCGCGGAACCCCTATTT

GTTTATTTTTCTAAATACATTCAAATATGTATCCGCTCATGAGACAATAACCCTGATAAATGC

TTCAATAATATTGAAAAAGGAAGAGTATGAGTATTCAACATTTCCGTGTCGCCCTTATTCCCT

TTTTTGCGGCATTTTGCCTTCCTGTTTTTGCTCACCCAGAAACGCTGGTGAAAGTAAAAGATG

CTGAAGATCAGTTGGGTGCACGAGTGGGTTACATCGAACTGGATCTCAACAGCGGTAAGATCC

TTGAGAGTTTTCGCCCCGAAGAACGTTTTCCAATGATGAGCACTTTTAAAGTTCTGCTATGTG

GCGCGGTATTATCCCGTATTGACGCCGGGCAAGAGCAACTCGGTCGCCGCATACACTATTCTC
```

-continued

```
AGAATGACTTGGTTGAGTACTCACCAGTCACAGAAAAGCATCTTACGGATGGCATGACAGTAA
GAGAATTATGCAGTGCTGCCATAACCATGAGTGATAACACTGCGGCCAACTTACTTCTGACAA
CGATCGGAGGACCGAAGGAGCTAACCGCTTTTTTGCACAACATGGGGGATCATGTAACTCGCC
TTGATCGTTGGGAACCGGAGCTGAATGAAGCCATACCAAACGACGAGCGTGACACCACGATGC
CTGTAGCAATGGCAACAACGTTGCGCAAACTATTAACTGGCGAACTACTTACTCTAGCTTCCC
GGCAACAATTAATAGACTGGATGGAGGCGGATAAAGTTGCAGGACCACTTCTGCGCTCGGCCC
TTCCGGCTGGCTGGTTTATTGCTGATAAATCTGGAGCCGGTGAGCGTGGGTCTCGCGGTATCA
TTGCAGCACTGGGGCCAGATGGTAAGCCCTCCCGTATCGTAGTTATCTACACGACGGGGAGTC
AGGCAACTATGGATGAACGAAATAGACAGATCGCTGAGATAGGTGCCTCACTGATTAAGCATT
GGTAACTGTCAGACCAAGTTTACTCATATATACTTTAGATTGATTTAAAACTTCATTTTTAAT
TTAAAAGGATCTAGGTGAAGATCCTTTTTGATAATCTCATGACCAAAATCCCTTAACGTGAGT
TTTCGTTCCACTGAGCGTCAGACCCCGTAGAAAAGATCAAAGGATCTTCTTGAGATCCTTTTT
TTCTGCGCGTAATCTGCTGCTTGCAAACAAAAAAACCACCGCTACCAGCGGTGGTTTGTTTGC
CGGATCAAGAGCTACCAACTCTTTTTCCGAAGGTAACTGGCTTCAGCAGAGCGCAGATACCAA
ATACTGTCCTTCTAGTGTAGCCGTAGTTAGGCCACCACTTCAAGAACTCTGTAGCACCGCCTA
CATACCTCGCTCTGCTAATCCTGTTACCAGTGGCTGCTGCCAGTGGCGATAAGTCGTGTCTTA
CCGGGTTGGACTCAAGACGATAGTTACCGGATAAGGCGCAGCGGTCGGGCTGAACGGGGGGTT
CGTGCACACAGCCCAGCTTGGAGCGAACGACCTACACCGAACTGAGATACCTACAGCGTGAGC
TATGAGAAAGCGCCACGCTTCCCGAAGGGAGAAAGGCGGACAGGTATCCGGTAAGCGGCAGGG
TCGGAACAGGAGAGCGCACGAGGGAGCTTCCAGGGGAAACGCCTGGTATCTTTATAGTCCTG
TCGGGTTTCGCCACCTCTGACTTGAGCGTCGATTTTTGTGATGCTCGTCAGGGGGCGGAGCC
TATGGAAAAACGCCAGCAACGCGGCCTTTTTACGGTTCCTGGCCTTTTGCTGGCCTTTTGCTC
ACATGTTCTTTCCTGCGTTATCCCCTGATTCTGTGGATAACCGTATTACCGCCTTTGAGTGAG
CTGATACCGCTCGCCGCAGCCGAACGACCGAGCGCAGCGAGTCAGTGAGCGAGGAAGCGGAAG
AGCGCCCAATACGCAAACCGCCTCTCCCCGCGCGTTGGCCGATTCATTAATGCAGCAGCTGCG
CGCTCGCTCGCTCACTGAGGCCGCCCGGGCAAAGCCCGGGCGTCGGGCGACCTTTGGTCGCCC
GGCCTCAGTGAGCGAGCGAGCGCGCAGAGAGGGAGTGGCCAACTCCATCACTAGGGGTTCCTT
GTAGTTAATGATTAACCCGCCATGCTACTTATCTACGTAGCCATGCTCTAGGACATTGATTAT
TGACTAGTGGAGTTCCGCGTTACATAACTTACGGTAAATGGCCCGCCTGGCTGACCGCCCAAC
GACCCCCGCCCATTGACGTCAATAATGACGTATGTTCCCATAGTAACGCCAATAGGGACTTTC
CATTGACGTCAATGGGTGGAGTATTTACGGTAAACTGCCCACTTGGCAGTACATCAAGTGTAT
CATATGCCAAGTACGCCCCCTATTGACGTCAATGACGGTAAATGGCCCGCCTGGCATTATGCC
CAGTACATGACCTTATGGGACTTTCCTACTTGGCAGTACATCTACGTATTAGTCATCGCTATT
ACCATGGTCGAGGTGAGCCCCACGTTCTGCTTCACTCTCCCCATCTCCCCCCCCTCCCCACCC
CCAATTTTGTATTTATTTATTTTTAATTATTTTGTGCAGCGATGGGGGCGGGGGGGGGGGGG
GGCGCGCGCCAGGCGGGGCGGGGGGGGCGAGGGCGGGCGGGGCGAGGCGGAGAGGTGCGG
CGGCAGCCAATCAGAGCGGCGCGCTCCGAAAGTTTCCTTTTATGGCGAGGCGGCGGCGGCGGC
GGCCCTATAAAAAGCGAAGCGCGCGGCGGGCGGGAGTCGCTGCGCGCTGCCTTCGCCCCGTGC
CCCGCTCCGCCGCCGCCTCGCGCCGCCCGCCCCGGCTCTGACTGACCGCGTTACTAAAACAGG
TAAGTCCGGCCTCCGCGCCGGGTTTTGGCGCCTCCCGCGGGCGCCCCCCTCCTCACGGCGAGC
```

-continued

```
GCTGCCACGTCAGACGAAGGGCGCAGCGAGCGTCCTGATCCTTCCGCCCGGACGCTCAGGACA
GCGGCCCGCTGCTCATAAGACTCGGCCTTAGAACCCCAGTATCAGCAGAAGGACATTTTAGGA
CGGGACTTGGGTGACTCTAGGGCACTGGTTTTCTTTCCAGAGAGCGGAACAGGCGAGGAAAAG
TAGTCCCTTCTCGGCGATTCTGCGGAGGGATCTCCGTGGGGCGGTGAACGCCGATGATGCCTC
TACTAACCATGTTCATGTTTTCTTTTTTTTCTACAGGTCCTGGGTGACGAACAGGGTACCGC
CACCGCCAGACCCTGCCGTGCATTTATTTTTGGGGCGGCCTGCTGCCGTTTGGCATGCTGTGC
GCGAGCAGCACCACCAAATGCACCGTGAGCCATGAAGTGGCGGATTGCAGCCATCTGAAACTG
ACCCAGGTGCCGGATGATCTGCCGACCAACATTACCGTGCTGAACCTGACCCATAACCAGCTG
CGCCGCCTGCCGGCGGCGAACTTTACCCGCTATAGCCAGCTGACCAGCCTGGATGTGGGCTTT
AACACCATTAGCAAACTGGAACCGGAACTGTGCCAGAAACTGCCGATGCTGAAAGTGCTGAAC
CTGCAGCATAACGAACTGAGCCAGCTGAGCGATAAAACCTTTGCGTTTTGCACCAACCTGACC
GAACTGCATCTGATGAGCAACAGCATTCAGAAAATTAAAAACAACCCGTTTGTGAAACAGAAA
AACCTGATTACCCTGGATCTGAGCCATAACGGCCTGAGCAGCACCAAACTGGGCACCCAGGTG
CAGCTGGAAAACCTGCAGGAACTGCTGCTGAGCAACAACAAAATTCAGGCGCTGAAAAGCGAA
GAACTGGATATTTTTGCGAACAGCAGCCTGAAAAAACTGGAACTGAGCAGCAACCAGATTAAA
GAATTTAGCCCGGGCTGCTTTCATGCGATTGGCCGCCTGTTTGGCCTGTTTCTGAACAACGTG
CAGCTGGGCCCGAGCCTGACCGAAAAACTGTGCCTGGAACTGGCGAACACCAGCATTCGCAAC
CTGAGCCTGAGCAACAGCCAGCTGAGCACCACCAGCAACACCACCTTTCTGGGCCTGAAATGG
ACCAACCTGACCATGCTGGATCTGAGCTATAACAACCTGAACGTGGTGGGCAACGATAGCTTT
GCGTGGCTGCCGCAGCTGGAATATTTTTTTCTGGAATATAACAACATTCAGCATCTGTTTAGC
CATAGCCTGCATGGCCTGTTTAACGTGCGCTATCTGAACCTGAAACGCAGCTTTACCAAACAG
AGCATTAGCCTGGCGAGCCTGCCGAAAATTGATGATTTTAGCTTTCAGTGGCTGAAATGCCTG
GAACATCTGAACATGGAAGATAACGATATTCCGGGCATTAAAAGCAACATGTTTACCGGCCTG
ATTAACCTGAAATATCTGAGCCTGAGCAACAGCTTTACCAGCCTGCGCACCCTGACCAACGAA
ACCTTTGTGAGCCTGGCGCATAGCCCGCTGCATATTCTGAACCTGACCAAAAACAAAATTAGC
AAAATTGAAAGCGATGCGTTTAGCTGGCTGGGCCATCTGGAAGTGCTGGATCTGGGCCTGAAC
GAAATTGGCCAGGAACTGACCGGCCAGGAATGGCGCGGCCTGGAAAACATTTTTGAAATTTAT
CTGAGCTATAACAAATATCTGCAGCTGACCCGCAACAGCTTTGCGCTGGTGCCGAGCCTGCAG
CGCCTGATGCTGCGCCGCGTGGCGCTGAAAAACGTGGATAGCAGCCCGAGCCCGTTTCAGCCG
CTGCGCAACCTGACCATTCTGGATCTGAGCAACAACAACATTGCGAACATTAACGATGATATG
CTGGAAGGCCTGGAAAAACTGGAAATTCTGGATCTGCAGCATAACAACCTGGCGCGCCTGTGG
AAACATGCGAACCCGGGCGGCCCGATTTATTTTCTGAAAGGCCTGAGCCATCTGCATATTCTG
AACCTGGAAAGCAACGGCTTTGATGAAATTCCGGTGGAAGTGTTTAAAGATCTGTTTGAACTG
AAAATTATTGATCTGGGCCTGAACAACCTGAACACCCTGCCGGCGAGCGTGTTTAACAACCAG
GTGAGCCTGAAAAGCCTGAACCTGCAGAAAAAACCTGATTACCAGCGTGGAAAAAAAAGTGTTT
GGCCCGGCGTTTCGCAACCTGACCGAACTGGATATGCGCTTTAACCCGTTTGATTGCACCTGC
GAAAGCATTGCGTGGTTTGTGAACTGGATTAACGAAACCCATACCAACATTCCGGAACTGAGC
AGCCATTATCTGTGCAACACCCCGCCGCATTATCATGGCTTTCCGGTGCGCCTGTTTGATACC
AGCAGCTGCAAAGATAGCGCGCCGTTTGAACTGTTTTTTATGATTAACACCAGCATTCTGCTG
ATTTTTATTTTTATTGTGCTGCTGATTCATTTTGAAGGCTGGCGCATTAGCTTTTATTGGAAC
GTGAGCGTGCATCGCGTGCTGGGCTTTAAAGAAATTGATCGCCAGACCGAACAGTTTGAATAT
```

-continued

GCGGCGTATATTATTCATGCGTATAAAGATAAAGATTGGGTGTGGGAACATTTTAGCAGCATG

GAAAAAGAAGATCAGAGCCTGAAATTTTGCCTGGAAGAACGCGATTTTGAAGCGGGCGTGTTT

GAACTGGAAGCGATTGTGAACAGCATTAAACGCAGCCGCAAAATTATTTTTGTGATTACCCAT

CATCTGCTGAAAGATCCGCTGTGCAAACGCTTTAAAGTGCATCATGCGGTGCAGCAGGCGATT

GAACAGAACCTGGATAGCATTATTCTGGTGTTTCTGGAAGAAATTCCGGATTATAAACTGAAC

CATGCGCTGTGCCTGCGCCGCGGCATGTTTAAAAGCCATTGCATTCTGAACTGGCCGGTGCAG

AAAGAACGCATTGGCGCGTTTCGCCATAAACTGCAGGTGGCGCTGGGCAGCAAAAACAGCGTG

CATGGGCGGATCAGGCGGATCACCCAAATCTTGTGACAAAACTCACACATGCCCACCGTGCCC

AGCACCTGAACTCCTGGGGGGACCGTCAGTCTTCCTCTTCCCCCCAAAACCCAAGGACACCCT

CATGATCTCCCGGACCCCTGAGGTCACATGCGTGGTGGTGGACGTGAGCCACGAAGACCCTGA

GGTCAAGTTCAACTGGTACGTGGACGGCGTGGAGGTGCATAATGCCAAGACAAAGCCGCGGGA

GGAGCAGTACAACAGCACGTACCGTGTGGTCAGCGTCCTCACCGTCCTGCACCAGGACTGGCT

GAATGGCAAGGAGTACAAGTGCAAGGTCTCCAACAAAGCCCTCCCAGCCCCCATCGAGAAAAC

CATCTCCAAAGCCAAAGGGCAGCCCCGAGAACCACAGGTGTACACCCTGCCCCCATCCCGGGA

GGAGATGACCAAGAACCAGGTCAGCCTGACCTGCCTGGTCAAAGGCTTCTATCCCAGCGACAT

CGCCGTGGAGTGGGAGAGCAATGGGCAGCCGGAGAACAACTACAAGACCACGCCTCCCGTGCT

GGACTCCGACGGCTCCTTCTTCCTCTACAGCAAGCTCACCGTGGACAAGAGCAGGTGGCAGCA

GGGGAACGTCTTCTCATGCTCCGTGATGCATGAGGCTCTGCACAACCACTACACGCAGAAGAG

CCTCTCCCTGTCTCCGGGTAAATAG3'

SEQ ID NO: 9 = SEQ ID NO: 1 + SEQ ID NO: 4
5'TTCTAGAATAATCAACCTCTGGATTACAAAATTTGTGAAAGATTGACTGGTATTCTTAACT

ATGTTGCTCCTTTTACGCTATGTGGATACGCTGCTTTAATGCCTTTGTATCATGCTATTGCTT

CCCGTATGGCTTTCATTTTCTCCTCCTTGTATAAATCCTGGTTGCTGTCTCTTTATGAGGAGT

TGTGGCCCGTTGTCAGGCAACGTGGCGTGGTGTGCACTGTGTTTGCTGACGCAACCCCCACTG

GTTGGGGCATTGCCACCACCTGTCAGCTCCTTTCCGGGACTTTCGCTTTCCCCCTCCCTATTG

CCACGGCGGAACTCATCGCCGCCTGCCTTGCCCGCTGCTGGACAGGGGCTCGGCTGTTGGGCA

CTGACAATTCCGTGGTGTTGTCGGGGAAATCATCGTCCTTTCCTTGGCTGCTCGCCTGTGTTG

CCACCTGGATTCTGCGCGGGACGTCCTTCTGCTACGTCCCTTCGGCCCTCAATCCAGCGGACC

TTCCTTCCCGCGGCCTGCTGCCGGCTCTGCGGCCTCTTCCGCGTCTTCGCCTTCGCCCTCAGA

CGAGTCGGATCTCCCTTTGGGCCGCCTCCCCGCCTAAGCTTATCGATACCGTCGAGATCTAAC

TTGTTTATTGCAGCTTATAATGGTTACAAATAAAGCAATAGCATCACAAATTTCACAAATAAA

GCATTTTTTCACTGCATTCTAGTTGTGGTTTGTCCAAACTCATCAATGTATCTTATCATGTC

TGGATCTCGACCTCGACTAGAGCATGGCTACGTAGATAAGTAGCATGGCGGGTTAATCATTAA

CTACAAGGAACCCCTAGTGATGGAGTTGGCCACTCCCTCTCTGCGCGCTCGCTCGCTCACTGA

GGCCGGGCGACCAAAGGTCGCCCGACGCCCGGGCTTTGCCCGGGCGGCCTCAGTGAGCGAGCG

AGCGCGCCAGCTGGCGTAATAGCGAAGAGGCCCGCACCGATCGCCCTTCCCAACAGTTGCGCA

GCCTGAATGGCGAATGGAATTCCAGACGATTGAGCGTCAAAATGTAGGTATTTCCATGAGCGT

TTTTCCTGTTGCAATGGCTGGCGGTAATATTGTTCTGGATATTACCAGCAAGGCCGATAGTTT

GAGTTCTTCTACTCAGGCAAGTGATGTTATTACTAATCAAAGAAGTATTGCGACAACGGTTAA

TTTGCGTGATGGACAGACTCTTTTACTCGGTGGCCTCACTGATTATAAAAACACTTCTCAGGA

TTCTGGCGTACCGTTCCTGTCTAAAATCCCTTTAATCGGCCTCCTGTTTAGCTCCCGCTCTGA

-continued

```
TTCTAACGAGGAAAGCACGTTATACGTGCTCGTCAAAGCAACCATAGTACGCGCCCTGTAGCG

GCGCATTAAGCGCGGCGGGTGTGGTGGTTACGCGCAGCGTGACCGCTACACTTGCCAGCGCCC

TAGCGCCCGCTCCTTTCGCTTTCTTCCCTTCCTTTCTCGCCACGTTCGCCGGCTTTCCCCGTC

AAGCTCTAAATCGGGGGCTCCCTTTAGGGTTCCGATTTAGTGCTTTACGGCACCTCGACCCCA

AAAAACTTGATTAGGGTGATGGTTCACGTAGTGGGCCATCGCCCTGATAGACGGTTTTTCGCC

CTTTGACGTTGGAGTCCACGTTCTTTAATAGTGGACTCTTGTTCCAAACTGGAACAACACTCA

ACCCTATCTCGGTCTATTCTTTTGATTTATAAGGGATTTTGCCGATTTCGGCCTATTGGTTAA

AAAATGAGCTGATTTAACAAAAATTTAACGCGAATTTTAACAAAATATTAACGTTTACAATTT

AAATATTTGCTTATACAATCTTCCTGTTTTTGGGGCTTTTCTGATTATCAACCGGGGTACATA

TGATTGACATGCTAGTTTTACGATTACCGTTCATCGATTCTCTTGTTTGCTCCAGACTCTCAG

GCAATGACCTGATAGCCTTTGTAGAGACCTCTCAAAAATAGCTACCCTCTCCGGCATGAATTT

ATCAGCTAGAACGGTTGAATATCATATTGATGGTGATTTGACTGTCTCCGGCCTTTCTCACCC

GTTTGAATCTTTACCTACACATTACTCAGGCATTGCATTTAAAATATATGAGGGTTCTAAAAA

TTTTTATCCTTGCGTTGAAATAAAGGCTTCTCCCGCAAAGTATTACAGGGTCATAATGTTTT

TGGTACAACCGATTTAGCTTTATGCTCTGAGGCTTTATTGCTTAATTTTGCTAATTCTTTGCC

TTGCCTGTATGATTTATTGGATGTTGGAATTCCTGATGCGGTATTTTCTCCTTACGCATCTGT

GCGGTATTTCACACCGCATATGGTGCACTCTCAGTACAATCTGCTCTGATGCCGCATAGTTAA

GCCAGCCCCGACACCCGCCAACACCCGCTGACGCGCCCTGACGGGCTTGTCTGCTCCCGGCAT

CCGCTTACAGACAAGCTGTGACCGTCTCCGGGAGCTGCATGTGTCAGAGGTTTTCACCGTCAT

CACCGAAACGCGCGAGACGAAAGGGCCTCGTGATACGCCTATTTTTATAGGTTAATGTCATGA

TAATAATGGTTTCTTAGACGTCAGGTGGCACTTTTCGGGGAAATGTGCGCGGAACCCCTATTT

GTTTATTTTTCTAAATACATTCAAATATGTATCCGCTCATGAGACAATAACCCTGATAAATGC

TTCAATAATATTGAAAAAGGAAGAGTATGAGTATTCAACATTTCCGTGTCGCCCTTATTCCCT

TTTTTGCGGCATTTTGCCTTCCTGTTTTTGCTCACCCAGAAACGCTGGTGAAAGTAAAAGATG

CTGAAGATCAGTTGGGTGCACGAGTGGGTTACATCGAACTGGATCTCAACAGCGGTAAGATCC

TTGAGAGTTTTCGCCCCGAAGAACGTTTTCCAATGATGAGCACTTTTAAAGTTCTGCTATGTG

GCGCGGTATTATCCCGTATTGACGCCGGGCAAGAGCAACTCGGTCGCCGCATACACTATTCTC

AGAATGACTTGGTTGAGTACTCACCAGTCACAGAAAAGCATCTTACGGATGGCATGACAGTAA

GAGAATTATGCAGTGCTGCCATAACCATGAGTGATAACACTGCGGCCAACTTACTTCTGACAA

CGATCGGAGGACCGAAGGAGCTAACCGCTTTTTTGCACAACATGGGGATCATGTAACTCGCC

TTGATCGTTGGGAACCGGAGCTGAATGAAGCCATACCAAACGACGAGCGTGACACCACGATGC

CTGTAGCAATGGCAACAACGTTGCGCAAACTATTAACTGGCGAACTACTTACTCTAGCTTCCC

GGCAACAATTAATAGACTGGATGGAGGCGGATAAAGTTGCAGGACCACTTCTGCGCTCGGCCC

TTCCGGCTGGCTGGTTTATTGCTGATAAATCTGGAGCCGGTGAGCGTGGGTCTCGCGGTATCA

TTGCAGCACTGGGGCCAGATGGTAAGCCCTCCCGTATCGTAGTTATCTACACGACGGGGAGTC

AGGCAACTATGGATGAACGAAATAGACAGATCGCTGAGATAGGTGCCTCACTGATTAAGCATT

GGTAACTGTCAGACCAAGTTTACTCATATATACTTTAGATTGATTTAAAACTTCATTTTTAAT

TTAAAAGGATCTAGGTGAAGATCCTTTTTGATAATCTCATGACCAAAATCCCTTAACGTGAGT

TTTCGTTCCACTGAGCGTCAGACCCCGTAGAAAAGATCAAAGGATCTTCTTGAGATCCTTTTT

TTCTGCGCGTAATCTGCTGCTTGCAAACAAAAAAACCACCGCTACCAGCGGTGGTTTGTTTGC
```

-continued

```
CGGATCAAGAGCTACCAACTCTTTTTCCGAAGGTAACTGGCTTCAGCAGAGCGCAGATACCAA

ATACTGTCCTTCTAGTGTAGCCGTAGTTAGGCCACCACTTCAAGAACTCTGTAGCACCGCCTA

CATACCTCGCTCTGCTAATCCTGTTACCAGTGGCTGCTGCCAGTGGCGATAAGTCGTGTCTTA

CCGGGTTGGACTCAAGACGATAGTTACCGGATAAGGCGCAGCGGTCGGGCTGAACGGGGGGTT

CGTGCACACAGCCCAGCTTGGAGCGAACGACCTACACCGAACTGAGATACCTACAGCGTGAGC

TATGAGAAAGCGCCACGCTTCCCGAAGGGAGAAAGGCGGACAGGTATCCGGTAAGCGGCAGGG

TCGGAACAGGAGAGCGCACGAGGGAGCTTCCAGGGGGAAACGCCTGGTATCTTTATAGTCCTG

TCGGGTTTCGCCACCTCTGACTTGAGCGTCGATTTTTGTGATGCTCGTCAGGGGGGCGGAGCC

TATGGAAAAACGCCAGCAACGCGGCCTTTTTACGGTTCCTGGCCTTTTGCTGGCCTTTTGCTC

ACATGTTCTTTCCTGCGTTATCCCCTGATTCTGTGGATAACCGTATTACCGCCTTTGAGTGAG

CTGATACCGCTCGCCGCAGCCGAACGACCGAGCGCAGCGAGTCAGTGAGCGAGGAAGCGGAAG

AGCGCCCAATACGCAAACCGCCTCTCCCCGCGCGTTGGCCGATTCATTAATGCAGCAGCTGCG

CGCTCGCTCGCTCACTGAGGCCGCCCGGGCAAAGCCCGGGCGTCGGGCGACCTTTGGTCGCCC

GGCCTCAGTGAGCGAGCGAGCGCGCAGAGAGGGAGTGGCCAACTCCATCACTAGGGGTTCCTT

GTAGTTAATGATTAACCCGCCATGCTACTTATCTACGTAGCCATGCTCTAGGACATTGATTAT

TGACTAGTGGAGTTCCGCGTTACATAACTTACGGTAAATGGCCCGCCTGGCTGACCGCCCAAC

GACCCCCGCCCATTGACGTCAATAATGACGTATGTTCCCATAGTAACGCCAATAGGGACTTTC

CATTGACGTCAATGGGTGGAGTATTTACGGTAAACTGCCCACTTGGCAGTACATCAAGTGTAT

CATATGCCAAGTACGCCCCCTATTGACGTCAATGACGGTAAATGGCCCGCCTGGCATTATGCC

CAGTACATGACCTTATGGGACTTTCCTACTTGGCAGTACATCTACGTATTAGTCATCGCTATT

ACCATGGTCGAGGTGAGCCCCACGTTCTGCTTCACTCTCCCCATCTCCCCCCCCTCCCCACCC

CCAATTTTGTATTTATTTATTTTTTAATTATTTTGTGCAGCGATGGGGGCGGGGGGGGGGGG

GGCGCGCGCCAGGCGGGGCGGGGGGGGCGAGGGGCGGGGCGGGGCGAGGCGGAGAGGTGCGG

CGGCAGCCAATCAGAGCGGCGCGCTCCGAAAGTTTCCTTTTATGGCGAGGCGGCGGCGGCGGC

GGCCCTATAAAAAGCGAAGCGCGCGGCGGGCGGGAGTCGCTGCGCGCTGCCTTCGCCCCGTGC

CCCGCTCCGCCGCCGCCTCGCGCCGCCCGCCCCGGCTCTGACTGACCGCGTTACTAAAACAGG

TAAGTCCGGCCTCCGCGCCGGGTTTTGGCGCCTCCCGCGGGCGCCCCCCTCCTCACGGCGAGC

GCTGCCACGTCAGACGAAGGGCGCAGCGAGCGTCCTGATCCTTCCGCCCGGACGCTCAGGACA

GCGGCCCGCTGCTCATAAGACTCGGCCTTAGAACCCCAGTATCAGCAGAAGGACATTTTAGGA

CGGGACTTGGGTGACTCTAGGGCACTGGTTTTCTTTCCAGAGAGCGGAACAGGCGAGGAAAAG

TAGTCCCTTCTCGGCGATTCTGCGGAGGGATCTCCGTGGGGCGGTGAACGCCGATGATGCCTC

TACTAACCATGTTCATGTTTTCTTTTTTTTCTACAGGTCCTGGGTGACGAACAGGGTACCGC

CACCATGAGGGGCATGAAGCTGCTGGGGGCGCTGCTGGCACTGGCGGCCCTACTGCAGGGGGC

CGTGTCCATGGGCTTTTGCCGCAGCGCGCTGCATCCGCTGAGCCTGCTGGTGCAGGCGATTAT

GCTGGCGATGACCCTGGCGCTGGGCACCCTGCCGGCGTTTCTGCCGTGCGAACTGCAGCCGCA

TGGCCTGGTGAACTGCAACTGGCTGTTTCTGAAAAGCGTGCCGCATTTTAGCATGGCGGCGCC

GCGCGGCAACGTGACCAGCCTGAGCCTGAGCAGCAACCGCATTCATCATCTGCATGATAGCGA

TTTTGCGCATCTGCCGAGCCTGCGCCATCTGAACCTGAAATGGAACTGCCCGCCGGTGGGCCT

GAGCCCGATGCATTTTCCGTGCCATATGACCATTGAACCGAGCACCTTTCTGGCGGTGCCGAC

CCTGGAAGAACTGAACCTGAGCTATAACAACATTATGACCGTGCCGGCGCTGCCGAAAAGCCT

GATTAGCCTGAGCCTGAGCCATACCAACATTCTGATGCTGGATAGCGCGAGCCTGGCGGGCCT
```

-continued

```
GCATGCGCTGCGCTTTCTGTTTATGGATGGCAACTGCTATTATAAAAACCCGTGCCGCCAGGC

GCTGGAAGTGGCGCCGGGCGCGCTGCTGGGCCTGGGCAACCTGACCCATCTGAGCCTGAAATA

TAACAACCTGACCGTGGTGCCGCGCAACCTGCCGAGCAGCCTGGAATATCTGCTGCTGAGCTA

TAACCGCATTGTGAAACTGGCGCCGGAAGATCTGGCGAACCTGACCGCGCTGCGCGTGCTGGA

TGTGGGCGGCAACTGCCGCCGCTGCGATCATGCGCCGAACCCGTGCATGGAATGCCCGCGCCA

TTTTCCGCAGCTGCATCCGGATACCTTTAGCCATCTGAGCCGCCTGGAAGGCCTGGTGCTGAA

AGATAGCAGCCTGAGCTGGCTGAACGCGAGCTGGTTTCGCGGCCTGGGCAACCTGCGCGTGCT

GGATCTGAGCGAAAACTTTCTGTATAAATGCATTACCAAAACCAAAGCGTTTCAGGGCCTGAC

CCAGCTGCGCAAACTGAACCTGAGCTTTAACTATCAGAAACGCGTGAGCTTTGCGCATCTGAG

CCTGGCGCCGAGCTTTGGCAGCCTGGTGGCGCTGAAAGAACTGGATATGCATGGCATTTTTTT

TCGCAGCCTGGATGAAACCACCCTGCGCCCGCTGGCGCGCCTGCCGATGCTGCAGACCCTGCG

CCTGCAGATGAACTTTATTAACCAGGCGCAGCTGGGCATTTTTCGCGCGTTTCCGGGCCTGCG

CTATGTGGATCTGAGCGATAACCGCATTAGCGGCGCGAGCGAACTGACCGCGACCATGGGCGA

AGCGGATGGCGGCGAAAAAGTGTGGCTGCAGCCGGGCGATCTGGCGCCGGCGCCGGTGGATAC

CCCGAGCAGCGAAGATTTTCGCCCGAACTGCAGCACCCTGAACTTTACCCTGGATCTGAGCCG

CAACAACCTGGTGACCGTGCAGCCGGAAATGTTTGCGCAGCTGAGCCATCTGCAGTGCCTGCG

CCTGAGCCATAACTGCATTAGCCAGGCGGTGAACGGCAGCCAGTTTCTGCCGCTGACCGGCCT

GCAGGTGCTGGATCTGAGCCATAACAAACTGGATCTGTATCATGAACATAGCTTTACCGAACT

GCCGCGCCTGGAAGCGCTGGATCTGAGCTATAACAGCCAGCCGTTTGGCATGCAGGGCGTGGG

CCATAACTTTAGCTTTGTGGCGCATCTGCGCACCCTGCGCCATCTGAGCCTGGCGCATAACAA

CATTCATAGCCAGGTGAGCCAGCAGCTGTGCAGCACCAGCCTGCGCGCGCTGGATTTTAGCGG

CAACGCGCTGGGCCATATGTGGGCGGAAGGCGATCTGTATCTGCATTTTTTTCAGGGCCTGAG

CGGCCTGATTTGGCTGGATCTGAGCCAGAACCGCCTGCATACCCTGCTGCCGCAGACCCTGCG

CAACCTGCCGAAAAGCCTGCAGGTGCTGCGCCTGCGCGATAACTATCTGGCGTTTTTTAAATG

GTGGAGCCTGCATTTTCTGCCGAAACTGGAAGTGCTGGATCTGGCGGGCAACCAGCTGAAAGC

GCTGACCAACGGCAGCCTGCCGGCGGGCACCCGCCTGCGCCGCCTGGATGTGAGCTGCAACAG

CATTAGCTTTGTGGCGCCGGGCTTTTTTAGCAAAGCGAAAGAACTGCGCGAACTGAACCTGAG

CGCGAACGCGCTGAAAACCGTGGATCATAGCTGGTTTGGCCCGCTGGCGAGCGCGCTGCAGAT

TCTGGATGTGAGCGCGAACCCGCTGCATTGCGCGTGCGGCGCGGCGTTTATGGATTTTCTGCT

GGAAGTGCAGGCGGCGGTGCCGGGCCTGCCGAGCCGCGTGAAATGCGGCAGCCCGGGCCAGCT

GCAGGGCCTGAGCATTTTTGCGCAGGATCTGCGCCTGTGCCTGGATGAAGCGCTGAGCTGGGA

TTGCTTTGCGCTGAGCCTGCTGGCGGTGGCGCTGGGCCTGGGCGTGCCGATGCTGCATCATCT

GTGCGGCTGGGATCTGTGGTATTGCTTTCATCTGTGCCTGGCGTGGCTGCCGTGGCGCGGCCG

CCAGAGCGGCCGCGATGAAGATGCGCTGCCGTATGATGCGTTTGTGGTGTTTGATAAAACCCA

GAGCGCGGTGGCGGATTGGGTGTATAACGAACTGCGCGGCCAGCTGGAAGAATGCCGCGGCCG

CTGGGCGCTGCGCCTGTGCCTGGAAGAACGCGATTGGCTGCCGGGCAAAACCCTGTTTGAAAA

CCTGTGGGCGAGCGTGTATGGCAGCCGCAAAACCCTGTTTGTGCTGGCGCATACCGATCGCGT

GAGCGGCCTGCTGCGCGCGAGCTTTCTGCTGGCGCAGCAGCGCCTGCTGGAAGATCGCAAAGA

TGTGGTGGTGCTGGTGATTCTGAGCCCGGATGGCCGCCGCAGCCGCTATGTGCGCCTGCGCCA

GCGCCTGTGCCGCCAGAGCGTGCTGCTGTGGCCGCATCAGCCGAGCGGCCAGCGCAGCTTTTG
```

```
GGCGCAGCTGGGCATGGCGCTGACCCGCGATAACCATCATTTTTATAACCGCAACTTTTGCCA

GGGCCCGACCGCGGAAGGGCGGATCAGGCGGATCACCCAAATCTTGTGACAAAACTCACACAT

GCCCACCGTGCCCAGCACCTGAACTCCTGGGGGGACCGTCAGTCTTCCTCTTCCCCCCAAAAC

CCAAGGACACCCTCATGATCTCCCGGACCCCTGAGGTCACATGCGTGGTGGTGGACGTGAGCC

ACGAAGACCCTGAGGTCAAGTTCAACTGGTACGTGGACGGCGTGGAGGTGCATAATGCCAAGA

CAAAGCCGCGGGAGGAGCAGTACAACAGCACGTACCGTGTGGTCAGCGTCCTCACCGTCCTGC

ACCAGGACTGGCTGAATGGCAAGGAGTACAAGTGCAAGGTCTCCAACAAAGCCCTCCCAGCCC

CCATCGAGAAAACCATCTCCAAAGCCAAAGGGCAGCCCCGAGAACCACAGGTGTACACCCTGC

CCCCATCCCGGGAGGAGATGACCAAGAACCAGGTCAGCCTGACCTGCCTGGTCAAAGGCTTCT

ATCCCAGCGACATCGCCGTGGAGTGGGAGAGCAATGGGCAGCCGGAGAACAACTACAAGACCA

CGCCTCCCGTGCTGGACTCCGACGGCTCCTTCTTCCTCTACAGCAAGCTCACCGTGGACAAGA

GCAGGTGGCAGCAGGGGAACGTCTTCTCATGCTCCGTGATGCATGAGGCTCTGCACAACCACT

ACACGCAGAAGAGCCTCTCCCTGTCTCCGGGTAAATAG3'

SEQ ID NO: 10 = SEQ ID NO: 1 + SEQ ID NO: 5
5'TTCTAGAATAATCAACCTCTGGATTACAAAATTTGTGAAAGATTGACTGGTATTCTTAACT

ATGTTGCTCCTTTTACGCTATGTGGATACGCTGCTTTAATGCCTTTGTATCATGCTATTGCTT

CCCGTATGGCTTTCATTTTCTCCTCCTTGTATAAATCCTGGTTGCTGTCTCTTTATGAGGAGT

TGTGGCCCGTTGTCAGGCAACGTGGCGTGGTGTGCACTGTGTTTGCTGACGCAACCCCCACTG

GTTGGGGCATTGCCACCACCTGTCAGCTCCTTTCCGGGACTTTCGCTTTCCCCCTCCCTATTG

CCACGGCGGAACTCATCGCCGCCTGCCTTGCCCGCTGCTGGACAGGGGCTCGGCTGTTGGGCA

CTGACAATTCCGTGGTGTTGTCGGGGAAATCATCGTCCTTTCCTTGGCTGCTCGCCTGTGTTG

CCACCTGGATTCTGCGCGGGACGTCCTTCTGCTACGTCCCTTCGGCCCTCAATCCAGCGGACC

TTCCTTCCCGCGGCCTGCTGCCGGCTCTGCGGCCTCTTCCGCGTCTTCGCCTTCGCCCTCAGA

CGAGTCGGATCTCCCTTTGGGCCGCCTCCCCGCCTAAGCTTATCGATACCGTCGAGATCTAAC

TTGTTTATTGCAGCTTATAATGGTTACAAATAAAGCAATAGCATCACAAATTTCACAAATAAA

GCATTTTTTTCACTGCATTCTAGTTGTGGTTTGTCCAAACTCATCAATGTATCTTATCATGTC

TGGATCTCGACCTCGACTAGAGCATGGCTACGTAGATAAGTAGCATGGCGGGTTAATCATTAA

CTACAAGGAACCCCTAGTGATGGAGTTGGCCACTCCCTCTCTGCGCGCTCGCTCGCTCACTGA

GGCCGGGCGACCAAAGGTCGCCCGACGCCCGGGCTTTGCCCGGGCGGCCTCAGTGAGCGAGCG

AGCGCGCCAGCTGGCGTAATAGCGAAGAGGCCCGCACCGATCGCCCTTCCCAACAGTTGCGCA

GCCTGAATGGCGAATGGAATTCCAGACGATTGAGCGTCAAAATGTAGGTATTTCCATGAGCGT

TTTTCCTGTTGCAATGGCTGGCGGTAATATTGTTCTGGATATTACCAGCAAGGCCGATAGTTT

GAGTTCTTCTACTCAGGCAAGTGATGTTATTACTAATCAAAGAAGTATTGCGACAACGGTTAA

TTTGCGTGATGGACAGACTCTTTTACTCGGTGGCCTCACTGATTATAAAAACACTTCTCAGGA

TTCTGGCGTACCGTTCCTGTCTAAAATCCCTTTAATCGGCCTCCTGTTTAGCTCCCGCTCTGA

TTCTAACGAGGAAAGCACGTTATACGTGCTCGTCAAAGCAACCATAGTACGCGCCCTGTAGCG

GCGCATTAAGCGCGGCGGGTGTGGTGGTTACGCGCAGCGTGACCGCTACACTTGCCAGCGCCC

TAGCGCCCGCTCCTTTCGCTTTCTTCCCTTCCTTTCTCGCCACGTTCGCCGGCTTTCCCCGTC

AAGCTCTAAATCGGGGGCTCCCTTTAGGGTTCCGATTTAGTGCTTTACGGCACCTCGACCCCA

AAAAACTTGATTAGGGTGATGGTTCACGTAGTGGGCCATCGCCCTGATAGACGGTTTTTCGCC

CTTTGACGTTGGAGTCCACGTTCTTTAATAGTGGACTCTTGTTCCAAACTGGAACAACACTCA
```

-continued

```
ACCCTATCTCGGTCTATTCTTTTGATTATAAGGGATTTTGCCGATTTCGGCCTATTGGTTAA

AAAATGAGCTGATTTAACAAAAATTTAACGCGAATTTTAACAAAATATTAACGTTTACAATTT

AAATATTTGCTTATACAATCTTCCTGTTTTTGGGGCTTTTCTGATTATCAACCGGGGTACATA

TGATTGACATGCTAGTTTTACGATTACCGTTCATCGATTCTCTTGTTTGCTCCAGACTCTCAG

GCAATGACCTGATAGCCTTTGTAGAGACCTCTCAAAAATAGCTACCCTCTCCGGCATGAATTT

ATCAGCTAGAACGGTTGAATATCATATTGATGGTGATTTGACTGTCTCCGGCCTTTCTCACCC

GTTTGAATCTTTACCTACACATTACTCAGGCATTGCATTTAAAATATATGAGGGTTCTAAAAA

TTTTTATCCTTGCGTTGAAATAAAGGCTTCTCCCGCAAAAGTATTACAGGGTCATAATGTTTT

TGGTACAACCGATTTAGCTTTATGCTCTGAGGCTTTATTGCTTAATTTTGCTAATTCTTTGCC

TTGCCTGTATGATTTATTGGATGTTGGAATTCCTGATGCGGTATTTTCTCCTTACGCATCTGT

GCGGTATTTCACACCGCATATGGTGCACTCTCAGTACAATCTGCTCTGATGCCGCATAGTTAA

GCCAGCCCCGACACCCGCCAACACCCGCTGACGCGCCCTGACGGGCTTGTCTGCTCCCGGCAT

CCGCTTACAGACAAGCTGTGACCGTCTCCGGGAGCTGCATGTGTCAGAGGTTTTCACCGTCAT

CACCGAAACGCGCGAGACGAAAGGGCCTCGTGATACGCCTATTTTTATAGGTTAATGTCATGA

TAATAATGGTTTCTTAGACGTCAGGTGGCACTTTTCGGGGAAATGTGCGCGGAACCCCTATTT

GTTTATTTTTCTAAATACATTCAAATATGTATCCGCTCATGAGACAATAACCCTGATAAATGC

TTCAATAATATTGAAAAAGGAAGAGTATGAGTATTCAACATTTCCGTGTCGCCCTTATTCCCT

TTTTTGCGGCATTTTGCCTTCCTGTTTTTGCTCACCCAGAAACGCTGGTGAAAGTAAAAGATG

CTGAAGATCAGTTGGGTGCACGAGTGGGTTACATCGAACTGGATCTCAACAGCGGTAAGATCC

TTGAGAGTTTTCGCCCCGAAGAACGTTTTCCAATGATGAGCACTTTTAAAGTTCTGCTATGTG

GCGCGGTATTATCCCGTATTGACGCCGGGCAAGAGCAACTCGGTCGCCGCATACACTATTCTC

AGAATGACTTGGTTGAGTACTCACCAGTCACAGAAAAGCATCTTACGGATGGCATGACAGTAA

GAGAATTATGCAGTGCTGCCATAACCATGAGTGATAACACTGCGGCCAACTTACTTCTGACAA

CGATCGGAGGACCGAAGGAGCTAACCGCTTTTTTGCACAACATGGGGGATCATGTAACTCGCC

TTGATCGTTGGGAACCGGAGCTGAATGAAGCCATACCAAACGACGAGCGTGACACCACGATGC

CTGTAGCAATGGCAACAACGTTGCGCAAACTATTAACTGGCGAACTACTTACTCTAGCTTCCC

GGCAACAATTAATAGACTGGATGGAGGCGGATAAAGTTGCAGGACCACTTCTGCGCTCGGCCC

TTCCGGCTGGCTGGTTTATTGCTGATAAATCTGGAGCCGGTGAGCGTGGGTCTCGCGGTATCA

TTGCAGCACTGGGGCCAGATGGTAAGCCCTCCCGTATCGTAGTTATCTACACGACGGGGAGTC

AGGCAACTATGGATGAACGAAATAGACAGATCGCTGAGATAGGTGCCTCACTGATTAAGCATT

GGTAACTGTCAGACCAAGTTTACTCATATATACTTTAGATTGATTTAAAACTTCATTTTTAAT

TTAAAAGGATCTAGGTGAAGATCCTTTTTGATAATCTCATGACCAAAATCCCTTAACGTGAGT

TTTCGTTCCACTGAGCGTCAGACCCCGTAGAAAAGATCAAAGGATCTTCTTGAGATCCTTTTT

TTCTGCGCGTAATCTGCTGCTTGCAAACAAAAAAACCACCGCTACCAGCGGTGGTTTGTTTGC

CGGATCAAGAGCTACCAACTCTTTTTCCGAAGGTAACTGGCTTCAGCAGAGCGCAGATACCAA

ATACTGTCCTTCTAGTGTAGCCGTAGTTAGGCCACCACTTCAAGAACTCTGTAGCACCGCCTA

CATACCTCGCTCTGCTAATCCTGTTACCAGTGGCTGCTGCCAGTGGCGATAAGTCGTGTCTTA

CCGGGTTGGACTCAAGACGATAGTTACCGGATAAGGCGCAGCGGTCGGGCTGAACGGGGGGTT

CGTGCACACAGCCCAGCTTGGAGCGAACGACCTACACCGAACTGAGATACCTACAGCGTGAGC

TATGAGAAAGCGCCACGCTTCCCGAAGGGAGAAAGGCGGACAGGTATCCGGTAAGCGGCAGGG

TCGGAACAGGAGAGCGCACGAGGGAGCTTCCAGGGGGAAACGCCTGGTATCTTTATAGTCCTG
```

-continued

```
TCGGGTTTCGCCACCTCTGACTTGAGCGTCGATTTTTGTGATGCTCGTCAGGGGGGCGGAGCC
TATGGAAAAACGCCAGCAACGCGGCCTTTTTACGGTTCCTGGCCTTTTGCTGGCCTTTTGCTC
ACATGTTCTTTCCTGCGTTATCCCCTGATTCTGTGGATAACCGTATTACCGCCTTTGAGTGAG
CTGATACCGCTCGCCGCAGCCGAACGACCGAGCGCAGCGAGTCAGTGAGCGAGGAAGCGGAAG
AGCGCCCAATACGCAAACCGCCTCTCCCCGCGCGTTGGCCGATTCATTAATGCAGCAGCTGCG
CGCTCGCTCGCTCACTGAGGCCGCCCGGGCAAAGCCCGGGCGTCGGGCGACCTTTGGTCGCCC
GGCCTCAGTGAGCGAGCGAGCGCGCAGAGAGGGAGTGGCCAACTCCATCACTAGGGGTTCCTT
GTAGTTAATGATTAACCCGCCATGCTACTTATCTACGTAGCCATGCTCTAGGACATTGATTAT
TGACTAGTGGAGTTCCGCGTTACATAACTTACGGTAAATGGCCCGCCTGGCTGACCGCCCAAC
GACCCCCGCCCATTGACGTCAATAATGACGTATGTTCCCATAGTAACGCCAATAGGGACTTTC
CATTGACGTCAATGGGTGGAGTATTTACGGTAAACTGCCCACTTGGCAGTACATCAAGTGTAT
CATATGCCAAGTACGCCCCCTATTGACGTCAATGACGGTAAATGGCCCGCCTGGCATTATGCC
CAGTACATGACCTTATGGGACTTTCCTACTTGGCAGTACATCTACGTATTAGTCATCGCTATT
ACCATGGTCGAGGTGAGCCCCACGTTCTGCTTCACTCTCCCCATCTCCCCCCCCTCCCCACCC
CCAATTTTGTATTTATTTATTTTTAATTATTTTGTGCAGCGATGGGGGCGGGGGGGGGGGGG
GGCGCGCGCCAGGCGGGGCGGGGGGGGCGAGGGGCGGGGCGGGGCGAGGCGGAGAGGTGCGG
CGGCAGCCAATCAGAGCGGCGCGCTCCGAAAGTTTCCTTTTATGGCGAGGCGGCGGCGGCGGC
GGCCCTATAAAAAGCGAAGCGCGCGGCGGGCGGGAGTCGCTGCGCGCTGCCTTCGCCCCGTGC
CCCGCTCCGCCGCCGCCTCGCGCCGCCCGCCCCGGCTCTGACTGACCGCGTTACTAAAACAGG
TAAGTCCGGCCTCCGCGCCGGGTTTTGGCGCCTCCCGCGGGCGCCCCCCTCCTCACGGCGAGC
GCTGCCACGTCAGACGAAGGGCGCAGCGAGCGTCCTGATCCTTCCGCCCGGACGCTCAGGACA
GCGGCCCGCTGCTCATAAGACTCGGCCTTAGAACCCCAGTATCAGCAGAAGGACATTTTAGGA
CGGGACTTGGGTGACTCTAGGGCACTGGTTTTCTTTCCAGAGAGCGGAACAGGCGAGGAAAAG
TAGTCCCTTCTCGGCGATTCTGCGGAGGGATCTCCGTGGGGCGGTGAACGCCGATGATGCCTC
TACTAACCATGTTCATGTTTTCTTTTTTTTCTACAGGTCCTGGGTGACGAACAGGGTACCGC
CACCATGAGGGGCATGAAGCTGCTGGGGGCGCTGCTGGCACTGGCGGCCCTACTGCAGGGGGC
CGTGTCCATGAGCATGTGTTTTATACCCTGATTACCGCGTTTCTGATTGGCATTCAGGCGGA
ACCGCATAGCGAAAGCAACGTGCCGGCGGGCCATACCATTCCGCAGGCGCATTGGACCAAACT
GCAGCATAGCCTGGATACCGCGCTGCGCCGCGCGCGCAGCGCGCCGGCGGCGGCGATTGCGGC
GCGCGTGGCGGGCCAGACCCGCAACATTACCGTGGATCCGCGCCTGTTTAAAAAACGCCGCCT
GCGCAGCCCGCGCGTGCTGTTTAGCACCCAGCCGCCGCGCGAAGCGGCGGATACCCAGGATCT
GGATTTTGAAGTGGGCGGCGCGGCGCCGTTTAACCGCACCCATCGCAGCAAACGCAGCAGCAG
CCATCCGATTTTTCATCGCGGCGAATTTAGCGTGTGCGATAGCGTGAGCGTGTGGGTGGGCGA
TAAAACCACCGCGACCGATATTAAAGGCAAAGAAGTGATGGTGCTGGGCGAAGTGAACATTAA
CAACAGCGTGTTTAAACAGTATTTTTTTGAAACCAAATGCCGCGATCCGAACCCGGTGGATAG
CGGCTGCCGCGGCATTGATAGCAAACATTGGAACAGCTATTGCACCACCACCCATACCTTTGT
GAAAGCGCTGACCATGGATGGCAAACAGGCGGCGTGGCGCTTTATTCGCATTGATACCGCGTG
CGTGTGCGTGCTGAGCCGCAAAGCGGTGCGCCGCGCGGGCGGATCAGGCGGATCACCCAAATC
TTGTGACAAAACTCACACATGCCCACCGTGCCCAGCACCTGAACTCCTGGGGGGACCGTCAGT
CTTCCTCTTCCCCCCAAAACCCAAGGACACCCTCATGATCTCCCGGACCCCTGAGGTCACATG
```

-continued

CGTGGTGGTGGACGTGAGCCACGAAGACCCTGAGGTCAAGTTCAACTGGTACGTGGACGGCGT

GGAGGTGCATAATGCCAAGACAAAGCCGCGGGAGGAGCAGTACAACAGCACGTACCGTGTGGT

CAGCGTCCTCACCGTCCTGCACCAGGACTGGCTGAATGGCAAGGAGTACAAGTGCAAGGTCTC

CAACAAAGCCCTCCCAGCCCCCATCGAGAAAACCATCTCCAAAGCCAAAGGGCAGCCCCGAGA

ACCACAGGTGTACACCCTGCCCCCATCCCGGGAGGAGATGACCAAGAACCAGGTCAGCCTGAC

CTGCCTGGTCAAAGGCTTCTATCCCAGCGACATCGCCGTGGAGTGGGAGAGCAATGGGCAGCC

GGAGAACAACTACAAGACCACGCCTCCCGTGCTGGACTCCGACGGCTCCTTCTTCCTCTACAG

CAAGCTCACCGTGGACAAGAGCAGGTGGCAGCAGGGGAACGTCTTCTCATGCTCCGTGATGCA

TGAGGCTCTGCACAACCACTACACGCAGAAGAGCCTCTCCCTGTCTCCGGGTAAATAG3'

SEQ ID NO: 11 = SEQ ID NO: 1 + SEQ ID NO: 6
5'TTCTAGAATAATCAACCTCTGGATTACAAAATTTGTGAAAGATTGACTGGTATTCTTAACT

ATGTTGCTCCTTTTACGCTATGTGGATACGCTGCTTTAATGCCTTTGTATCATGCTATTGCTT

CCCGTATGGCTTTCATTTTCTCCTCCTTGTATAAATCCTGGTTGCTGTCTCTTTATGAGGAGT

TGTGGCCCGTTGTCAGGCAACGTGGCGTGGTGTGCACTGTGTTTGCTGACGCAACCCCCACTG

GTTGGGGCATTGCCACCACCTGTCAGCTCCTTTCCGGGACTTTCGCTTTCCCCCTCCCTATTG

CCACGGCGGAACTCATCGCCGCCTGCCTTGCCCGCTGCTGGACAGGGGCTCGGCTGTTGGGCA

CTGACAATTCCGTGGTGTTGTCGGGGAAATCATCGTCCTTTCCTTGGCTGCTCGCCTGTGTTG

CCACCTGGATTCTGCGCGGGACGTCCTTCTGCTACGTCCCTTCGGCCCTCAATCCAGCGGACC

TTCCTTCCCGCGGCCTGCTGCCGGCTCTGCGGCCTCTTCCGCGTCTTCGCCTTCGCCCTCAGA

CGAGTCGGATCTCCCTTTGGGCCGCCTCCCCGCCTAAGCTTATCGATACCGTCGAGATCTAAC

TTGTTTATTGCAGCTTATAATGGTTACAAATAAAGCAATAGCATCACAAATTTCACAAATAAA

GCATTTTTTTCACTGCATTCTAGTTGTGGTTTGTCCAAACTCATCAATGTATCTTATCATGTC

TGGATCTCGACCTCGACTAGAGCATGGCTACGTAGATAAGTAGCATGGCGGGTTAATCATTAA

CTACAAGGAACCCCTAGTGATGGAGTTGGCCACTCCCTCTCTGCGCGCTCGCTCGCTCACTGA

GGCCGGGCGACCAAAGGTCGCCCGACGCCCGGGCTTTGCCCGGGCGGCCTCAGTGAGCGAGCG

AGCGCGCCAGCTGGCGTAATAGCGAAGAGGCCCGCACCGATCGCCCTTCCCAACAGTTGCGCA

GCCTGAATGGCGAATGGAATTCCAGACGATTGAGCGTCAAAATGTAGGTATTTCCATGAGCGT

TTTTCCTGTTGCAATGGCTGGCGGTAATATTGTTCTGGATATTACCAGCAAGGCCGATAGTTT

GAGTTCTTCTACTCAGGCAAGTGATGTTATTACTAATCAAAGAAGTATTGCGACAACGGTTAA

TTTGCGTGATGGACAGACTCTTTTACTCGGTGGCCTCACTGATTATAAAAACACTTCTCAGGA

TTCTGGCGTACCGTTCCTGTCTAAAATCCCTTTAATCGGCCTCCTGTTTAGCTCCCGCTCTGA

TTCTAACGAGGAAAGCACGTTATACGTGCTCGTCAAAGCAACCATAGTACGCGCCCTGTAGCG

GCGCATTAAGCGCGGCGGGTGTGGTGGTTACGCGCAGCGTGACCGCTACACTTGCCAGCGCCC

TAGCGCCCGCTCCTTTCGCTTTCTTCCCTTCCTTTCTCGCCACGTTCGCCGGCTTTCCCCGTC

AAGCTCTAAATCGGGGGCTCCCTTTAGGGTTCCGATTTAGTGCTTTACGGCACCTCGACCCCA

AAAAACTTGATTAGGGTGATGGTTCACGTAGTGGGCCATCGCCCTGATAGACGGTTTTTCGCC

CTTTGACGTTGGAGTCCACGTTCTTTAATAGTGGACTCTTGTTCCAAACTGGAACAACACTCA

ACCCTATCTCGGTCTATTCTTTTGATTTATAAGGGATTTTGCCGATTTCGGCCTATTGGTTAA

AAAATGAGCTGATTTAACAAAAATTTAACGCGAATTTTAACAAAATATTAACGTTTACAATTT

AAATATTTGCTTATACAATCTTCCTGTTTTTGGGGCTTTTCTGATTATCAACCGGGGTACATA

TGATTGACATGCTAGTTTTACGATTACCGTTCATCGATTCTCTTGTTTGCTCCAGACTCTCAG

```
GCAATGACCTGATAGCCTTTGTAGAGACCTCTCAAAAATAGCTACCCTCTCCGGCATGAATTT

ATCAGCTAGAACGGTTGAATATCATATTGATGGTGATTTGACTGTCTCCGGCCTTTCTCACCC

GTTTGAATCTTTACCTACACATTACTCAGGCATTGCATTTAAAATATATGAGGGTTCTAAAAA

TTTTTATCCTTGCGTTGAAATAAAGGCTTCTCCCGCAAAAGTATTACAGGGTCATAATGTTTT

TGGTACAACCGATTTAGCTTTATGCTCTGAGGCTTTATTGCTTAATTTTGCTAATTCTTTGCC

TTGCCTGTATGATTTATTGGATGTTGGAATTCCTGATGCGGTATTTTCTCCTTACGCATCTGT

GCGGTATTTCACACCGCATATGGTGCACTCTCAGTACAATCTGCTCTGATGCCGCATAGTTAA

GCCAGCCCCGACACCCGCCAACACCCGCTGACGCGCCCTGACGGGCTTGTCTGCTCCCGGCAT

CCGCTTACAGACAAGCTGTGACCGTCTCCGGGAGCTGCATGTGTCAGAGGTTTTCACCGTCAT

CACCGAAACGCGCGAGACGAAAGGGCCTCGTGATACGCCTATTTTTATAGGTTAATGTCATGA

TAATAATGGTTTCTTAGACGTCAGGTGGCACTTTTCGGGGAAATGTGCGCGGAACCCCTATTT

GTTTATTTTTCTAAATACATTCAAATATGTATCCGCTCATGAGACAATAACCCTGATAAATGC

TTCAATAATATTGAAAAAGGAAGAGTATGAGTATTCAACATTTCCGTGTCGCCCTTATTCCCT

TTTTTGCGGCATTTTGCCTTCCTGTTTTTGCTCACCCAGAAACGCTGGTGAAAGTAAAAGATG

CTGAAGATCAGTTGGGTGCACGAGTGGGTTACATCGAACTGGATCTCAACAGCGGTAAGATCC

TTGAGAGTTTTCGCCCCGAAGAACGTTTTCCAATGATGAGCACTTTTAAAGTTCTGCTATGTG

GCGCGGTATTATCCCGTATTGACGCCGGGCAAGAGCAACTCGGTCGCCGCATACACTATTCTC

AGAATGACTTGGTTGAGTACTCACCAGTCACAGAAAAGCATCTTACGGATGGCATGACAGTAA

GAGAATTATGCAGTGCTGCCATAACCATGAGTGATAACACTGCGGCCAACTTACTTCTGACAA

CGATCGGAGGACCGAAGGAGCTAACCGCTTTTTTGCACAACATGGGGGATCATGTAACTCGCC

TTGATCGTTGGGAACCGGAGCTGAATGAAGCCATACCAAACGACGAGCGTGACACCACGATGC

CTGTAGCAATGGCAACAACGTTGCGCAAACTATTAACTGGCGAACTACTTACTCTAGCTTCCC

GGCAACAATTAATAGACTGGATGGAGGCGGATAAAGTTGCAGGACCACTTCTGCGCTCGGCCC

TTCCGGCTGGCTGGTTTATTGCTGATAAATCTGGAGCCGGTGAGCGTGGGTCTCGCGGTATCA

TTGCAGCACTGGGGCCAGATGGTAAGCCCTCCCGTATCGTAGTTATCTACACGACGGGGAGTC

AGGCAACTATGGATGAACGAAATAGACAGATCGCTGAGATAGGTGCCTCACTGATTAAGCATT

GGTAACTGTCAGACCAAGTTTACTCATATATACTTTAGATTGATTTAAAACTTCATTTTTAAT

TTAAAAGGATCTAGGTGAAGATCCTTTTTGATAATCTCATGACCAAAATCCCTTAACGTGAGT

TTTCGTTCCACTGAGCGTCAGACCCCGTAGAAAAGATCAAAGGATCTTCTTGAGATCCTTTTT

TTCTGCGCGTAATCTGCTGCTTGCAAACAAAAAAACCACCGCTACCAGCGGTGGTTTGTTTGC

CGGATCAAGAGCTACCAACTCTTTTTCCGAAGGTAACTGGCTTCAGCAGAGCGCAGATACCAA

ATACTGTCCTTCTAGTGTAGCCGTAGTTAGGCCACCACTTCAAGAACTCTGTAGCACCGCCTA

CATACCTCGCTCTGCTAATCCTGTTACCAGTGGCTGCTGCCAGTGGCGATAAGTCGTGTCTTA

CCGGGTTGGACTCAAGACGATAGTTACCGGATAAGGCGCAGCGGTCGGGCTGAACGGGGGGTT

CGTGCACACAGCCCAGCTTGGAGCGAACGACCTACACCGAACTGAGATACCTACAGCGTGAGC

TATGAGAAAGCGCCACGCTTCCCGAAGGGAGAAAGGCGGACAGGTATCCGGTAAGCGGCAGGG

TCGGAACAGGAGAGCGCACGAGGGAGCTTCCAGGGGAAACGCCTGGTATCTTTATAGTCCTG

TCGGGTTTCGCCACCTCTGACTTGAGCGTCGATTTTTGTGATGCTCGTCAGGGGGGCGGAGCC

TATGGAAAAACGCCAGCAACGCGGCCTTTTTACGGTTCCTGGCCTTTTGCTGGCCTTTTGCTC

ACATGTTCTTTCCTGCGTTATCCCCTGATTCTGTGGATAACCGTATTACCGCCTTTGAGTGAG

CTGATACCGCTCGCCGCAGCCGAACGACCGAGCGCAGCGAGTCAGTGAGCGAGGAAGCGGAAG
```

-continued

```
AGCGCCCAATACGCAAACCGCCTCTCCCCGCGCGTTGGCCGATTCATTAATGCAGCAGCTGCG

CGCTCGCTCGCTCACTGAGGCCGCCCGGGCAAAGCCCGGGCGTCGGGCGACCTTTGGTCGCCC

GGCCTCAGTGAGCGAGCGAGCGCGCAGAGAGGGAGTGGCCAACTCCATCACTAGGGGTTCCTT

GTAGTTAATGATTAACCCGCCATGCTACTTATCTACGTAGCCATGCTCTAGGACATTGATTAT

TGACTAGTGGAGTTCCGCGTTACATAACTTACGGTAAATGGCCCGCCTGGCTGACCGCCCAAC

GACCCCCGCCCATTGACGTCAATAATGACGTATGTTCCCATAGTAACGCCAATAGGGACTTTC

CATTGACGTCAATGGGTGGAGTATTTACGGTAAACTGCCCACTTGGCAGTACATCAAGTGTAT

CATATGCCAAGTACGCCCCCTATTGACGTCAATGACGGTAAATGGCCCGCCTGGCATTATGCC

CAGTACATGACCTTATGGGACTTTCCTACTTGGCAGTACATCTACGTATTAGTCATCGCTATT

ACCATGGTCGAGGTGAGCCCCACGTTCTGCTTCACTCTCCCCATCTCCCCCCCCTCCCCACCC

CCAATTTTGTATTTATTTATTTTTAATTATTTTGTGCAGCGATGGGGCGGGGGGGGGGGGG

GGCGCGCGCCAGGCGGGGCGGGGCGGGGCGAGGGGCGGGGCGGGGCGAGGCGGAGAGGTGCGG

CGGCAGCCAATCAGAGCGGCGCGCTCCGAAAGTTTCCTTTTATGGCGAGGCGGCGGCGGCGGC

GGCCCTATAAAAAGCGAAGCGCGCGGCGGGCGGGAGTCGCTGCGCGCTGCCTTCGCCCCGTGC

CCCGCTCCGCCGCCGCCTCGCGCCGCCCGCCCCGGCTCTGACTGACCGCGTTACTAAAACAGG

TAAGTCCGGCCTCCGCGCCGGGTTTTGGCGCCTCCCGCGGGCGCCCCCCTCCTCACGGCGAGC

GCTGCCACGTCAGACGAAGGGCGCAGCGAGCGTCCTGATCCTTCCGCCCGGACGCTCAGGACA

GCGGCCCGCTGCTCATAAGACTCGGCCTTAGAACCCCAGTATCAGCAGAAGGACATTTTAGGA

CGGGACTTGGGTGACTCTAGGGCACTGGTTTTCTTTCCAGAGAGCGGAACAGGCGAGGAAAAG

TAGTCCCTTCTCGGCGATTCTGCGGAGGGATCTCCGTGGGGCGGTGAACGCCGATGATGCCTC

TACTAACCATGTTCATGTTTTCTTTTTTTTCTACAGGTCCTGGGTGACGAACAGGGTACCGC

CACCATGAGGGGCATGAAGCTGCTGGGGGCGCTGCTGGCACTGGCGGCCCTACTGCAGGGGGC

CGTGTCCATGGCGCTGTGGATGCGCCTGCTGCCGCTGCTGGCGCTGCTGGCGCTGTGGGCCC

GGATCCGGCGGCGGCGTTTGTGAACCAGCATCTGTGCGGCAGCCATCTGGTGGAAGCGCTGTA

TCTGGTGTGCGGCGAACGCGGCTTTTTTTATACCCCGAAAACCCGCCGCGAAGCGGAAGATCT

GCAGGTGGGCCAGGTGGAACTGGGCGGCGGCCCGGGCGCGGGCAGCCTGCAGCCGCTGGCGCT

GGAAGGCAGCCTGCAGAAACGCGGCATTGTGGAACAGTGCTGCACCAGCATTTGCAGCCTGTA

TCAGCTGGAAAACTATTGCAACGGGCGGATCAGGCGGATCACCCAAATCTTGTGACAAAACTC

ACACATGCCCACCGTGCCCAGCACCTGAACTCCTGGGGGACCGTCAGTCTTCCTCTTCCCCC

CAAAACCCAAGGACACCCTCATGATCTCCCGGACCCCTGAGGTCACATGCGTGGTGGTGGACG

TGAGCCACGAAGACCCTGAGGTCAAGTTCAACTGGTACGTGGACGGCGTGGAGGTGCATAATG

CCAAGACAAAGCCGCGGGAGGAGCAGTACAACAGCACGTACCGTGTGGTCAGCGTCCTCACCG

TCCTGCACCAGGACTGGCTGAATGGCAAGGAGTACAAGTGCAAGGTCTCCAACAAAGCCCTCC

CAGCCCCCATCGAGAAAACCATCTCCAAAGCCAAAGGGCAGCCCCGAGAACCACAGGTGTACA

CCCTGCCCCCATCCCGGGAGGAGATGACCAAGAACCAGGTCAGCCTGACCTGCCTGGTCAAAG

GCTTCTATCCCAGCGACATCGCCGTGGAGTGGGAGAGCAATGGGCAGCCGGAGAACAACTACA

AGACCACGCCTCCCGTGCTGGACTCCGACGGCTCCTTCTTCCTCTACAGCAAGCTCACCGTGG

ACAAGAGCAGGTGGCAGCAGGGGAACGTCTTCTCATGCTCCGTGATGCATGAGGCTCTGCACA

ACCACTACACGCAGAAGAGCCTCTCCCTGTCTCCGGGTAAATAG3'
```

As will be appreciated by those skilled in the art, because the recombinant plasmid is a circular vector, the one or more sequences of the mRNA expression cassettes may be connected at the 3' end of SEQ ID NO. 1, as shown in SEQ ID NO. 7-11 or at the 5' end of SEQ ID NO. 1.

As will be appreciated by those skilled in the art, a perfect match of nucleotides with each of the miRNA expression cassette sequences is not necessary in order to have the desired result of increased bioavailability of the target biomolecule as a result of the target cell producing the miRNA sequence that will bind to and degrade the mRNA of the target biomolecule. In some embodiments of the present disclosure, about 80% to about 100% nucleotide sequence matching with each of the mRNA expression cassettes causes the desired result. In some embodiments of the present disclosure, about 85% to about 100% nucleotide sequence matching with each of the mRNA expression cassettes causes the desired result. In some embodiments of the present disclosure, about 90% to about 100% nucleotide sequence matching with each of the mRNA expression cassettes causes the desired result. In some embodiments of the present disclosure, about 95% to about 100% nucleotide sequence matching with each of the mRNA expression cassettes causes the desired result.

Example 1—Expression Cassette

Expression cassettes for expressing mRNA were synthesized. The synthesized miRNA expression cassettes were cloned into the pAVA-00200 plasmid backbone containing the CASI promoter, multiple cloning site (MCS), Woodchuck Hepatitis Virus post-transcriptional regulatory element (WPRE), and Simian virus 40 (SV40) polyadenylation (polyA) sequence, all flanked by the AAV2 inverted terminal repeats (ITR). pAVA-00200 was cut with the restriction enzymes KpnI and XbaI in the MCS and separated on a 1% agarose gel. The band of interest was excised and purified using a gel extraction kit. Each mRNA expression cassette was amplified by polymerase chain reaction (PCR) using Taq polymerase and the PCR products were gel purified and the bands on interest were also excised and purified using a gel extraction kit. These PCR products contained the mRNA expression cassettes in addition to 15 base pair 5' and 3' overhangs that aligned with the ends of the linearized pAVA-00200 backbone. Using in-fusion cloning, the amplified mRNA expression cassettes are integrated with the pAVA-00200 backbone via homologous recombination. The resulting RP contained the following: 5' ITR, CASI promoter, miRNA expression cassette, WPRE, SV40 polyA and ITR 3'.

The invention claimed is:

1. An isolated plasmid comprising the nucleic acid sequence of SEQ ID NO: 4 encoding a messenger ribonucleic acid (mRNA) encoding a fusion protein comprising a TLR9 protein and an Fc domain.

2. The isolated plasmid of claim 1, further comprising one or more pharmaceutically acceptable carriers.

3. An isolated plasmid comprising the nucleic acid sequence of SEQ ID NO: 9 encoding a messenger ribonucleic acid (mRNA) encoding a fusion protein comprising a TLR9 protein and an Fc domain.

* * * * *